US009022564B2

(12) United States Patent
Watanabe et al.

(10) Patent No.: US 9,022,564 B2
(45) Date of Patent: May 5, 2015

(54) DISPLAY APPARATUS

(71) Applicant: Panasonic Intellectual Property Corporation of America, Torrance, CA (US)

(72) Inventors: Tatsumi Watanabe, Osaka (JP); Hiroyuki Yoshida, Osaka (JP); Ken Mashitani, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 107 days.

(21) Appl. No.: 13/721,555

(22) Filed: Dec. 20, 2012

(65) Prior Publication Data

US 2013/0229710 A1    Sep. 5, 2013

(30) Foreign Application Priority Data

Dec. 21, 2011    (JP) ................................ 2011-280396

(51) Int. Cl.
     *A61B 3/08*      (2006.01)
     *H04N 13/04*      (2006.01)
     *G02B 27/22*      (2006.01)
     *H04N 13/00*      (2006.01)

(52) U.S. Cl.
     CPC ............. *G02B 27/22* (2013.01); *G02B 27/2214* (2013.01); *H04N 13/00* (2013.01); *H04N 13/0404* (2013.01); *H04N 13/0409* (2013.01); *H04N 13/0415* (2013.01)

(58) Field of Classification Search
     USPC .................. 359/462–463, 477; 351/201, 240; 348/54, 59
     See application file for complete search history.

(56) References Cited

U.S. PATENT DOCUMENTS

| 7,268,943 | B2 | 9/2007 | Lee |
| 2005/0073472 | A1 | 4/2005 | Kim et al. |
| 2011/0187832 | A1 | 8/2011 | Yoshida |
| 2012/0127572 | A1* | 5/2012 | Takahashi et al. ............ 359/463 |
| 2012/0182407 | A1* | 7/2012 | Yoshida .......................... 348/54 |
| 2014/0036047 | A1* | 2/2014 | Watanabe et al. ............... 348/54 |

FOREIGN PATENT DOCUMENTS

WO      2010/007787      1/2010
WO    WO 2012/147140    * 11/2012

OTHER PUBLICATIONS

Goo Hamagishi et al., "Autostereoscopic 3D Displays using Image-Splitter Method", Journal of the Institute of Image Information and Television Engineers, vol. 51, No. 7, pp. 1070-1078 (1997) along with English abstract.

* cited by examiner

*Primary Examiner* — Jordan Schwartz
(74) *Attorney, Agent, or Firm* — Wenderoth, Lind & Ponack, L.L.P.

(57) ABSTRACT

The present application relates to a display apparatus comprising: a display portion which displays a first image and a second image different from the first image to create a stereoscopic image; a separator which separates the first and second images from each other; and an adjuster which adjusts a shape of the separator. The separator includes a barrier portion which blocks image light emitted from the display portion. The barrier portion includes a contour portion which defines a shape of at least one opening that allows transmission of the image light. The contour portion includes a first contour and a second contour facing the first contour. The first and second contours define a continuous opening region inclined at a predetermined angle from a vertical line. At least one of the first and second contours forms protrusions which periodically protrude toward the opening region. Shapes of the protrusions are heterogeneous.

14 Claims, 60 Drawing Sheets

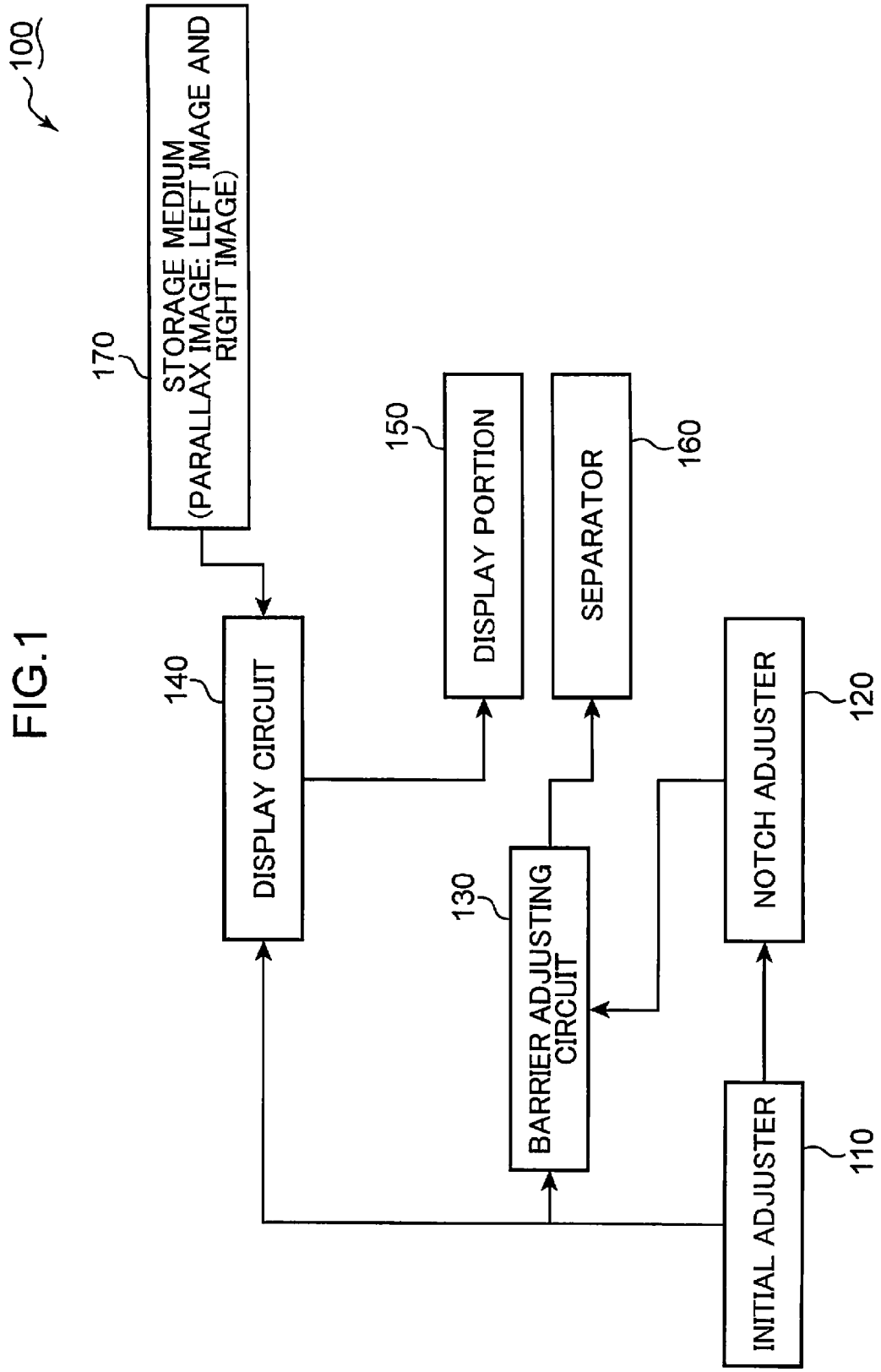

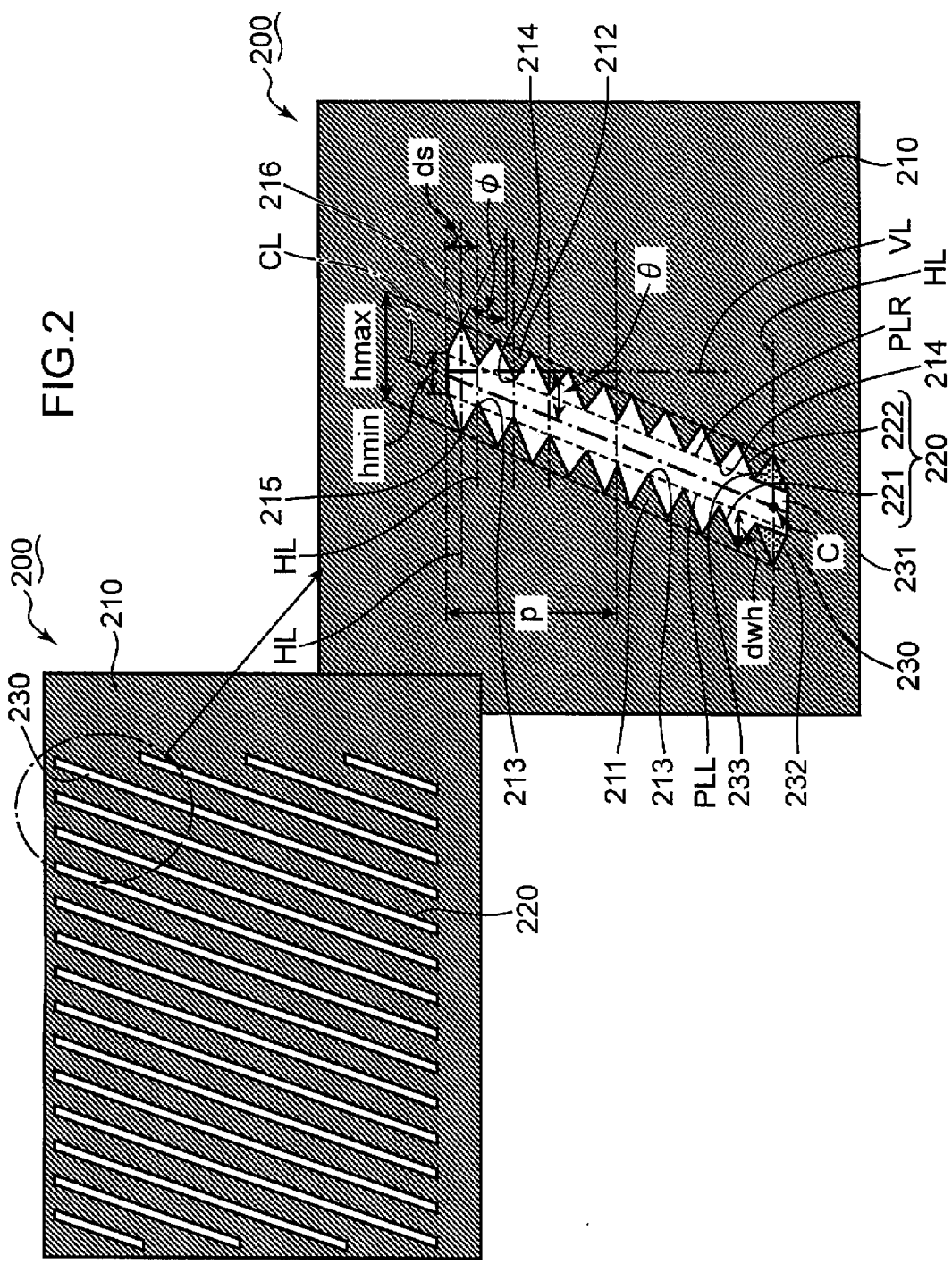

(GENERATION OF FINE HORIZONTAL STRIPES)

(GENERATION OF COARSE HORIZONTAL STRIPES)

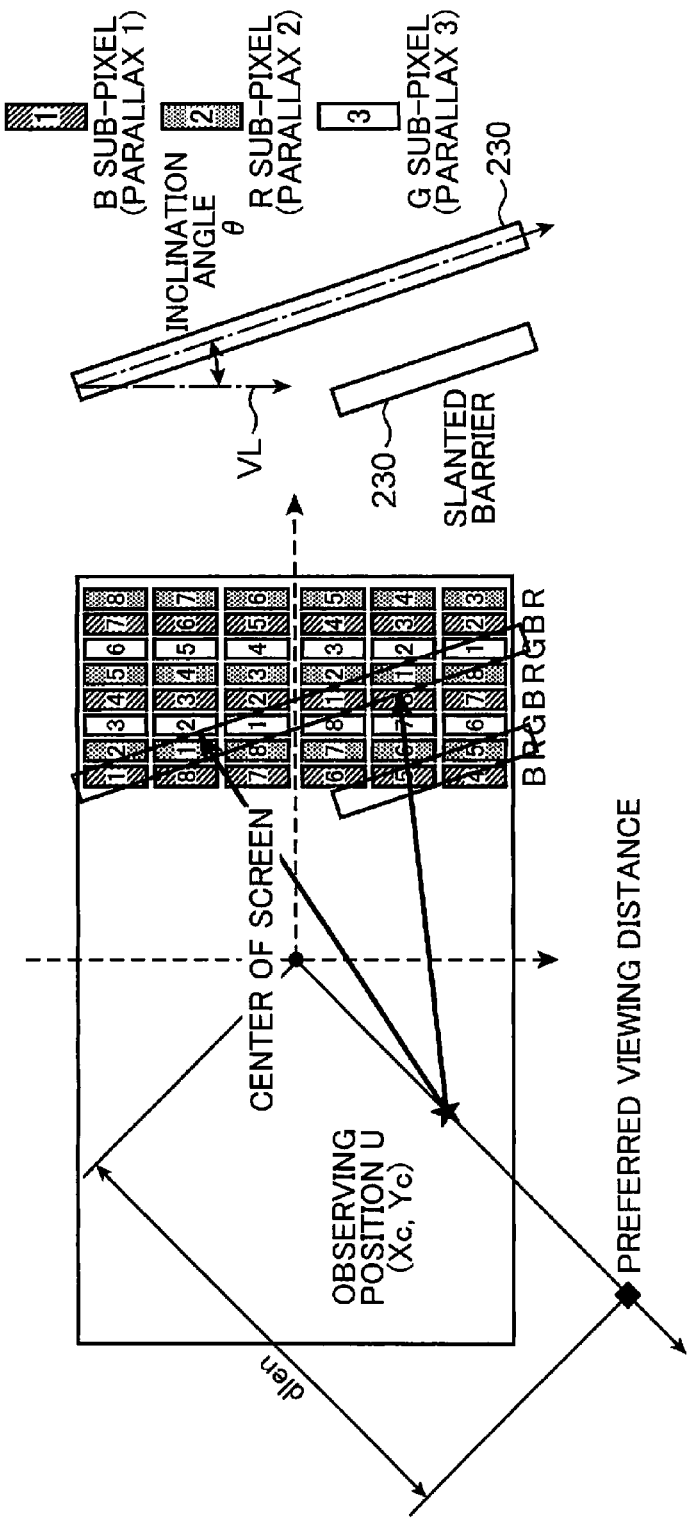

FIG.7

| | | |
|---|---|---|
| 0 | LITTLE HORIZONTAL STRIPES | |
| 1 | FINE STRIPES | HORIZONTAL STRIPES OBSERVED |
| 2 | INTERMEDIATE STRIPES | |
| 3 | WIDE STRIPES | |
| 4 | VERTICAL STRIPES OBSERVED | |
| 5 | DIAGONAL STRIPES OBSERVED | |

EVALUATION CRITERIA TABLE

FIG.8A

Legend:
- ▬ MULTIPLYING FACTOR OF VERTICAL LENGTH OF SUB-PIXEL FOR VERTICAL PERIOD WIDTH OF NOTCHED STRUCTURE
- ▭ EVALUATION RESULT

| MULTIPLYING FACTOR FOR PERIOD WIDTH | PERIOD WIDTH (μm) | EVALUATION RESULT |
|---|---|---|
| 12 | 39.5 | 1 |
|  | 39.8 | 2 |
|  | 40 | 0 |
|  | 40.2 | 2 |
|  | 40.5 | 1 |
|  | 41 | 0 |
|  | 42 | 0 |
|  | 42.5 | 0 |
|  | 43 | 0 |
|  | 43.5 | 2 |
| 11 | 43.6363636 | 0 |
|  | 43.7 | 3 |
|  | 44 | 0 |
|  | 44.5 | 0 |
|  | 45 | 0 |
|  | 46 | 0 |
|  | 46.5 | 0 |
|  | 47 | 1 |
|  | 47.5 | 0 |
| 10 | 48 | 0 |
|  | 48.5 | 1 |
|  | 49 | 0 |
|  | 49.5 | 0 |
|  | 50 | 0 |
|  | 51 | 0 |
|  | 51.5 | 0 |
|  | 52 | 0 |
|  | 52.5 | 2 |
|  | 53 | 0 |
| 9 | 53.3333333 | 3 |
|  | 53.5 | 1 |
|  | 54 | 0 |
|  | 54.5 | 0 |
|  | 55 | 0 |
|  | 55.5 | 0 |
|  | 56 | 0 |
|  | 57 | 0 |
|  | 57.5 | 0 |
|  | 58 | 0 |
|  | 58.5 | 0 |
|  | 59 | 1 |
|  | 59.5 | 2 |
| 8 | 60 | 0 |
|  | 60.5 | 2 |
|  | 61 | 1 |
|  | 61.5 | 0 |
|  | 62 | 0 |
|  | 62.5 | 0 |
|  | 63 | 0 |
|  | 64 | 0 |
|  | 65 | 0 |
|  | 66 | 0 |
|  | 66.5 | 0 |
|  | 67 | 2 |
|  | 67.5 | 3 |
|  | 68 | 0 |
|  | 68.2 | 0 |
| 7 | 68.57142857 | 0 |
|  | 68.8 | 3 |
|  | 69 | 2 |
|  | 69.5 | 1 |
|  | 70 | 0 |
|  | 70.5 | 0 |
|  | 71 | 0 |
|  | 71.5 | 0 |
|  | 72 | 0 |
|  | 73 | 0 |
|  | 74 | 0 |
|  | 75 | 0 |
|  | 76 | 0 |
|  | 77 | 0 |
|  | 78 | 0 |
|  | 78.5 | 1 |
|  | 79 | 2 |
|  | 79.5 | 0 |
| 6 | 80 | 2 |
|  | 80.5 | 1 |
|  | 81 | 1 |
|  | 81.5 | 1 |
|  | 82 | 0 |
|  | 82.5 | 0 |
|  | 83 | 0 |

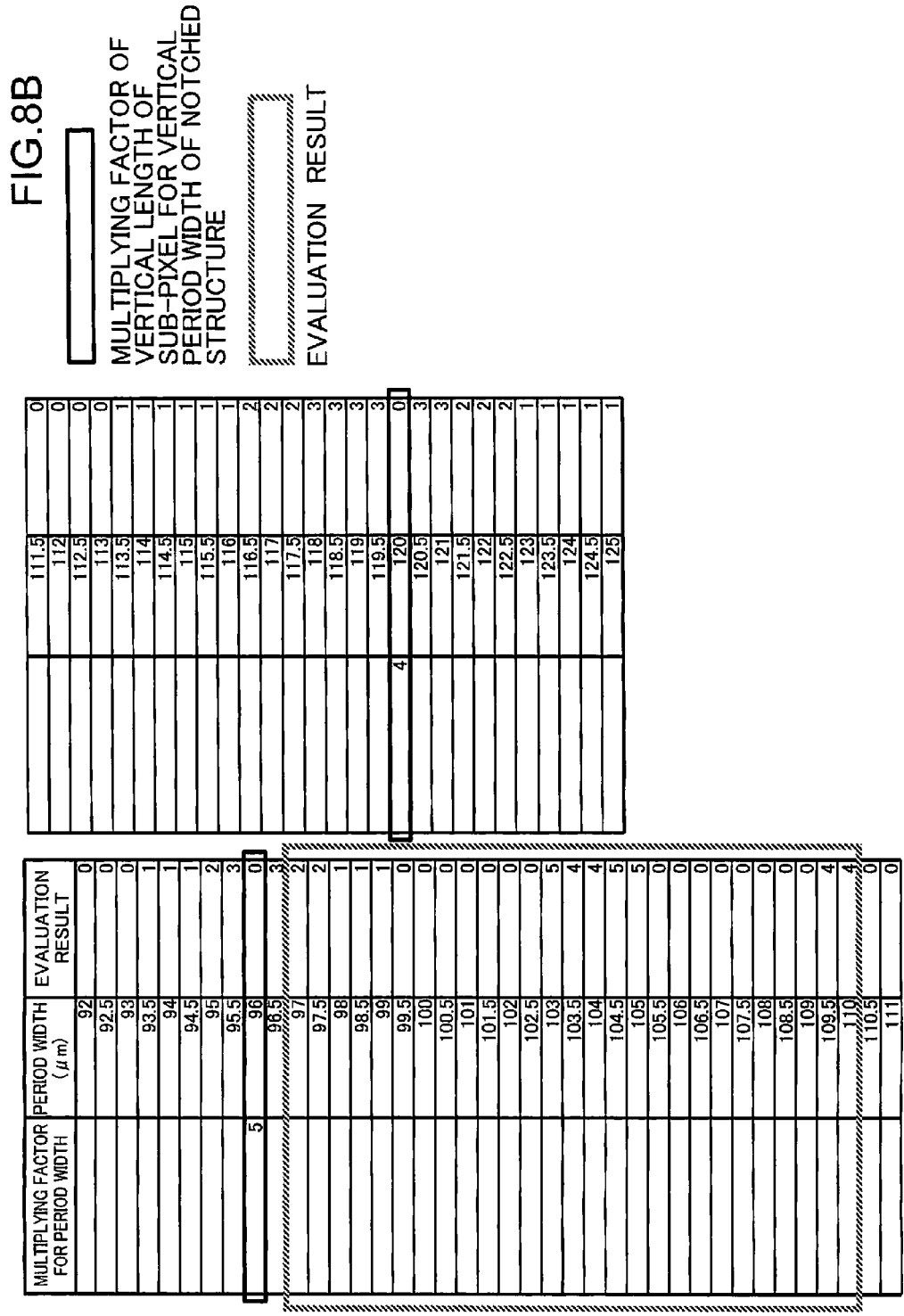

ONLY HORIZONTAL STRIPES

ONLY LARGE DIAGONAL STRIPES

LARGE DIAGONAL STRIPES + HORIZONTAL STRIPES

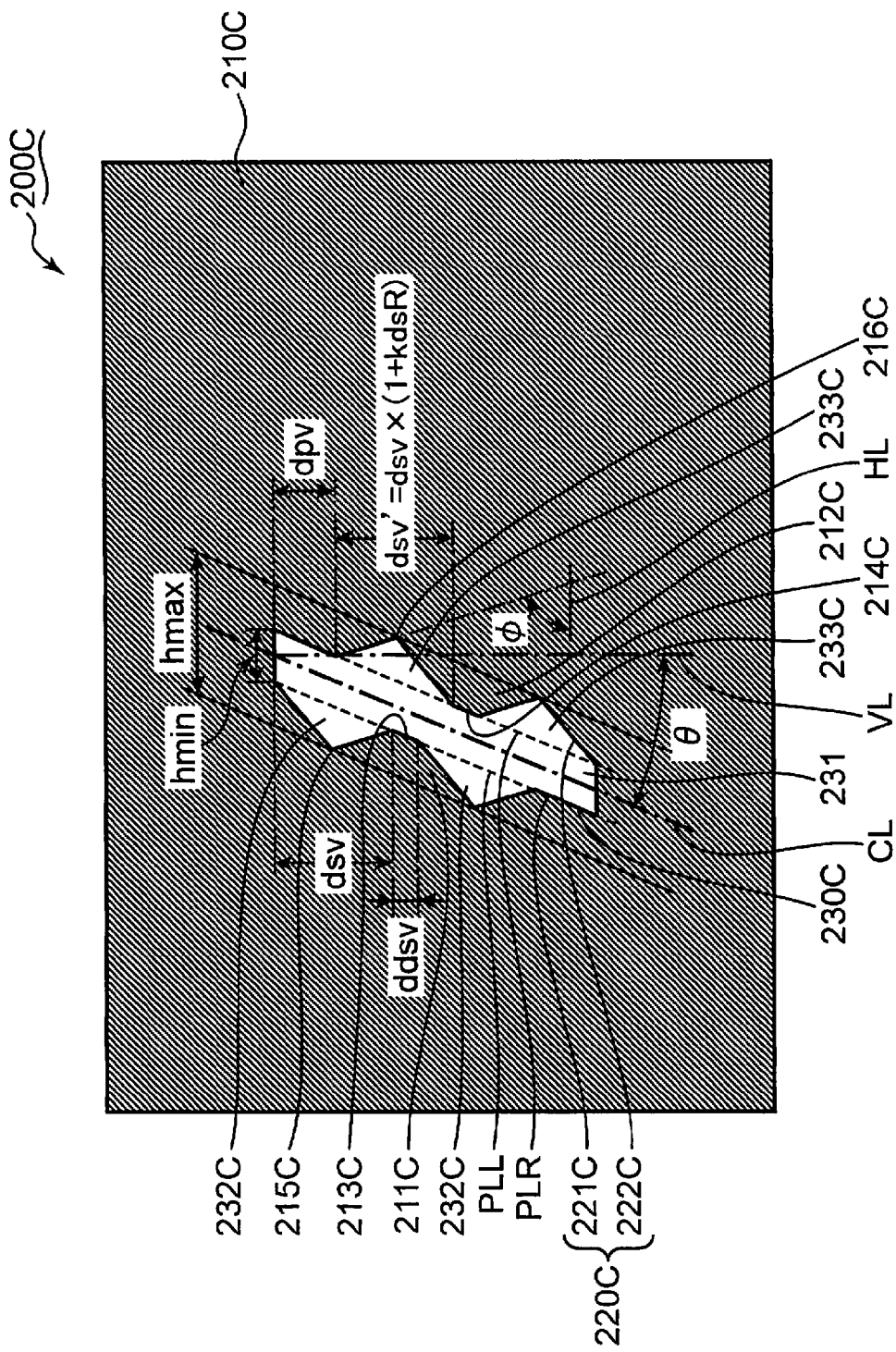

FIRST REFERENCE PATTERN (INCLINATION ANGLE: 18.435 DEGREES)

SECOND REFERENCE PATTERN (INCLINATION ANGLE: 23 DEGREES)

FIG.25

| CANDIDATES FOR VERTICAL PERIOD WIDTH OF NOTCHED STRUCTURE | CANDIDATES FOR BARRIER PARAMETERS |
|---|---|
| CANDIDATE (1) | BARRIER PARAMETER (1) ASSIGNED TO CANDIDATE (1) |
| | BARRIER PARAMETER (2) ASSIGNED TO CANDIDATE (1) |
| | ... |
| | BARRIER PARAMETER (gnum − 1) ASSIGNED TO CANDIDATE (1) |
| | BARRIER PARAMETER (gnum) ASSIGNED TO CANDIDATE (1) |
| CANDIDATE (2) | BARRIER PARAMETER (1) ASSIGNED TO CANDIDATE (2) |
| | BARRIER PARAMETER (2) ASSIGNED TO CANDIDATE (2) |
| | ... |
| | BARRIER PARAMETER (gnum − 1) ASSIGNED TO CANDIDATE (2) |
| | BARRIER PARAMETER (gnum) ASSIGNED TO CANDIDATE (2) |
| ... | ... |
| CANDIDATE (nnum) | BARRIER PARAMETER (1) ASSIGNED TO CANDIDATE (nnum) |
| | BARRIER PARAMETER (2) ASSIGNED TO CANDIDATE (nnum) |
| | ... |
| | BARRIER PARAMETER (gnum − 1) ASSIGNED TO CANDIDATE (nnum) |
| | BARRIER PARAMETER (gnum) ASSIGNED TO CANDIDATE (nnum) |

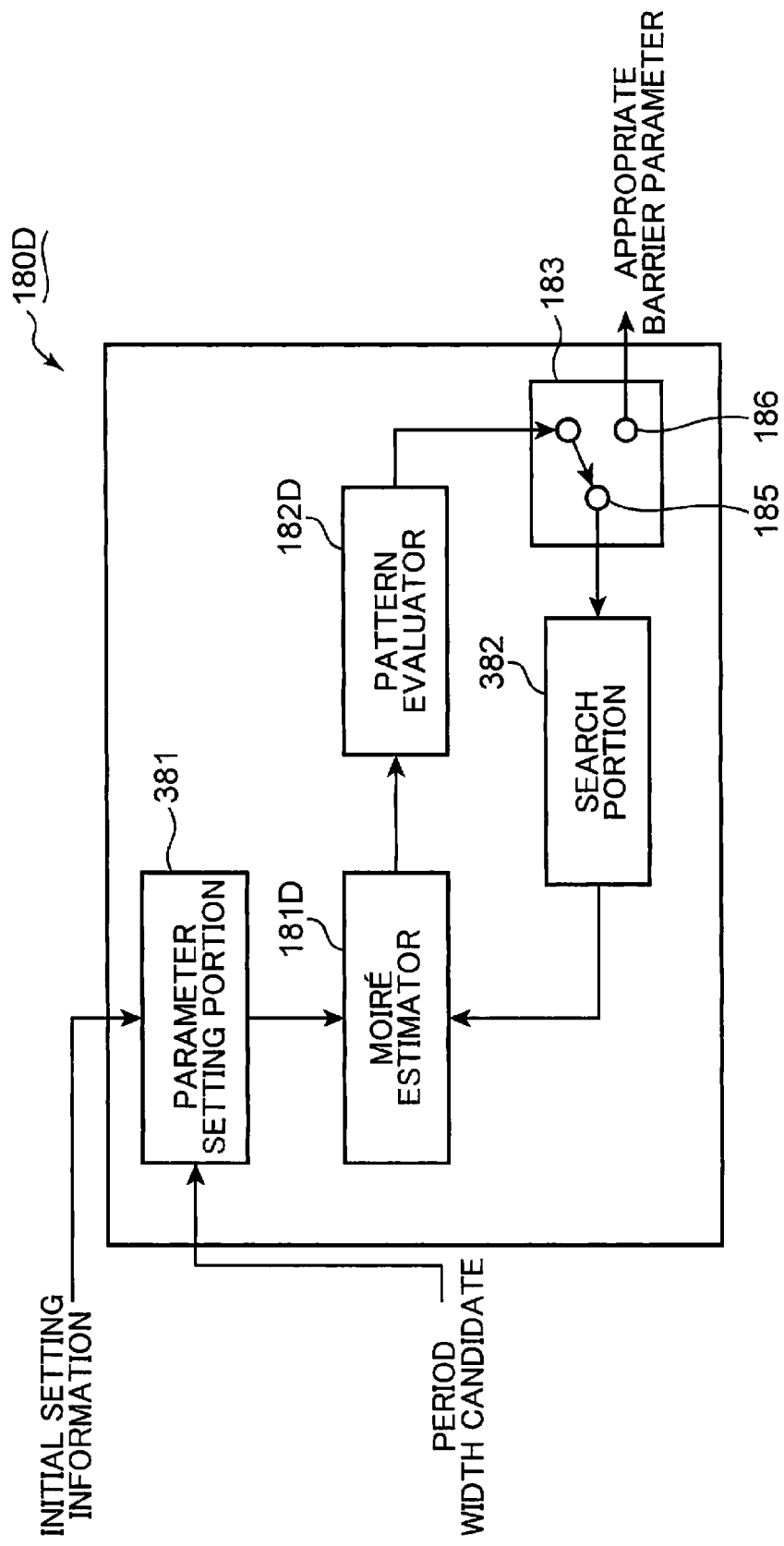

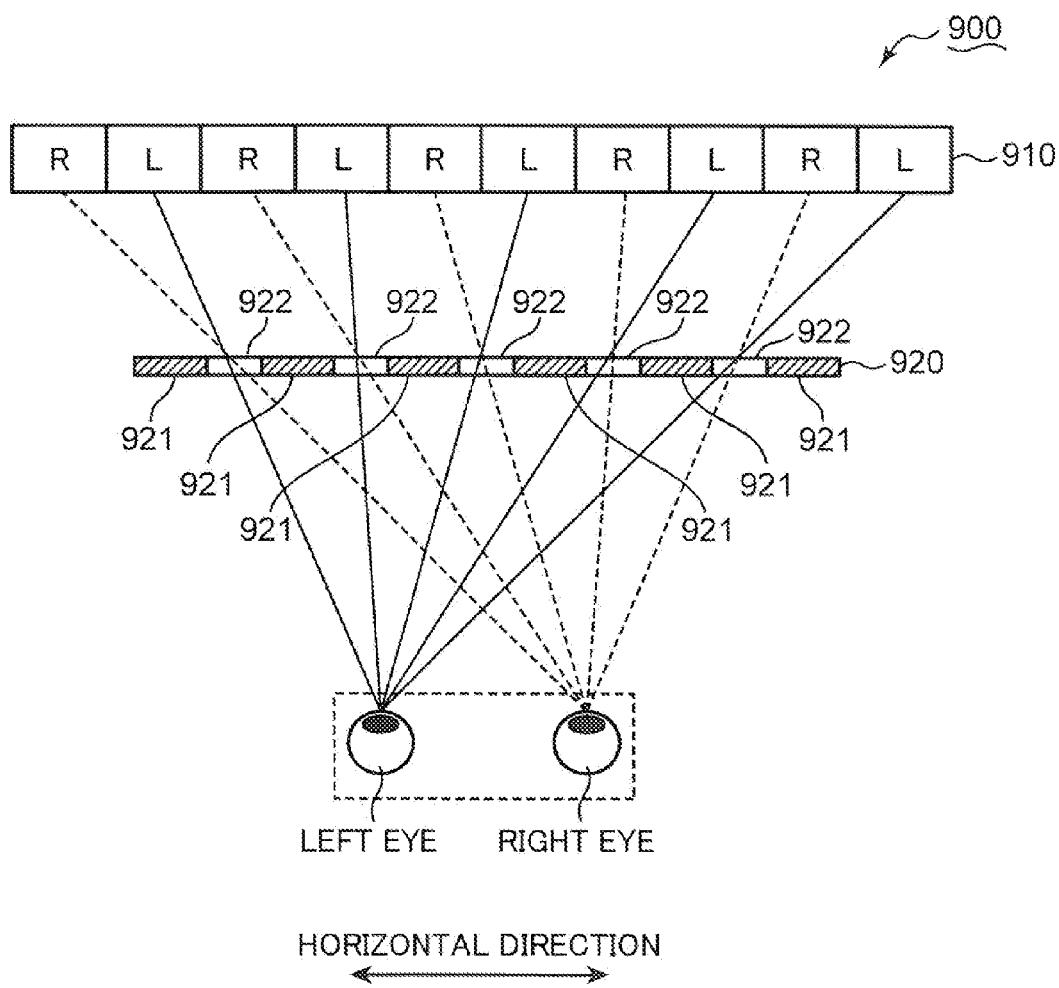

(STEP BARRIER) (MOIRÉ PATTERN)

(SLANTED PATTERN) (MOIRÉ PATTERN)

PRIOR ART
FIG. 55
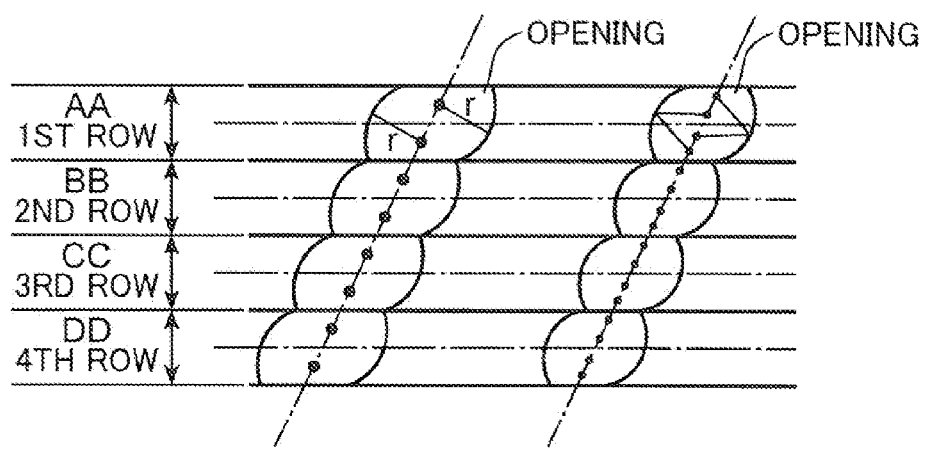
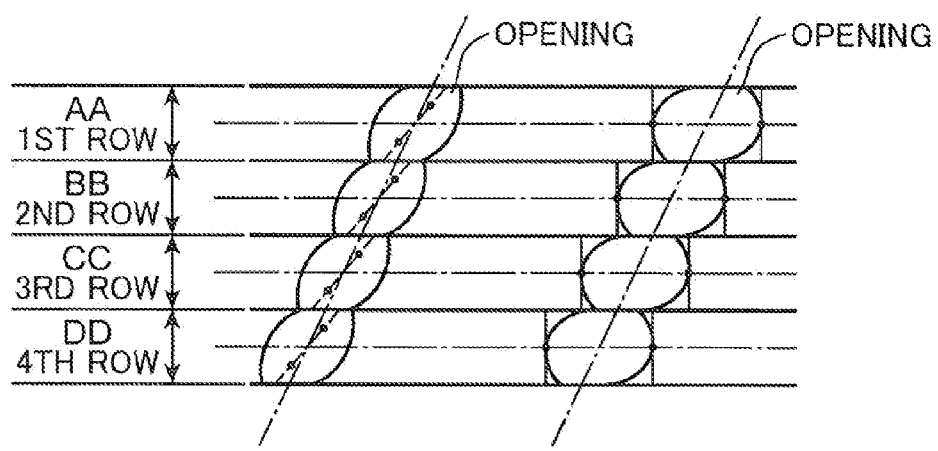
(PARALLAX BARRIERS WITH VARIOUS OPENING PATTERNS)

DISPLAY APPARATUS

TECHNICAL FIELD

The present invention relates to a display apparatus for allowing an observer to observe a stereoscopic video without a dedicated eyewear device.

BACKGROUND ART

A display apparatus for displaying a stereoscopic video typically includes a display portion such as a liquid crystal panel or a PDP (plasma display panel) and a parallax barrier or a lenticular lens situated between the display portion and an observer. The display portion simultaneously displays a left image to be observed by the left eye and a right image to be observed by the right eye. The parallax barrier or lenticular lens separates image light emitted from the display portion to generate left image light, which corresponds to the left image and enters the left eye, and right image light, which corresponds to the right image and enters the right eye. Consequently, the observer may stereoscopically perceive a video displayed on the display portion without a dedicated eyewear device.

FIG. 51 is a schematic view of the aforementioned display apparatus 900 (c.f. "Autostereoscopic 3D Displays using Image-Splitter Method", Journal of The Institute of Image Information and Television Engineers, Vol. 51, No. 7, pp. 1070-1078, (1997)). The display apparatus 900 is described with reference to FIG. 51.

The display apparatus 900 includes a display panel 910 and a parallax barrier 920. The display panel 910 displays vertical strips (denoted by the symbol "L" in FIG. 51) representing a left image and other vertical strips (denoted by the symbol "R" in FIG. 51) representing a right image. The vertical strips of the left and right images are alternately arranged in the horizontal direction. The parallax barrier 920 includes barrier strips 921 which shield image light emitted from the display panel 910. The barrier strips 921 extend in the vertical direction, like the vertical strips. Openings 922 to allow transmission of the image light are formed between the barrier strips 921.

The left and right images represent contents which are different from each other by binocular parallax. Due to the binocular parallax set between the left and right images, the observer may composite a stereoscopic image from the left and right images.

When the observer faces the display apparatus 900 from an appropriate position, image light emitted from the vertical strips of the left image reaches the left eye of the observer whereas image light emitted from the vertical strips of the right image reaches the right eye of the observer. Meanwhile, the barrier strips 921 shield image light, which propagates towards the right eye of the observer from the vertical strips of the left image, and also shield image light which travels towards the left eye of the observer from the vertical strips of the right image. Consequently, the observer may appropriately observe a stereoscopic image displayed on the display apparatus 900.

The display apparatus 900 shown in FIG. 51 faces problems about interference fringes (moiré). Moiré is dependent on a relationship between a pattern of the openings 922 in the parallax barrier 920 and an arrangement pattern of pixels of the display apparatus 900. It is known that moiré conditions depend on a width and a shape of the openings 922 in the parallax barrier 920.

The display panel 910 includes a display surface on which images (the left and right images) are displayed. The display surface is formed by pixels arranged in a matrix pattern. The pixels typically include R sub-pixels which emit red light, G sub-pixels which emit green light, and B sub-pixels which emit blue light. If the display panel 910 is a liquid crystal panel or a PDP, the display surface includes a black matrix which is arranged along boundaries among the R, G and B sub-pixels to prevent mixture among the red, green and blue lights. It should be noted that in the case of a liquid crystal panel, the black matrix may be referred to as a rib.

The display panel 910 may include supporting electrodes which are superimposed on the aforementioned sub-pixels. The aforementioned black matrix and the supporting electrode cause dark regions on the sub-pixels. Therefore, through the openings 922, the observer may perceive relatively dark regions created at positions corresponding to the black matrix or the supporting electrodes and relatively bright regions without the black matrix and the supporting electrode. At specific observing positions from the display apparatus 900, the observer may recognize openings 922 where many bright regions are exposed as well as openings 922 where many dark regions are exposed. Consequently, the observer perceives an uneven luminance pattern (moiré) on the display surface. This means significantly degraded image quality.

FIG. 52A is a photograph showing a stepped barrier 923, which is exemplified as a parallax barrier, and a moiré pattern caused under usage of the stepped barrier 923. FIG. 52B is a photograph showing a slanted barrier 924, which is exemplified as a parallax barrier, and a moiré pattern caused under usage of the slanted barrier 924. A parallax barrier and a moiré pattern are described with reference to FIGS. 52A and 52B.

The stepped barrier 923 shown in FIG. 52A includes barrier portions 925 each of which has a stepped contour. Rectangular openings 926 arranged in a stepped manner are formed between the barrier portions 925. A display panel (not shown) is situated behind the stepped barrier 923. The display panel displays an overall white image over the entire display surface. The barrier portions 925 block emitted image light from the display surface whereas the image light is transmitted through the openings 926. It should be noted that a width (horizontal dimension) of the opening 926 is approximately equal to a width of each of the sub-pixels which form the display surface (opening ratio: 1).

A mixture ratio between a sub-pixel region and a black matrix region, which are observed through the openings 926, depends on an observing position of an observer. Accordingly, a moiré pattern in a grid is caused as shown in FIG. 52A.

A slanted barrier 924 shown in FIG. 52B includes barrier portions 927 each of which has a contour inclined from the vertical line. Continuous openings 928 inclined from the vertical line are formed between the barrier portions 927. A display panel (not shown) is situated behind the slanted barrier 924. The display panel displays an overall white image over the entire display surface. The barrier portions 925 block emitted image light from the display surface whereas the image light transmits through the openings 928. It should be noted that a width (horizontal dimension) of the opening 928 is approximately equal to a width of each of the sub-pixels which form the display surface (opening ratio: 1).

In comparison to the aforementioned stepped barrier 923, there is a small variation in the area of observed sub-pixels through the opening 928 of the slanted barrier 924 under variation of observing position of the observer. Therefore, the stepped barrier 923 causes moiré with less contrast than the stepped barrier 923 does. In particular, the observer is less likely to observe a moiré pattern extending in the horizontal direction. However, the slanted barrier 924 still causes a moiré pattern which is perceivable for the observer.

As described above, both of the stepped and slanted barriers 923, 924 cause moiré patterns which are visible to the observer. The moiré pattern becomes more noticeable when the display panel displays a two-dimensional image than when the display panel displays a stereoscopic image.

FIG. 53 is a schematic view of a barrier pattern proposed by Patent Document 1 (US Patent Application Publication No. 2005/0073472). Techniques disclosed in Patent Document 1 are described with reference to FIG. 53.

The techniques according to Patent Document 1 utilize a first plate 931, which has an opening pattern at first intervals, and a second plate 932, which has an opening pattern at second intervals. The second plate 932 is tilted at a predetermined angle with respect to the first plate 931 and overlaid on the first plate 931. According to Patent Document 1, moiré is reduced when the barrier pattern is tilted within a range of 20 to 30 degrees with respect to pixels.

The inclination of the barrier pattern with respect to the pixels reduces a resultant variation in an observed area of the pixels from a positional change of observation, which results in less noticeable moiré. However, unnecessary pixels are more likely to be exposed through the barrier pattern as the barrier pattern tilts. Therefore, crosstalk (a phenomenon in which a ghost image, a blurry image, or an unnatural image is observed because of a left image being observed by both of the left and right eyes) is more likely to happen.

FIG. 54 is a schematic view of a parallax barrier 940 disclosed in Patent Document 2 (U.S. Pat. No. 7,268,943). The conventional parallax barrier 940 is described with reference to FIG. 54.

Openings 941 extending in the vertical direction are formed in the parallax barrier 940. In FIG. 54, an interval between the openings 941 is denoted by the symbol "S". The parallax barrier 940 includes zigzag contour portions 942 which define a shape of the opening 941. The contour portions 942 form protrusions 943 which protrude toward the center line of the opening 941. The protrusions 943 are periodically arranged in the vertical direction to form a tooth profile.

The openings 941 with the tooth profile sufficiently mix a region of pixels exposed through the openings 941 (a relatively bright region) with a region of a black matrix exposed through the openings 941 (a relatively dark region), which results in decreased moiré. On the other hand, since the openings 941 have a large area, crosstalk becomes noticeable. Therefore, an observer is likely to observe blurry images. In addition, because of the large area of the openings 941, the tooth profile defined by the contour portion 942 may deteriorate image quality although it depends on a number of viewpoints defined by the parallax barrier 940.

FIG. 55 is a schematic view of a parallax barrier with various openings disclosed in Patent Document 3 (WO 2010/007787). The parallax barrier according to Patent Document 3 is described with reference to FIG. 55.

The parallax barrier according to Patent Document 3 defines several viewpoints. The parallax barrier according to Patent Document 3 has various openings shaped by a zigzag pattern or a curved pattern. Since the openings are shaped by elliptical arc curves, left and right images, which are adjacent to each other, become mixed. Accordingly, for example, if the parallax barrier defines first to fourth viewpoints, a feeling of strangeness felt by an observer is reduced at a jump point where the first viewpoint is switched to the fourth viewpoint. However, since the mixture of the left and right images means crosstalk growth, the observer may observe significantly blurry images.

The aforementioned various techniques reduce moiré contrast but increase crosstalk. In short, there is a tradeoff between moiré contrast and crosstalk.

SUMMARY OF THE INVENTION

An object of the present invention is to provide techniques for reducing moiré intensity without an significant increase in crosstalk.

A display apparatus according to one aspect of the present invention includes: a display portion which displays a first image and a second image different from the first image to create a stereoscopic image by means of display elements; a separator situated away from the display portion and configured to separate the first and second images from each other; and an adjuster configured to adjust a shape of the separator. The separator includes a barrier portion which blocks image light emitted from the display portion. The barrier portion includes a contour portion which defines a shape of at least one opening that allows transmission of the image light. The contour portion includes a first contour and a second contour facing the first contour. The first and second contours define a continuous opening region which is inclined at a predetermined angle from the vertical line. At least one of the first and second contours forms protrusions which periodically protrude toward the opening region. Shapes of the protrusions are heterogeneous.

The display apparatus according to the present invention may reduce moiré intensity without significantly increasing crosstalk.

BRIEF DESCRIPTION OF THE DRAWINGS

FIG. 1 is a schematic block diagram of a display apparatus according to the first embodiment.

FIG. 2 is a schematic view of a slanted barrier which may be utilized as a separator of the display apparatus shown in FIG. 1.

FIG. 6 is a schematic view of an evaluation test for setting a vertical period width of a notched structure.

FIG. 7 is a table representing evaluation criteria for an estimation image about a moiré pattern.

FIG. 8A is a table representing evaluation results of an estimation image about a moiré pattern.

FIG. 8B is a table representing evaluation results of an estimation image about a moiré pattern.

FIG. 21 is a schematic view of a slanted barrier which may be utilized as a separator of the display apparatus shown in FIG. 18.

FIG. 25 is a conceptual view of data output to a parameter adjuster of the display apparatus shown in FIG. 24.

FIG. 26 is a schematic block diagram of a parameter adjuster of the display apparatus shown in FIG. 24.

FIG. 51 is a schematic view of a conventional display apparatus.

FIG. 55 is a schematic view of a conventional barrier pattern.

DETAILED DESCRIPTION OF THE INVENTION

Figure 3A:
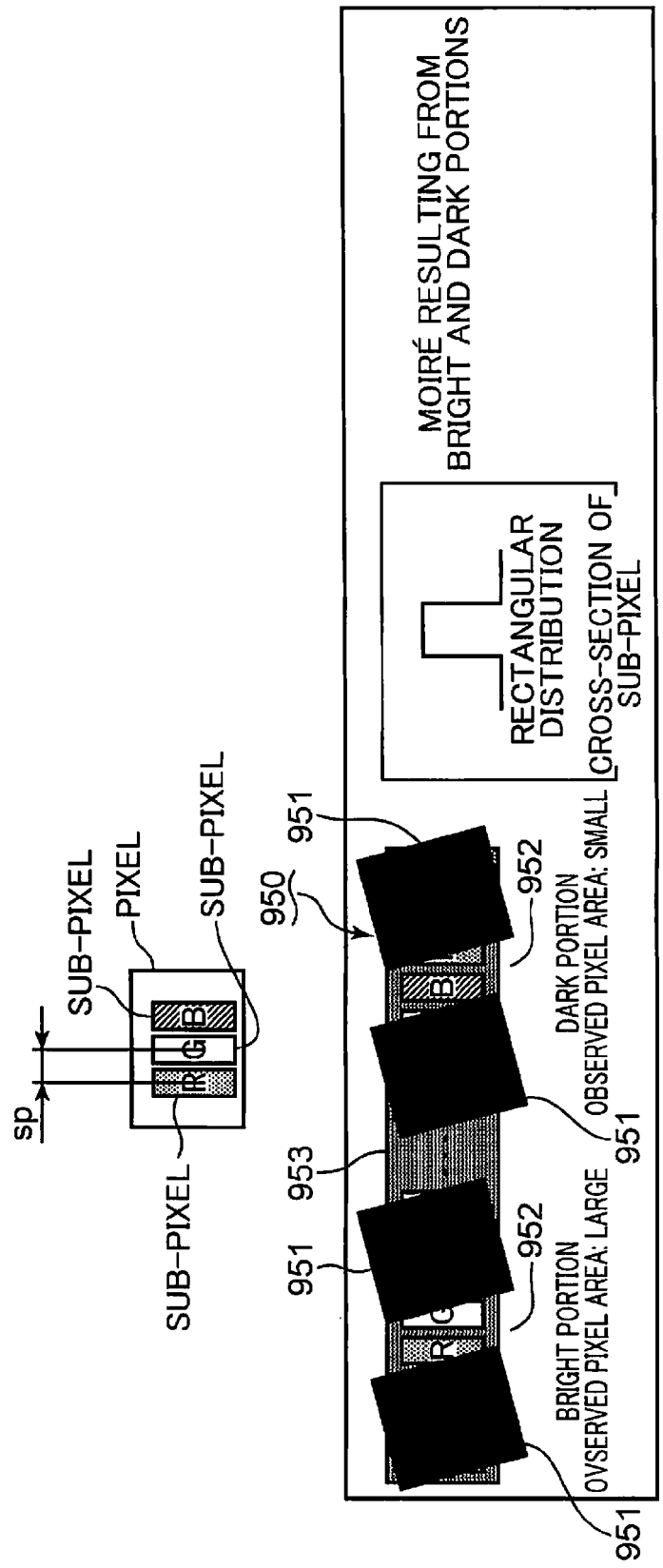
FIG. 3A is a conceptual view of a transmission pattern of image light transmitted through a slanted barrier.

Various display apparatuses for displaying high quality images are described with reference to the drawings. It should be noted that in the following various embodiments, similar components are denoted by similar reference numerals. In addition, redundant descriptions are omitted as appropriate for the purpose of clarifying concepts of display apparatuses. Configurations, arrangements and shapes shown in the drawings as well as the descriptions related to the drawings are simply intended to makes principles of the present embodiment easily understood. Therefore, the principles of the present embodiment are in no way limited to them.

First Embodiment

A notched structure formed at a periphery of an opening of a parallax barrier is described in the context of the first embodiment. The notched structure is formed with protrusions which periodically protrude toward the central axis of the opening. The protrusions form symmetrical contours with respect to the central axis of the opening. A period of the protrusions is appropriately determined in consideration of inconveniences resulting from a notched structure. Therefore, the display apparatus described in the context of the first embodiment may appropriately control a blur or a range of pixels observed through the opening by means of the parallax barrier.

(Display Apparatus)

FIG. 1 is a schematic block diagram of the display apparatus 100 according to the first embodiment. The display apparatus 100 is described with reference to FIG. 1.

The display apparatus 100 includes an initial adjuster 110, a notch adjuster 120, a barrier adjusting circuit 130, a display circuit 140, a display portion 150, a separator 160, and a storage medium 170. The initial adjuster 110 performs initial adjustments to the notch adjuster 120, the barrier adjusting circuit 130 and the display circuit 140. The storage medium 170 stores image data about parallax images which include left images to be observed by the left eye and right images to be observed by the right eye. The image data are transmitted from the storage medium 170 to the display circuit 140. The display circuit 140 processes the image data to generate drive signals. The drive signals are transmitted from the display circuit 140 to the display portion 150. The display portion 150 displays a parallax image (2D) in response to the drive signals. In the present embodiment, one of the left and right images is exemplified as the first image. The other of the left and right images is exemplified as the second image.

The separator 160 may be a parallax barrier which is situated away from the display portion 150. Image light which represents a parallax image is emitted from the display portion 150 to the separator by means of pixels or sub-pixels. The separator 160 includes a barrier portion which blocks the image light. Openings are formed on the barrier portion to allow transmission of the image light. Therefore, the image light may reach the eyes of an observer through the opening. The separator 160 is formed so that image light corresponding to a left image is incident to the left eye whereas image light corresponding to a right image is incident to the right eye of the observer at a predetermined position. In addition, the separator 160 is formed so that the barrier portion blocks the image light of the right image which propagates toward the left eye and the image light of the left image which propagates toward the right eye. Therefore, the separator 160 may appropriately separate the image light into the image lights corresponding to the left and right images to provide the observer with the left and right images. Since the left and right images are different from each other by binocular parallax, the observer may perceive a parallax image displayed on the display portion 150 as a stereoscopic image. In the present embodiment, the pixels and/or sub-pixels are exemplified as the display elements.

The separator 160 may be a fixed barrier member which is formed from a thin film or a highly-transparent material (e.g. glass). Alternatively, the separator 160 may be a barrier apparatus (e.g. a TFT liquid crystal panel) which may vary parameters such as a shielding position, a shielding area, an opening position and an opening area under application of voltage.

The barrier adjusting circuit 130 adjusts a distance and position of the separator 160 from the display portion 150. The notch adjuster 120 determines and adjusts a period of the protrusions. As described below, an adjustment to the period of the protrusions changes shapes of the protrusions. In the present embodiment, the notch adjuster 120 is exemplified as the adjuster.

The initial adjuster 110 adjusts the notch adjuster 120, the barrier adjusting circuit 130 and the display circuit 140 once the display apparatus 100 starts displaying images or once the display apparatus 100 is placed in a usage environment. If the separator 160 is an active parallax barrier such as a TFT liquid crystal panel, the initial adjuster 110 adjusts parameters such as an interval between openings, widths of the openings, and a distance from the display portion 150 to the separator 160 on the basis of an observing position, which is determined in advance as an optimum viewing distance. The initial adjuster 110 may perform positional control on the openings and the barrier portion of the separator 160 every pixel or sub-pixel. If the separator 160 is a fixed barrier member, the initial adjuster 110 may adjust a distance between the display portion 150 and the separator 160, and an inclination angle of the separator 160 with respect to the display portion 150. A predetermined adjustment image may be used in the adjustment to the separator 160 by the initial adjuster 110.

During the aforementioned adjustment operation by the initial adjuster 110, evaluation and adjustment work for stereoscopic images to be observed may be performed by means of a test image. An observer at an optimum observing distance may observe the test image to evaluate visibility and a degree of blur/fusion of a stereoscopic image. The observer may use the display circuit 140 to tune gradation characteristics. Optionally, the observer may adjust a parallax image to change a parallax amount between left and right images (e.g. intensity control or adjustment to a horizontal shift amount by means of a linear coefficient).

(Separator)

Figure 52A:
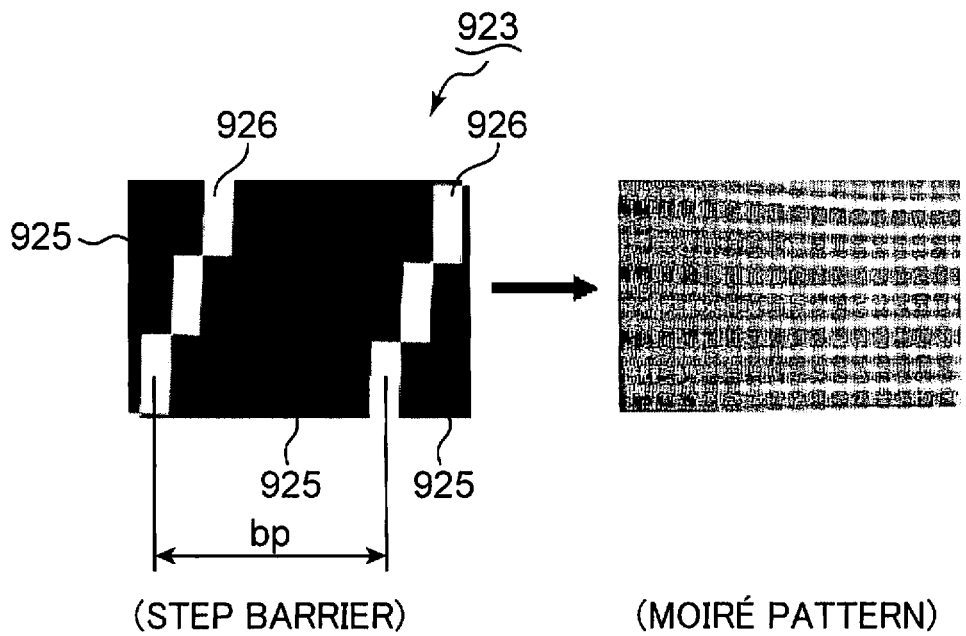
FIG. 52A is a photograph showing a stepped barrier, which is exemplified as a parallax barrier, and a moiré pattern caused under usage of the stepped barrier.

The separator 160 is described with reference to FIGS. 1, 52A and 52B.

As described above, the separator 160 includes openings and a barrier portion. Like the separator 160, the stepped barrier 923 shown in FIG. 52A and the slanted barrier 924 shown in FIG. 52B are known as members functioning to separate image light of a left image from image light of a right image.

The stepped barrier 923 includes openings 926 approximately as large as sub-pixels. The openings 926 are arranged in a stepped pattern. The slanted barrier 924 includes openings 928 which are inclined from the vertical line. In the following description, an interval between the openings (the openings 926, 928) on the same horizontal line is referred to as "barrier pitch". A dimension value of the barrier pitch is denoted by the symbol "bp".

A barrier pitch is geometrically determined on the basis of a few factors such as a pixel pitch (a distance between adjacent pixels), a distance between a display panel, which displays images, and a barrier member (the stepped or slanted barrier 923, 924), and a parallax number. Width dimensions of the openings 926, 928 are important for horizontal parallax. A moiré pattern is reduced by appropriately adjusting the width dimensions of the openings 926, 928. However, since there is a tradeoff between a moiré pattern and crosstalk (blurring of an image) resulting from mixture of adjacent left and right images as described above, a reduction in a moiré pattern results in an increase in crosstalk.

FIG. 2 is a schematic view of a slanted barrier 200 which may be utilized as the separator 160. The slanted barrier 200 is described with reference to FIGS. 1 and 2.

The slanted barrier 200 includes a barrier portion 210 which blocks image light emitted from the display portion 150. Openings 230 are formed on the barrier portion 210 to allow transmission of the image light. The openings 230 are inclined and extended continuously at the angle "θ" from the vertical line VL.

The barrier portion 210 includes contour portions 220 which define shapes of the openings 230. The contour portion 220 includes a left contour 221 formed on the left of the center line CL of the openings 230 and a right contour 222 formed on the right of the center line CL of the openings 230. The right contour 222 faces the left contour 221. In the present embodiment, the left contour 221 may be exemplified as the first contour. The right contour 222 may be exemplified as the second contour.

The left contour 221 defines left protrusions 211 which periodically protrude toward the center line CL. The right contour 222 defines right protrusions 212 which periodically protrudes toward the center line CL. In the present embodiment, the left and right protrusions 211, 212 are triangular. Alternatively, the left and right protrusions may have other shapes.

The left protrusion 211 includes left peaks 213 which are sharpened toward the center line CL. The right protrusion 212 includes right peaks 214 which are sharpened toward the center line CL. The virtual line PLL connecting the left peaks 213 is approximately parallel to the center line CL. The virtual line PLR connecting the right peaks 214 is approximately parallel to the center line CL.

The opening 230 includes an opening region 231 between the virtual lines PLL, PLR, left notched regions 232 formed between adjacent left protrusions 211, and right notched regions 233 formed between adjacent right protrusions 212. The opening region 231 is a rectangular region continuously extending along the center line CL which is inclined at an angle "θ" from the vertical line VL. The left notched regions 232 are triangular regions formed between the left protrusions 211 which protrude toward the opening region 231. The right notched regions 233 are triangular regions formed between the right protrusions 212 which protrude toward the opening region 231. In the present embodiment, the left and right protrusions 211, 212 are exemplified as protrusions.

In the following description, a periodic concavo-convex structure formed in left or right edge region of the opening 230 is referred to as "notched structure". The left protrusions 211 and the left notched regions 232 which form a notched structure are alternately aligned along the opening 230. The right protrusions 212 and the right notched regions 233 which form a notched structure are alternately aligned along the opening 230. The notched structures are designed to reduce moiré contrast without unnecessarily increasing crosstalk.

The left contour 221 includes left troughs 215 which define peaks of the left notched regions 232. The right contour 222 includes right troughs 216 which define peaks of the right notched regions 233. The left and right troughs 215, 216 approximately align on the horizontal line HL. Likewise, the left and right peaks 213, 214 also approximately align on the horizontal line HL.

In FIG. 2, a distance between the left and right troughs 215, 216 aligned on the horizontal line HL is referred to as "maximum opening width". The maximum opening width is denoted by the symbol "hmax" in FIG. 2.

In FIG. 2, a distance between the left and right peaks 213, 214 aligned on the horizontal line HL is referred to as "minimum opening width". The minimum opening width is denoted by the symbol "hmin" in FIG. 2.

A width dimension of the opening 230 periodically and linearly varies between the maximum and minimum opening widths. FIG. 2 shows an intersection C of the horizontal line HL, which connects the left and right troughs 215, 216, with the center line CL of the opening 230. The left and right notched regions 232, 233 are point-symmetrical with respect to the intersection C.

In FIG. 2, an angle between a lower contour of the right or left protrusion 212, 211 and the horizontal line HL is denoted by the symbol "φ".

In the following description, a vertical distance between adjacent left peaks 213, a vertical distance between adjacent left troughs 215, a vertical distance between adjacent right peaks 214 or a vertical distance between adjacent right troughs 216 is referred to as "vertical period width of a notched structure". In FIG. 2, the vertical period width of the notched structure is denoted by the symbol "dsv".

In the following description, a horizontal distance between the left virtual line PLL and the left troughs 215 or between the right virtual line PLR and the right troughs 216 is referred to as "horizontal height of notched structure". In FIG. 2, the horizontal height of the notched structure is denoted by the symbol "dwh".

In the following description, a distance between adjacent pixels is referred to as "pixel pitch". A dimension value of a pixel pitch is denoted by the symbol "p".

In the following description, a number of the left or right protrusions 211, 212 within one pixel pitch is referred to as "number of divisions". The number of divisions is denoted by the symbol "n".

The vertical period width "dsv" of a notched structure may be expressed as the following equation.

$$dsv = \frac{p}{n} \quad \text{[Expression 1]}$$

In the following description, a distance between adjacent left peaks 213, a distance between adjacent left troughs 215, a distance between adjacent right peaks 214 or a distance between adjacent right troughs 216 is referred to as "period width of notched structure". In the following description, the period width of a notched structure is denoted by the symbol "ds". The period width of a notched structure may be expressed as the following equation.

$$ds = \frac{p}{n \times \cos\theta} \quad \text{[Expression 2]}$$

In the present embodiment, a pixel may include three sub-pixels (an R sub-pixel which emits red light, a G sub-pixel which emits green light, and a B sub-pixel which emits blue light). In the following description, a distance between adjacent sub-pixels is referred to as "sub-pixel pitch". A dimension value of a sub-pixel pitch is denoted by the symbol "sp". The following equation represents a relationship between the pixel pitch "p" and the sub-pixel pitch "sp". In this case, since a pixel includes three sub-pixels (R, G and B sub-pixels) and has a uniform pixel structure, the vertical pitch p of sub-pixels is expressed as the following equation.

$$p = 3 \times sp \quad \text{[Expression 3]}$$

The horizontal height "dwh" of a notched structure may be expressed as the following equation.

$$dwh = 0.5 \times dsv \times \left(\frac{1}{\tan\theta} + \tan\phi\right) \quad \text{[Expression 4]}$$

The principles of the present embodiment are described on the basis of the slanted barrier 200 with a notched structure. The principles of the present embodiment may be applied to an ordinary vertical stripe barrier which has openings extending in the vertical direction.

Figure 3B:
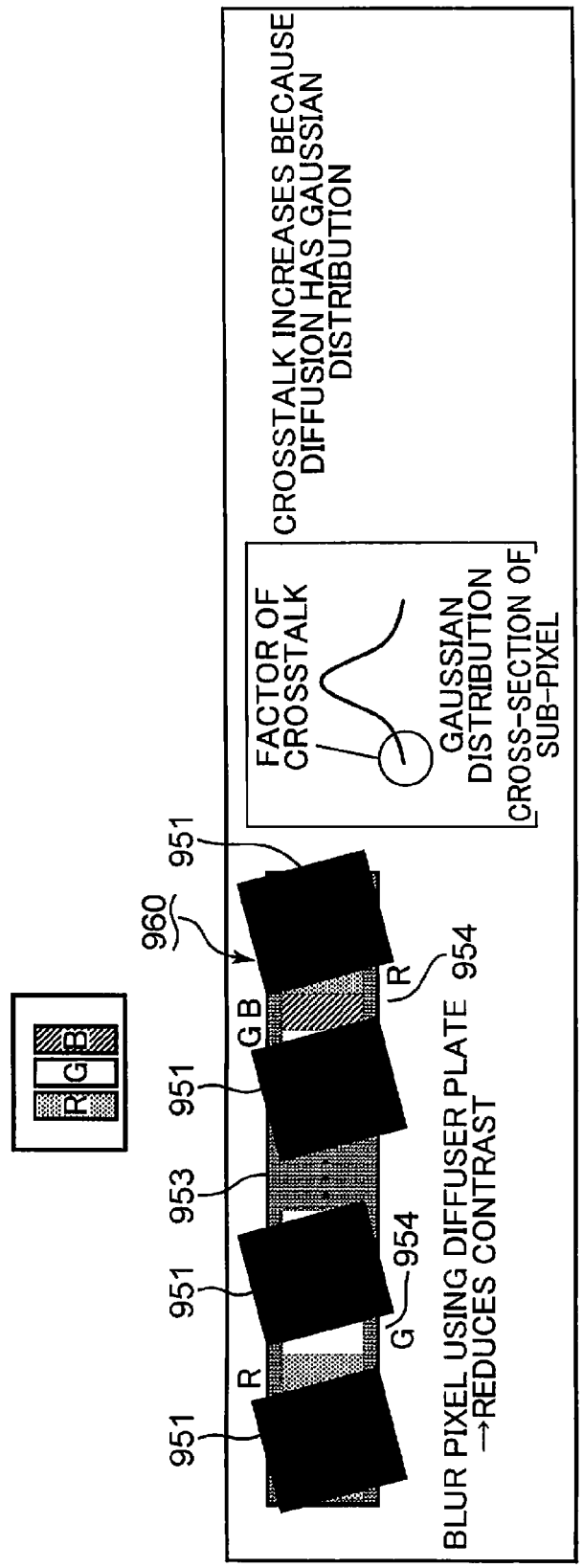
FIG. 3B is a conceptual view of a transmission pattern of image light transmitted through a slanted barrier.
Figure 3C:
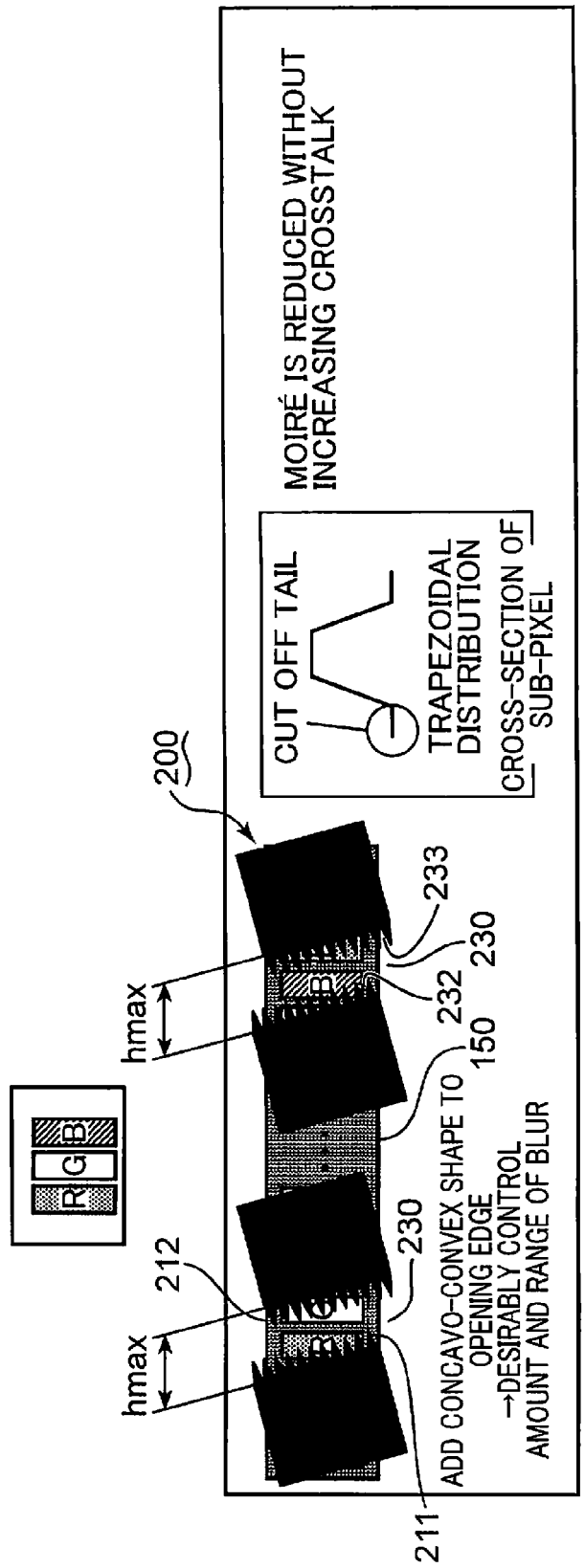
FIG. 3C is a conceptual view of a transmission pattern of image light transmitted through a slanted barrier.

FIGS. 3A to 3C are conceptual views of transmission patterns of image light transmitted through various slanted barriers. Effects of the aforementioned notched structure are described with reference to FIGS. 2 to 3C and 52B.

Figure 52B:
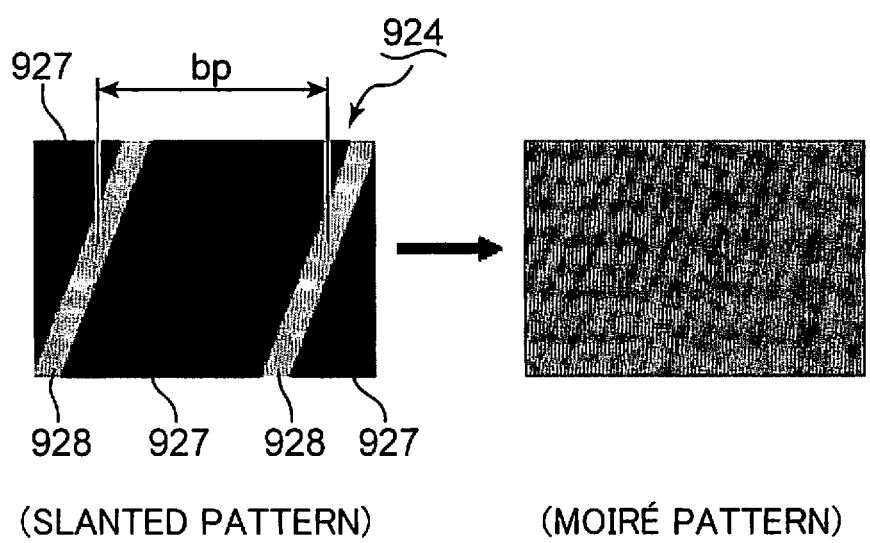
FIG. 52B is a photograph showing a slanted barrier, which is exemplified as a parallax barrier, and a moiré pattern caused under usage of the slanted barrier.
Figure 53:
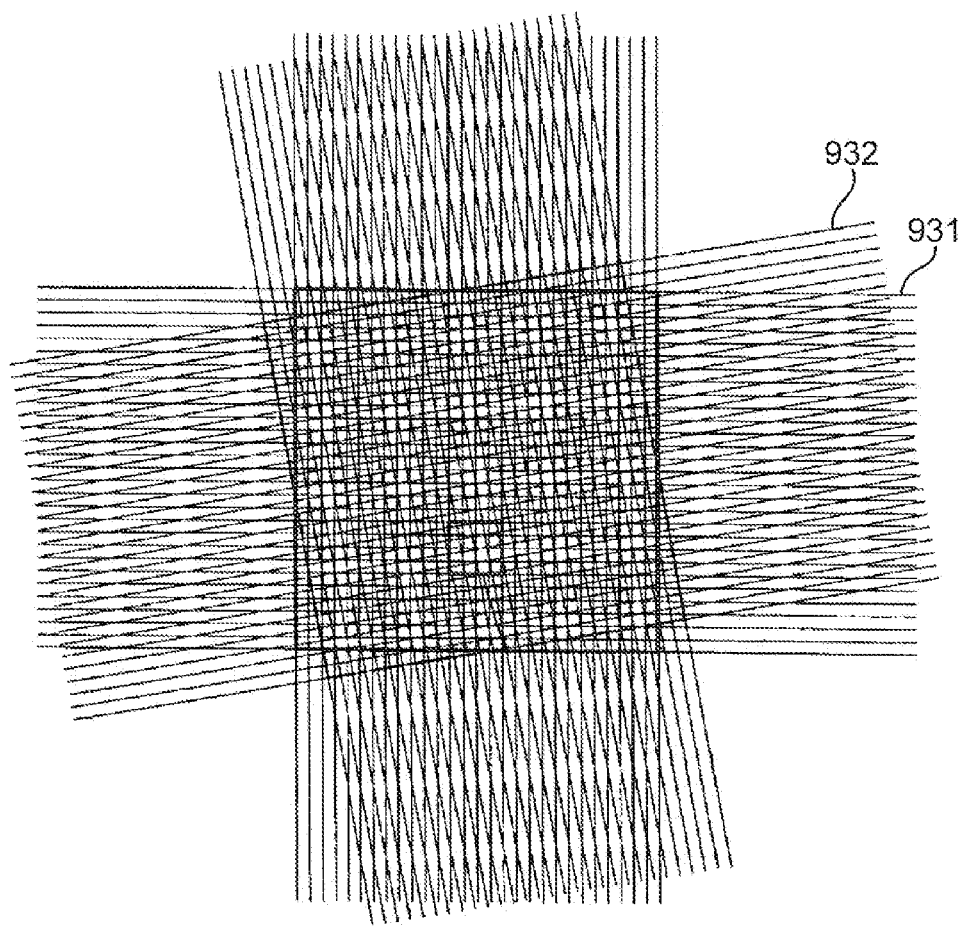
FIG. 53 is a schematic view of a conventional barrier pattern.
Figure 54:
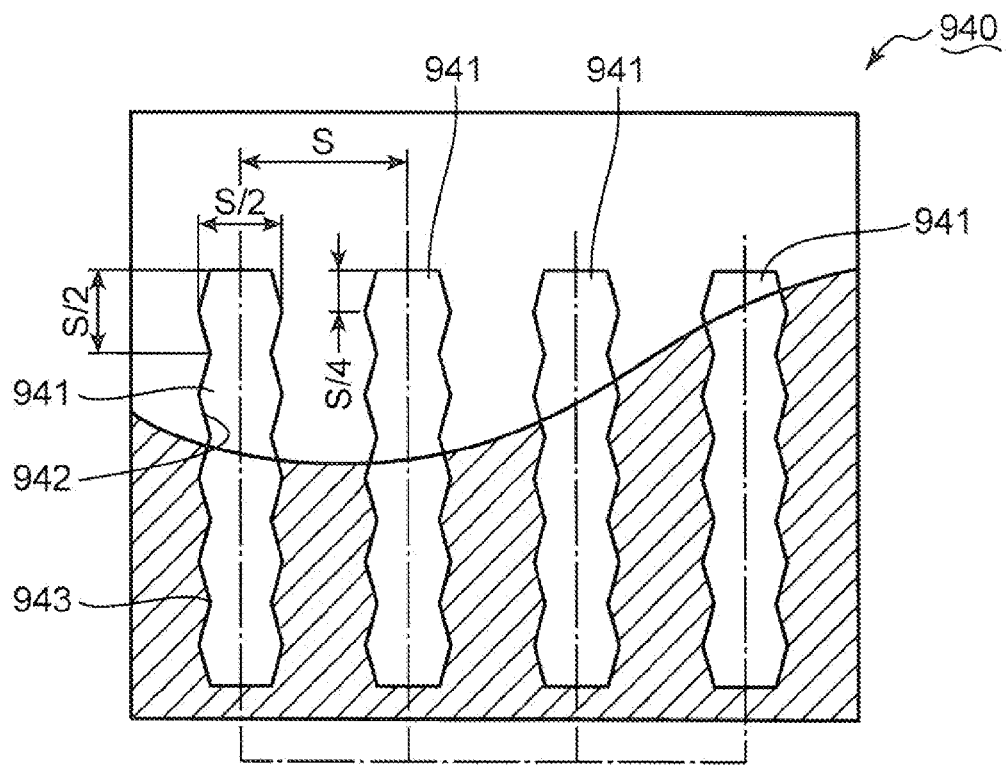
FIG. 54 is a schematic view of a conventional barrier pattern.

FIG. 3A is a conceptual view of a transmission pattern of image light transmitted through the slanted barrier 950 which has a striped structure as shown in FIG. 52B.

The slanted barrier 950 includes horizontally aligned barrier portions 951. Openings 952 are formed between adjacent barrier portions 951.

A display surface 953 formed with pixels is situated behind the slanted barrier 950. Each pixel includes three sub-pixels (an R sub-pixel which emits red light, a G sub-pixel which emits green light, and a B sub-pixel which emits blue light).

The barrier pitch "bp" is designed so that image light representing a left image is incident to the left eye of an observer whereas image light representing a right image is incident to the right eye of the observer when the observer observes an image displayed on the display surface 953 from an appropriate observing position. Generally, the barrier pitch "bp" is determined so as to satisfy the following inequality. In the following inequality, the symbol "N" denotes the parallax number.

$$bp < N \times sp \quad \text{[Expression 5]}$$

As represented by the aforementioned inequality, the barrier pitch "bp" is designed so as to be slightly smaller than the sub-pixel pitch "sp" multiplied by the parallax number. It should be noted that the sub-pixel pitch "sp" may be defined as the distance between a pair of vertical lines which pass through the centers of adjacent sub-pixels. Therefore, an area of sub-pixels exposed through the opening 952 varies in the horizontal direction. When an area of sub-pixels exposed through the opening 952 is large, a bright region is created. When the area of sub-pixels exposed through the opening 952 is small, a dark region is created. Therefore, the slanted barrier 950 shown in FIG. 3A causes a bright-dark pattern. An observer observes the bright-dark pattern as the moiré. A luminance difference between the bright and dark regions may be defined as the moiré intensity.

FIG. 3B is a conceptual view of a transmission pattern of image light transmitted through the slanted barrier 960 which has a striped structure as shown in FIG. 52B.

Like the slanted barrier 950 described with reference to FIG. 3A, the slanted barrier 960 includes barrier portions 951. The slanted barrier 960 further includes diffusers 954 which cover openings formed between the barrier portions 951.

The display surface 953 is situated behind the slanted barrier 960. Image light emitted from the display surface 953 is transmitted through the diffuser 954 and reaches the observer. The diffuser 954 may be an ordinary diffuser plate or a diffusing film which diffuses image light. The diffuser 954 diffusing the image light may reduce a contrast of a bright-dark pattern resulting from a black matrix (not shown) or a supporting electrode (not shown) on the display surface 953. In addition, since the diffuser 954 reduces a luminance difference between the bright and dark regions described with reference to FIG. 3A, the observer is less likely to observe moiré. It should be noted that the black matrix refers to partitions between emitting pixels in the case of a PDP and corresponds to a rib portion in the case of an LCD. Similar concepts about notches may be applied to panels having black regions in or around a pixel. A PDP is taken as an example.

A graph shown in FIG. 3B represents a schematic intensity distribution of light transmitted through the diffuser 954 from a sub-pixel. Since the diffuser 954 diffuses image light to cause a Gaussian light intensity distribution, the diffuser 954 may blur a parallax image to increase crosstalk. Therefore, the slanted barrier 960 is unsuitable in terms of image quality.

FIG. 3C is a conceptual view of a transmission pattern of image light transmitted through the slanted barrier 200 described with reference to FIG. 2.

The display portion 150 is situated behind the slanted barrier 200. With respect to the slanted barrier 200, the barrier pitch "bp" and the sub-pixel pitch "sp" satisfy the relationship described with reference to FIG. 3A (i.e. the relationship represented by Expression 5). Therefore, a sub-pixel area in a region on the display portion 150 corresponding to a region denoted by the maximum opening width "hmax" varies in response to a horizontal position.

Like the left opening 952 which forms a bright region as described with reference to FIG. 3A, two sub-pixels are exposed through the left opening 230 in FIG. 3C. Since the left and right protrusions 211, 212 partially cover the sub-pixels, luminance is reduced.

Like the right opening 952 which forms a dark region as described with reference to FIG. 3A, a B sub-pixel is exposed through the right opening 230 in FIG. 3C. Since the left and right notched regions 232, 233 partially expose R and G sub-pixels adjacent to the B sub-pixel, luminance is increased. Therefore, the slanted barrier 200 causes less moiré than the slanted barrier 950 does. Depending on a design of a notched structure, a degree and a range of blur of an observed image are also controlled. For example, a notched structure may be designed so that a trapezoidal light intensity distribution is obtained by cutting off left and right ends of the light intensity distribution shown in FIG. 3A.

Figure 4:
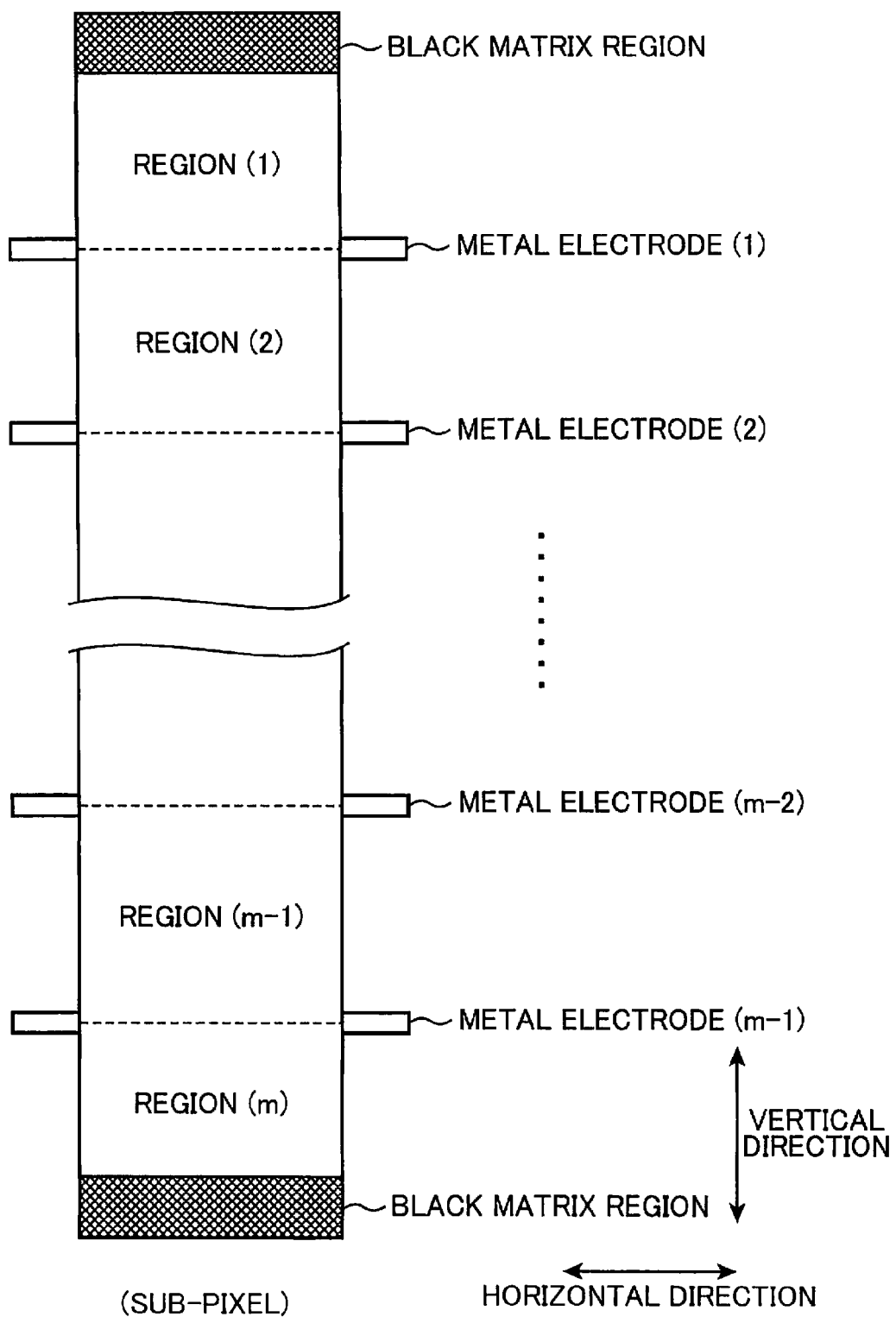
FIG. 4 is a schematic view of a sub-pixel.

FIG. 4 is a schematic view of a sub-pixel. A relationship between a number of divisions "n" of a notched structure and sub-pixel region division is described with reference to FIGS. 1 and 4.

The display portion 150 includes metal electrodes for applying voltage to the sub-pixel and two black matrix regions situated above and below the sub-pixel. The metal electrodes shown in FIG. 4 horizontally extend across the sub-pixel. The metal electrodes are aligned in the vertical direction. FIG. 4 shows (m−1) number of the metal electrodes. Regions in the sub-pixel partitioned by the metal electrodes are exemplified as the regions.

The sub-pixel is divided into m-number of regions by the (m−1) number of metal electrodes. The m-number of regions are aligned in the vertical direction.

According to the present inventors, an optimum value of the period width "dsv" depends on a division structure of a sub-pixel although it is considered that a small value for the vertical period width "dsv" of a notched structure is suitable in order to obtain the aforementioned moiré reduction effect. As shown in FIG. 4, if a sub-pixel is divided into m-number of regions, and if a number of divisions "n" of a notched structure is set to a close value to a condition expressed by the following equation, there may be significantly decreased moiré. It should be noted that in the following equation, the symbol "k" denotes a natural number greater than 1 (k>1).

$$n = k \times m \quad \text{[Expression 6]}$$

Black matrix regions and metal electrodes cause dark regions. Other regions of a sub-pixel become a bright region. In the following equation, the symbol "nn" denotes a total number of the dark and bright regions. In the following description, the total number of the dark and bright regions is referred to as "bright-dark number".

Number of dark regions = $(m-1)+2$

Number of bright regions = $m$ $$nn = m + (m-1) + 2 = 2m+1 \quad \text{[Expression 7]}$$

Figure 5A:
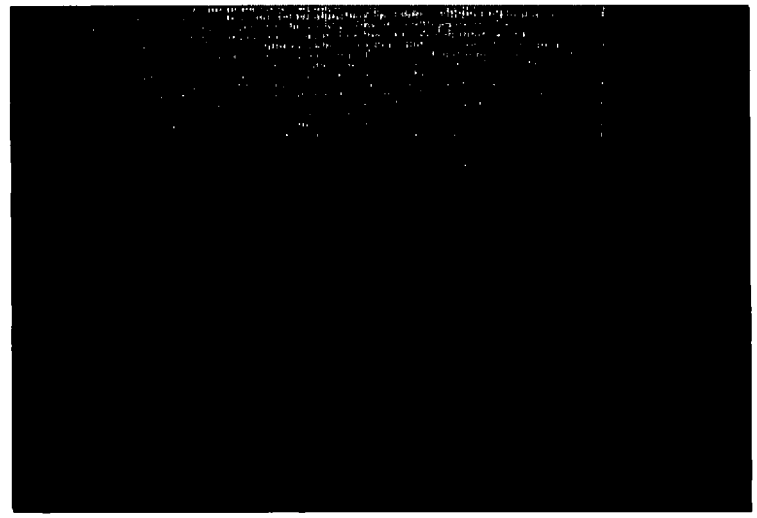
FIG. 5A is a photograph of a moiré pattern obtained from a slanted barrier.
Figure 5B:
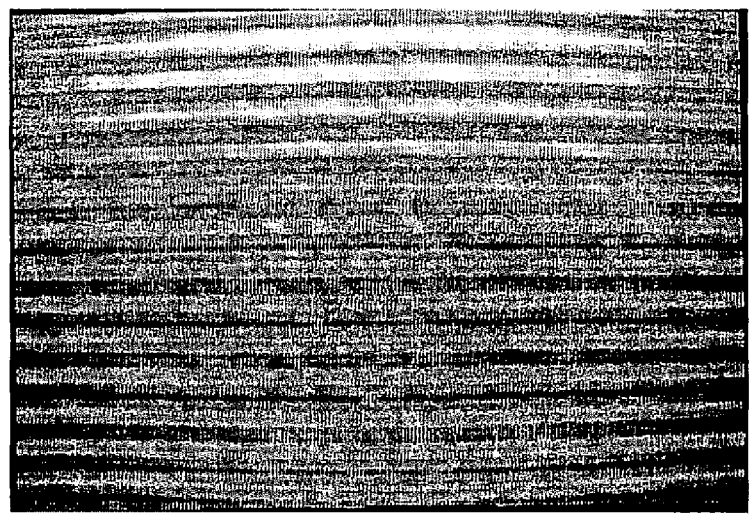
FIG. 5B is a photograph of a moiré pattern obtained from a slanted barrier.

FIGS. 5A and 5B are photographs of moiré patterns obtained from a slanted barrier designed under the aforementioned conditions. A design of a slanted barrier is described with reference to FIGS. 5A and 5B.

Diagonal moiré stripes shown in FIG. 52B are decreased under usage of a slanted barrier with a notched structure. However, horizontal stripes are still observed.

FIG. 5A is a photograph of a moiré pattern observed when a number of divisions "n" of a notched structure is set to a greater value than the bright-dark number "nn". It should be noted that when the number of divisions "n" of a notched structure is set to a greater value than the bright-dark number "nn", the vertical period width "dsv" of a notched structure has a small value. In this case, fine horizontal stripes are observed.

FIG. 5B is a photograph of a moiré pattern observed when the number of divisions "n" of a notched structure is set to a smaller value than the bright-dark number "nn". It should be noted that when the number of divisions "n" of a notched structure is set to a smaller value than the bright-dark number "nn", the vertical period width "dsv" of a notched structure has a large value. In this case, coarse horizontal stripes are observed.

The observation results of the moiré patterns shown in FIGS. 5A and 5B reveal that the relationship between a notched structure and a structure of a pixel causes horizontal stripes. Therefore, it is necessary to appropriately set the vertical period width "dsv" (μm) of a notched structure.

FIG. 6 is a schematic view of an evaluation test for setting the vertical period width "dsv" of a notched structure. An evaluation test for setting the vertical period width "dsv" of a notched structure is described with reference to FIGS. 1, 2 and 6. It should be noted that a simulated moiré pattern estimation image is used in the present evaluation test. Alternatively, an actually observed image may be used for the evaluation test. In this case, an apparatus (e.g. a liquid crystal barrier) may be required for performing voltage application control to control a position or a width of an opening. An efficient evaluation test may be carried out under usage of simulated moiré pattern estimation images.

Before the evaluation test, the initial adjuster 110 appropriately sets a preferred viewing distance "dlen", a distance between the display portion 150 and the separator 160 (the slanted barrier), a pixel pitch "p", a sub-pixel pitch "sp" and a parallax number "N". In the present evaluation test, certain values were respectively assigned to the inclination angle "θ" of the opening 230 from the vertical line VL, an angle "φ" between a lower contour of the right or left protrusion 212, 211 and the horizontal line HL, a horizontal height "dwh" of a notched structure, a minimum opening width "hmin" and a maximum opening width "hmax". Therefore, slanted barriers were prepared with varied vertical period widths "dsv" of a notched structure among various design parameters of a notched structure.

FIG. 6 shows an observing position U (Xc, Yc). In the present evaluation test, a moiré pattern observed from the observing position U (Xc, Yc) was estimated. The aforementioned slanted barriers define eight parallaxes. The numbers attached onto the sub-pixels in FIG. 6 correspond to viewpoints. The opening 230 is inclined so as to be coincident with an arrangement angle of the sub-pixels according to the viewpoints (incline: 3:1). Therefore, the inclination angle "θ" of the opening 230 from the vertical line VL is "18.435 degrees".

(Step 1)

A sub-pixel existing at an arbitrary coordinate position (i, j) on a screen, which is formed by sub-pixels arranged in a matrix pattern, is specified as a target sub-pixel. The target sub-pixel is subdivided. Coordinates (is(kk), js(kk)) (kk=1, . . . , nn) are assigned to subdivided regions. It is identified whether the a coordinate (is(kk), js(kk)) is in a non-emitting region (i.e. a dark region (a region corresponding to a black matrix (rib) or a metal electrode)) or an emitting region (i.e. a bright region), and then area sizes of the dark and bright regions are calculated.

In the following description, the term "Value" is used as a result value representing the identification result of the dark and bright regions.

The result value "Value" is initialized. Accordingly, the result value "Value" is set to "0.0".

If a region existing at a coordinate (is(kk), js(kk)) is observed through the slanted barrier, and if the coordinate (is(kk), js(kk)) exists in the dark region, the result value "Value" is maintained. Therefore, a region corresponding to the coordinate (is(kk), js(kk)) is processed as a region which does not contribute to a brightness of the target sub-pixel.

If a region existing at a coordinate (is(kk), js(kk)) is observed through the slanted barrier, and if the coordinate (is(kk), js(kk)) exists in the bright region, a value of "1.0" is added to the result value "Value". Therefore, a region corresponding to the coordinate (is(kk), js(kk)) is processed as a region which contributes to the brightness of the target sub-pixel.

Unless a region existing at a coordinate (is(kk), js(kk)) is observed through the slanted barrier, the result value "Value" is maintained. In other words, regardless of a region (a dark or bright region) in which a coordinates (is(kk), js(kk)) is contained, a region corresponding to the coordinates (is(kk), js(kk)) is processed as a region which does not contribute to a brightness of the target sub-pixel.

A number "Total" of coordinates (is(kk), js(kk)) set at the target sub-pixel is counted without taking the slanted barrier into consideration. A transform coefficient "Tk" is calculated so that "Total" corresponds to the maximum brightness "255.0" of the target sub-pixel. The transform coefficient "Tk" is used to transform the aforementioned result value "Value" to a brightness "Yval" of the target sub-pixel observed through the slanted barrier. The following equation is used to calculate the brightness "Yval" of the target sub-pixel.

$$Yval = \frac{\text{Value}}{\text{Total}} \times 1.0 = \text{Value} \times 1.0 \qquad \text{[Expression 8]}$$

(Step 2)

The screen is scanned for a series of the processes in "Step 1". Accordingly, "Yval" is calculated for all sub-pixels in the screen.

FIG. 7 is a table representing evaluation criteria for an estimation image about a moiré pattern obtained through the aforementioned processes of Steps 1 and 2.

If few horizontal stripes are observed, a value of "0" is assigned as the evaluation value. If horizontal stripes are observed, a value of "1", "2" or "3" is assigned as the evaluation value. If narrow horizontal stripes are observed, a value of "1" is assigned as the evaluation value. If wide horizontal stripes are observed, a value of "3" is assigned as the evaluation value. A value of "2" is assigned as the evaluation value to horizontal stripes in intermediate width between the horizontal stripes to which a value of "1" is assigned and the horizontal stripes to which a value of "3" is assigned.

If vertical stripes are observed, a value of "4" is assigned as the evaluation value. If diagonal stripes are observed, a value of "5" is assigned as the evaluation value.

FIGS. 8A and 8B are tables representing evaluation results of an estimation image about a moiré pattern. It should be noted that the evaluation results rely on the evaluation criteria described with reference to FIG. 7. The evaluation results are described with reference to FIGS. 1, 2 and 7 to 8B.

The left columns in FIGS. 8A and 8B represent a multiplying factor of a vertical length of a sub-pixel with respect to the vertical period width "dsv" of a notched structure. For example, if a number shown in the left column is "12", the vertical length of a sub-pixel is 12 times as long as the period width "dsv". If the number shown in the left column gets larger, the period width "dsv" becomes smaller.

The right columns in FIGS. 8A and 8B represent evaluation results rely on the evaluation criteria described with reference to FIG. 7. The central columns in FIGS. 8A and 8B represent the vertical period width "dsv" of a notched structure.

It should be noted in order to obtain the results shown in FIGS. 8A and 8B, the sub-pixel pitch "sp" is set to "160 μm". The inclination angle "A" of the opening 230 is set to "18.435 degrees (3:1)" from the vertical line VL. The minimum opening width "hmin" is set to a value "0.9 times" as wide as the sub-pixel pitch "sp". It should be noted that the angle "ϕ" is calculated by Expression 4 above.

(Result 1)

The table in FIG. 8A shows that fringes are not observed when the vertical length of a sub-pixel is an integral multiple of the period width "dsv" (c.f. the rectangular frames drawn in the solid line in FIG. 8A).

(Result 2)

The table in FIG. 8A shows that fringes are observed when the vertical length of a sub-pixel deviates slightly from an integral multiple of the period width "dsv". It is also shown that an interval between horizontal stripes get longer as a difference becomes smaller between a vertical length of a sub-pixel and an integral multiple value of the period width "dsv".

(Result 3)

If the vertical length of a sub-pixel is MG times as long as the period width "dsv" (where MG is a natural number) and if the vertical length of a sub-pixel is (MG+1) times as long as the period width "dsv", fringes are not observed as described with reference to "Result 1". As shown in FIG. 8A, in addition to the aforementioned conditions, when a multiplying factor of the vertical length of a sub-pixel with respect to the period width "dsv" is an intermediate value or a value near the intermediate value between the natural number MG and the natural number (MG+1), horizontal stripes are not observed.

(Result 4)

The table in FIG. 8B shows that fringes are not observed when the vertical length of a sub-pixel is an integral multiple of the period width "dsv" (c.f. the rectangular frames drawn in the solid line in FIG. 8B).

(Result 5)

The table in FIG. 8B shows that fringes are observed when the vertical length of a sub-pixel deviates slightly from an integral multiple of the period width "dsv". It is also shown that the intervals between horizontal stripes get longer as a difference becomes smaller between a vertical length of a sub-pixel and an integral multiple value of the period width "dsv".

(Result 6)

With reference to the results in the rectangular frame drawn by the dotted line in the table shown in FIG. 8B, not only horizontal stripes but vertical stripes and diagonal stripes are also observed.

(Result 7)

A value of the period width "dsv" is relatively large (i.e. the number of divisions "n" for the vertical length of a sub-pixel is small) when vertical and diagonal stripes occur.

The aforementioned results are common to evaluation results of other sub-pixels.

Based on the aforementioned analysis, the notch adjuster 120 described with reference to FIG. 1 determines whether there is adverse effects resulting from a notched structure, and then adjusts the notched structure on the basis of the determination results.

(Notch Adjuster)

Figure 9:
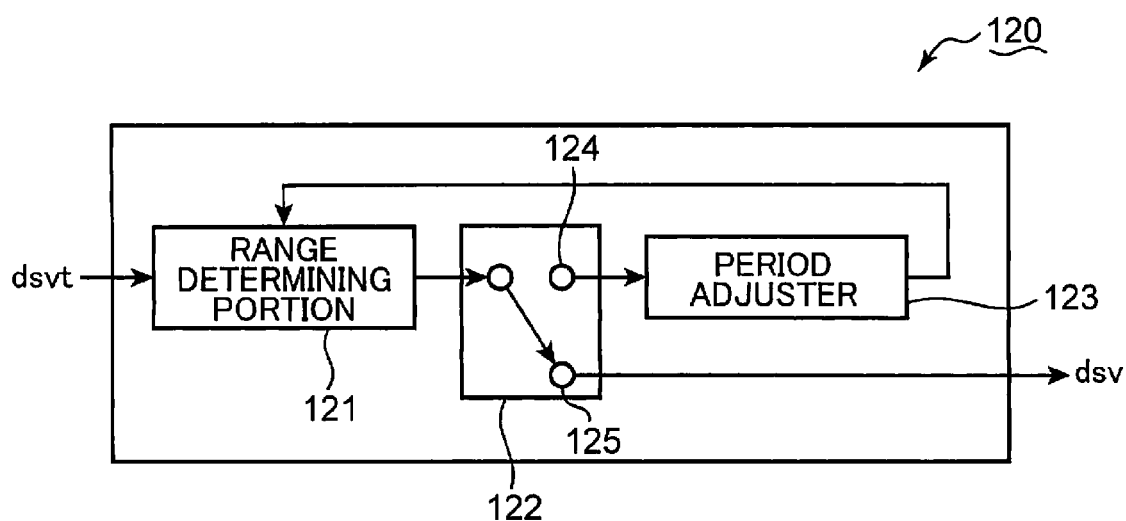
FIG. 9 is a schematic block diagram of a notch adjuster of the display apparatus shown in FIG. 1.

FIG. 9 is a schematic block diagram of the notch adjuster 120. The notch adjuster 120 is described with reference to FIG. 9.

The notch adjuster 120 includes a range determining portion 121, a switcher 122 and a period adjuster 123. Based on the following "Condition 1" to "Condition 3", the range determining portion 121 sets a range of the vertical period width "dsv" of a notched structure.

Figure 10:
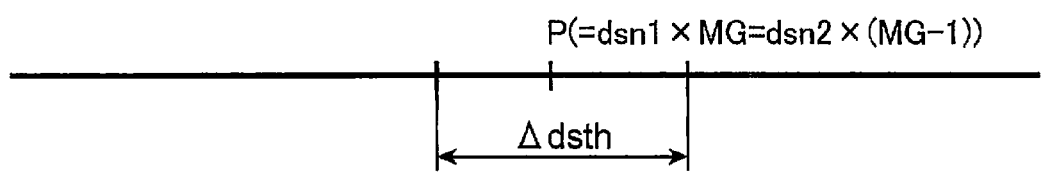
FIG. 10 is a conceptual view representing design conditions of a notched structure.

FIG. 10 is a conceptual view representing "Condition 1". "Conditions 1 to 3" are described with reference to FIGS. 1, 4, 9 and 10.

(Condition 1)

FIG. 10 shows a vertical length "p" of a sub-pixel. It should be noted that since a vertical length of a sub-pixel is as long as a pixel pitch, the same symbol is used.

FIG. 10 shows a variable "dsn1". The variable "dsn1" is determined so that a product of the variable "dsn1" and a natural number MG coincides with the vertical length "p" of a sub-pixel.

FIG. 10 shows a variable "dsn2". The variable "dsn2" is determined so that a product of the variable "dsn2" and a natural number (MG−1) coincides with the vertical length "p" of a sub-pixel.

FIG. 10 shows a range "Δdsth" set around the vertical length "p" of a sub-pixel. The range determining portion 121 sets the range "Δdsth" so as to be centered on the vertical length of a sub-pixel. The following exemplary equation may be used to calculate a setting value of "Δdsth". It should be noted that the range "Δdsth" may be set on the basis of other appropriate definitions.

$$\Delta dsth = \frac{dsn2 - dsn1}{10} \qquad [\text{Expression 9}]$$

As shown in FIG. 9, data about the period width "dsvt", which is a setting target, are input to the range determining portion 121. The range determining portion 121 sets whether or not an integral multiple of the period width "dsvt" exists in the range "Δdsth". "Condition 1" is satisfied unless an integral multiple of the period width "dsvt" exist in the range "Δdsth".

(Condition 2)

The range determining portion 121 verifies whether or not a multiplying factor of the vertical length of a sub-pixel for the period width "dsvt", which is a setting target, is an intermediate value or a value near the intermediate value between the natural numbers MG and (MG+1). "Condition 2" is satisfied if the multiplying factor of the vertical length of a sub-pixel for the period width "dsvt" is an intermediate value or a value near the intermediate value between the natural numbers MG and (MG+1).

(Condition 3)

The range determining portion 121 verifies whether or not the period width "dsvt", which is a setting target, is a value within a range between maximum and minimum values. For example, the maximum value may be a value (c.f. Expression 1) determined by the number of divisions "n" obtained on the basis of the bright-dark number "nn" described with reference to FIG. 4. It should be noted that when the aforementioned definition of Expression 2 is applied, the period width "ds" falls below a value obtained by dividing a vertical sub-pixel pitch by a value of a number of light-dark regions (e.g. regions partitioned by the metal electrodes in FIG. 4) in a sub-pixel multiplied by "cos θ". Alternatively, the maximum value may be an arbitrary value set in advance. "Condition 3" is satisfied if the period width "dsvt", which is a setting target, is a value within a range between the maximum and minimum values.

The switcher 122 includes a first contact point 124 and a second contact point 125. When Conditions 1 to 3 are satisfied, the switcher 122 uses the second contact point 125 to set a data output pathway. Accordingly, data about the period width "dsvt" are output to the barrier adjusting circuit 130 as data about an appropriate period width "dsv". Unless any one of the Conditions 1 to 3 is satisfied, the switcher 122 uses the first contact point 124 to set a data output pathway. Accordingly, the period adjuster 123 changes the period width "dsvt" to another value.

Figure 11:
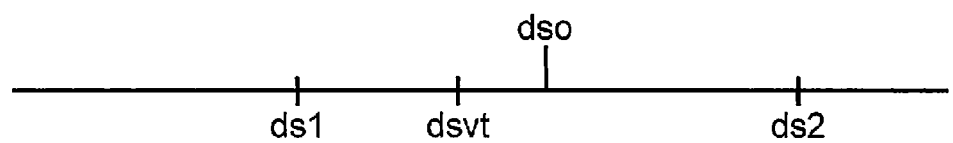
FIG. 11 is a conceptual view of an adjustment operation of a period adjuster of the notch adjuster shown in FIG. 9.

FIG. 11 is a conceptual view of an adjustment operation of the period adjuster 123. The adjustment operation of the period adjuster 123 is described with reference to FIGS. 2 and 9 to 11.

As shown in FIG. 11, the period adjuster 123 sets two values "ds1" and "ds2" around the period width "dsvt".

(Conditions of Setting Value "ds1")

The setting value "ds1" is set so as to satisfy the following conditions.

The setting value "ds1" satisfies "Condition 2" described above.

The setting value "ds1" is a value smaller than the period width "dsvt".

The setting value "ds1" is a value which is obtained by dividing the vertical length "p" of a sub-pixel by a natural number and which best approximates the period width "dsvt" among values satisfying the aforementioned conditions of the setting value "ds1".

(Conditions of Setting Value "ds2")

The setting value "ds2" is set so as to satisfy the following conditions.

The setting value "ds2" satisfies "Condition 2" described above.

The setting value "ds2" is a value larger than the period width "dsvt".

The setting value "ds2" is a value which is obtained by dividing the vertical length "p" of a sub-pixel by a natural number (which may be a natural number smaller by "1" than the natural number used to calculate the setting value "ds1") and which best approximates the period width "dsvt" among values satisfying the aforementioned conditions of the setting value "ds2".

An intermediate value "dso" between the setting values "ds1" and "ds2" is calculated. The period adjuster 123 may set the intermediate value "dso" as a new period "dsvt". Alternatively, the period adjuster 123 may set a value, which is sufficiently deviated from the setting values "ds1" and "ds2" as a new period "dsvt". It should be noted that the intermediate value "dso" may be calculated by the following equation. In the present embodiment, the setting value "ds1" may be exemplified as the second value. The setting value "ds2" may be exemplified as the first value.

$$dso = \frac{ds1 - ds2}{2}$$ [Expression 10]

Alternatively, the period adjuster 123 may set a coefficient "η" corresponding to the range "Δdsth" described with reference to FIG. 10. The value "dso" set as the new period width "dsvt" may be given by the following equation. It should be noted that the period adjuster 123 sets the coefficient "η" so that the value "dso" satisfies "Condition 1" to "Condition 3" described above.

$$dso = dsvt + \Delta dsth \times \eta$$ [Expression 11]

The notch adjuster 120 makes determination about a setting value of the vertical period width "dsv" of a notched structure. Optionally, the notch adjuster 120 may adjust the setting value of the period width "dsv". Therefore, adverse effects (horizontal, diagonal and vertical stripes) resulting from a relationship between a notched structure and a pixel structure are less likely to occur.

As shown in FIG. 2, the opening 230 is line-symmetrical with respect to the center line CL. An opening width of the opening 230 varies periodically and symmetrically. A degree of blur or a range of blur of a pixel observed through the slanted barrier 200 is appropriately adjusted by the left and right protrusions 211, 212 and the left and right notched regions 232, 233 formed by the contour portion 220.

A ratio "rH" of a width of an opening (opening width) of a slanted barrier to the sub-pixel pitch is used as criteria of crosstalk. Since the width of the opening 230 of the slanted barrier 200 varies as shown in FIG. 2, a ratio of the width of the opening 230 of the slanted barrier 200 to the sub-pixel pitch may be defined as the average opening ratio "rhAve" using an average width of the opening 230.

As described above, since the slanted barrier 200 has a very fine notched structure, characteristics of the slanted barrier 200 about crosstalk are approximately the same as those of an ordinary slanted barrier (a slanted barrier without a notched structure) with a ratio "rH" as large as the average opening ratio "rhAve" of the slanted barrier 200.

An area of pixels observed through the opening 230 may be averaged with little increased crosstalk by an average opening ratio "rhAve" appropriately set in consideration of crosstalk and a notched structure appropriately designed in consideration of a degree of blur.

As shown in FIG. 2, the left and right protrusions 211, 212 and the left and right notched regions 232, 233 are triangular. Alternatively, these elements which constitute a notched structure may be trapezoids or parallelograms. Further alternatively, contours of these elements may be curved lines (e.g. elliptical arcs).

In the present embodiment, a notched structure is described with reference to the slanted barrier 200. Alternatively, a notched structure may be applied to a vertical stripe barrier or a stepped barrier.

As shown in FIG. 2, the left and right protrusions 211, 212 protrude horizontally toward the center line CL. Alternatively, protruding directions of the left and right protrusions may be perpendicular to the center line CL.

A sum "dSnt" of opening areas of the left and right notched regions 232, 233 in one pixel pitch "p" may be expressed by the following equation.

$$dSnt = dwh \times p \quad \text{[Expression 12]}$$

An opening area "dSot" of the opening region 231 in one pixel pitch "p" may be expressed by the following equation.

$$dSot = h\min \times p \quad \text{[Expression 13]}$$

An opening area "S" in one pixel pitch "p" may be expressed by the following equation.

$$S = dSnt + dSot \quad \text{[Expression 14]}$$

Expressions 12 to 14 above show that an area of the opening 230 in one pixel pitch "p" does not vary even under an increase in a number of divisions "n" in one pixel pitch "p".

In order to set an appropriate average opening ratio "rhAve" in consideration of crosstalk, the maximum opening width "hmax" may be set no more than the sub-pixel pitch "sp". If the minimum opening width "hmin" equals or falls below "0.5 times" as large as the sub-pixel pitch "sp", adverse effects such as fringes on an image may occur because of a rapid variation in opening width. Or an observed image may become susceptive to a variation of an observing position of an observer in the horizontal and/or vertical directions. Therefore, the minimum opening width "hmin" may be set to a value no less than "0.7 times" as large as the sub-pixel pitch "sp".

A sub-pixel pitch is used as various criteria about a parallax image. As described above, by appropriately setting an average opening ratio, maximum and minimum opening widths on the basis of the sub-pixel pitch, a moiré pattern may be reduced with little increased crosstalk.

Second Embodiment

Estimation techniques for a moiré pattern (horizontal stripes) using a notched structure design parameter are described in the context of the second embodiment. Based on estimation results, it is determined whether or not a notched structure itself causes adverse effects such as fringes. Based on the determination result, a concavo-convex period of the notched structure is appropriately adjusted. The notched structure with an appropriately adjusted concave-convex period is applied to a contour portion which shapes an opening. Accordingly, a degree of blur and a range of blur of a pixel observed by an observer are appropriately adjusted (i.e. a moiré pattern is reduced).

Figure 12:
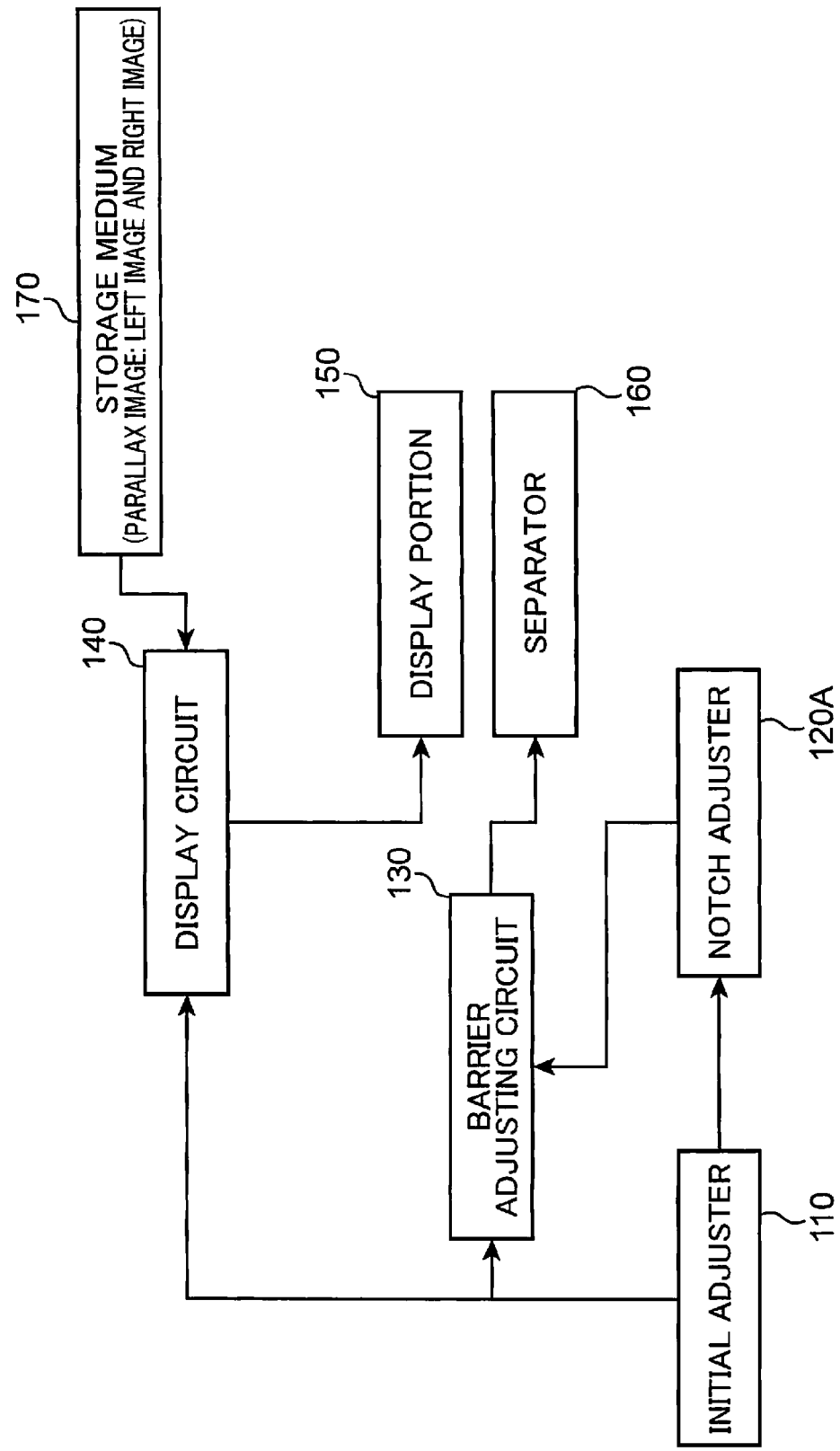
FIG. 12 is a schematic block diagram of a display apparatus according to the second embodiment.

FIG. 12 is a schematic block diagram of the display apparatus 100A according to the second embodiment. The display apparatus 100A is described with reference to FIG. 12. It should be noted that the same element as the first embodiment are denoted by the same reference numerals. The description of the first embodiment is applied to the elements denoted by the same reference numerals.

Like the first embodiment, the display apparatus 100A includes the initial adjuster 110, the barrier adjusting circuit 130, the display circuit 140, the display portion 150, the separator 160 and the storage medium 170. The display apparatus 100A further includes a notch adjuster 120A.

Figure 13:
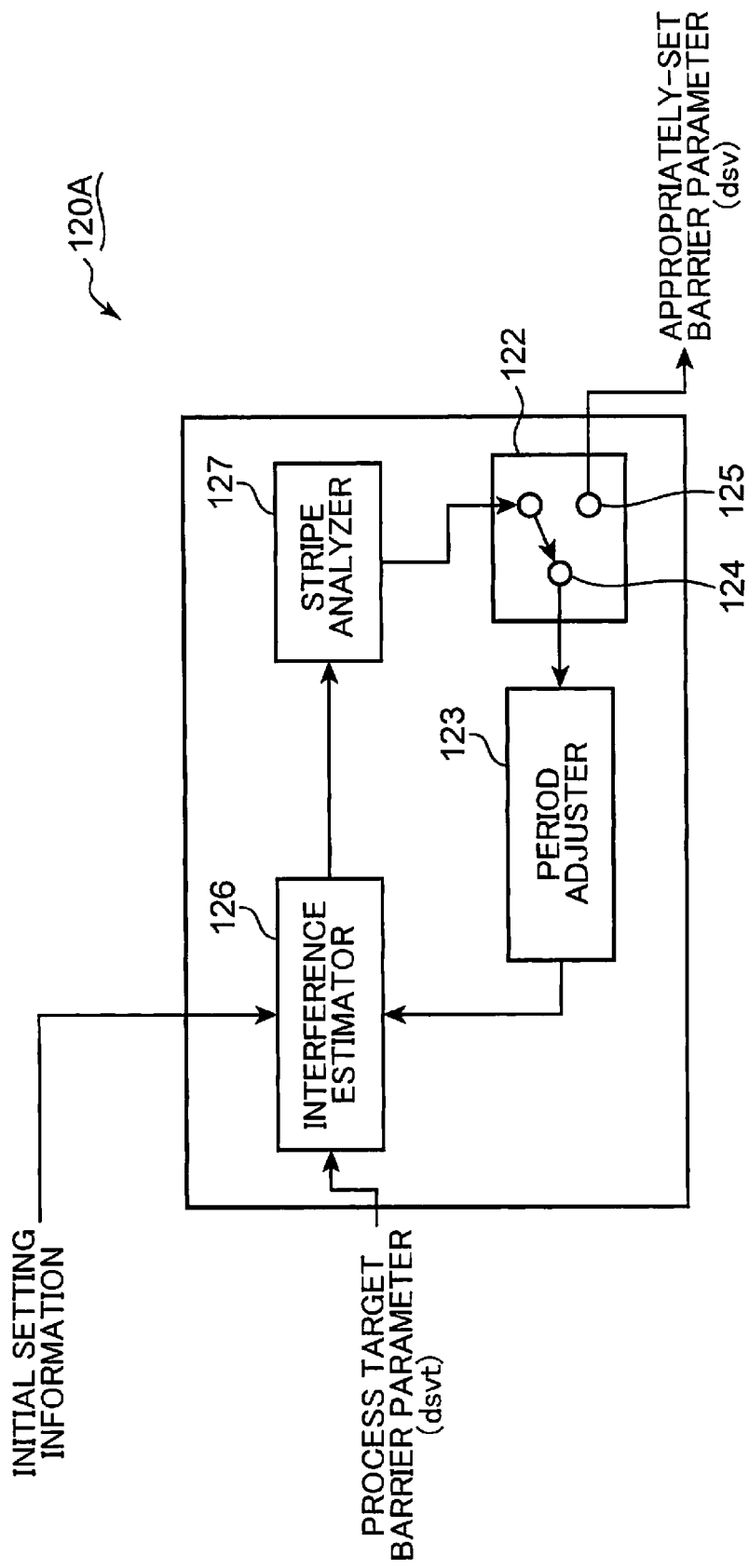
FIG. 13 is a schematic block diagram of a notch adjuster of the display apparatus shown in FIG. 12.

FIG. 13 is a schematic block diagram of the notch adjuster 120A. The notch adjuster 120A is described with reference to FIGS. 12 and 13.

Like the first embodiment, the notch adjuster 120A includes the switcher 122 and the period adjuster 123. The notch adjuster 120A further includes an interference estimator 126 and a stripe analyzer 127.

The interference estimator 126 estimates a vertical luminance distribution and a state of interference between a pixel structure and a notched structure. The stripe analyzer 127 determines whether or not horizontal stripes are caused, on the basis of the interference state between the pixel structure and the notched structure. When the stripe analyzer 127 determines that horizontal stripes are less likely to happen, the switcher 122 uses the second contact point 125 to set a data output pathway. In this case, data about a target period width "dsvt" input to the interference estimator 126 are output as a period width "dsv" applied to the separator 160. When the stripe analyzer 127 determines that horizontal stripes are likely to happen, the switcher 122 uses the first contact point 124 to set a data output pathway. In this case, the period adjuster 123 outputs data about a new period width "dsvt" to the interference estimator 126 by means of similar adjustment techniques to those of the first embodiment.

Figure 14:
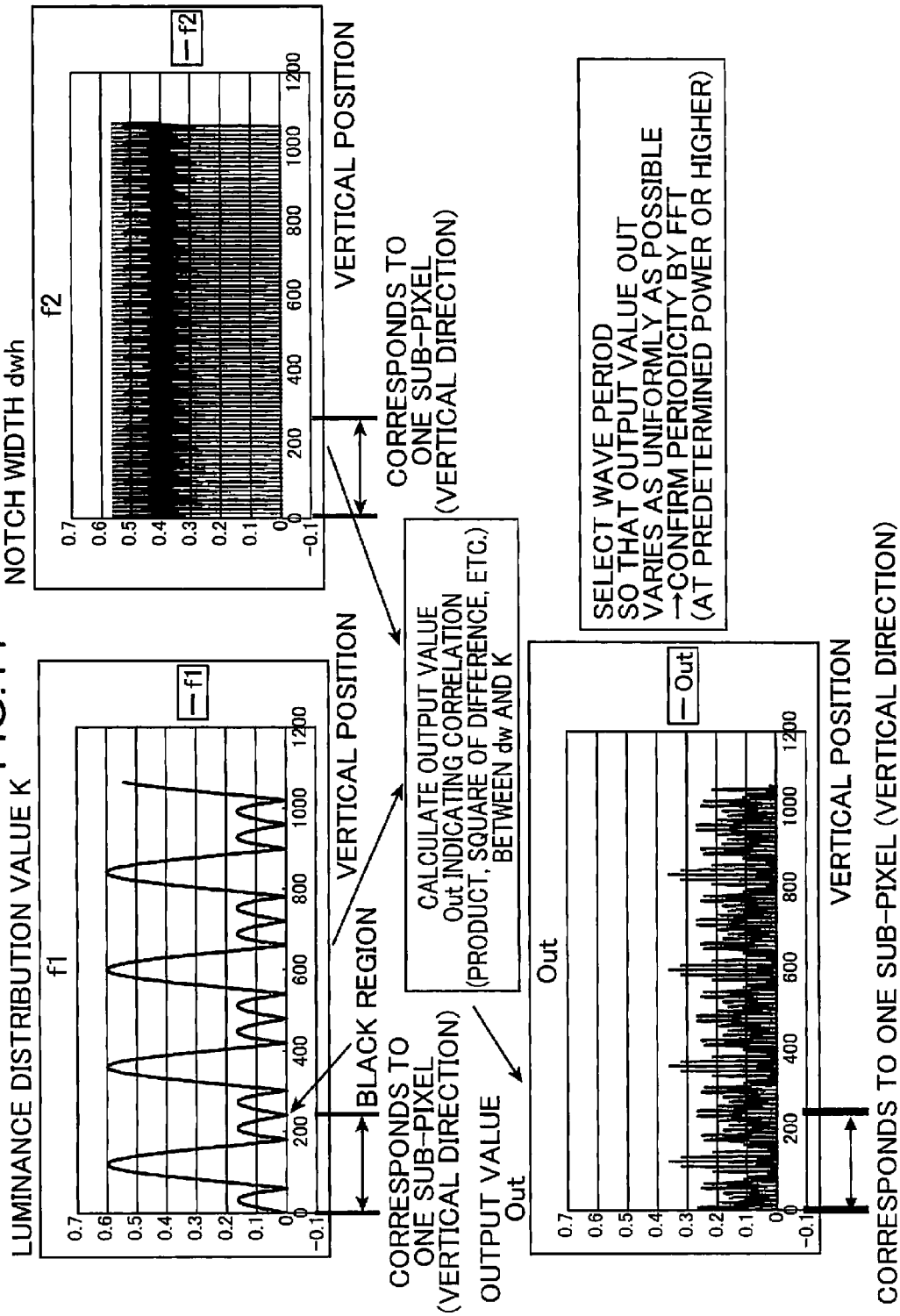
FIG. 14 is a conceptual view of a process executed by an interference estimator of the notch adjuster shown in FIG. 13.

FIG. 14 is a conceptual view of a process executed by the interference estimator 126. The process executed by the interference estimator 126 is described with reference to FIGS. 2, 4 and 12 to 14.

The interference estimator 126 may receive information about a pixel structure or a shape of the slanted barrier 200 from the initial adjuster 110. FIG. 14 shows a graph representing a vertical luminance distribution. The luminance distribution may be estimated on the basis of information about a pixel structure, which is output from the initial adjuster 110. Luminance decreases in a black region (e.g. a black matrix). Therefore, the interference estimator 126 may acquire data about a vertical length of one sub-pixel, on the basis of a position of a black region. As shown in FIG. 14, the luminance distribution varies periodically. The interference estimator 126 may generate a periodic function f1 which approximates the luminance distribution shown in FIG. 14.

As shown in FIG. 2, the horizontal height "dwh" of a notched structure varies in response to a vertical position. FIG. 14 shows a graph representing a variation of the horizontal height "dwh" of a notched structure. The interference estimator 126 may acquire data about a variation of the horizontal height "dwh" of a notched structure on the basis of a barrier parameter output from the initial adjuster 110 or the period adjuster 123. It should be noted that the barrier parameter may include various parameters about the angle "θ", the angle "φ", the minimum opening width "hmax", the maximum opening width "hmin", the horizontal height "dwh" of a notched structure, and the vertical period width "dsv" of the notched structure shown in FIG. 2. Like the luminance distribution, the horizontal height "dwh" of a notched structure varies periodically. The interference estimator 126 may generate a periodic function f2 which approximates the variation of the horizontal height "dwh" of a notched structure.

FIG. 14 shows a graph of an output value "Out" which represents a correlation between the periodic functions f1, f2. The output value "Out" may be a product of the periodic functions f1, f2 or a square value of a difference value between the periodic functions f1, f2. The interference estimator 126 may calculate the output value "Out" to estimate interference between the pixel structure and the notched structure. The effect of the notched structure itself on an image may be estimated on the basis of a variation of the output value "Out".

When the output value "Out" shown in FIG. 14 varies at a large period (i.e. when the variation of the output value "Out" has low-frequency components), it is estimated that the notched structure itself is likely to cause interference fringes. For example, when an area occupied by a supporting electrode in a pixel is large, and if a vertical period width of a notched structure is large, interference fringes are more likely to happen. Unless the variation of the output value "Out" has low-frequency components, the notched structure itself is less likely to cause interference fringes. For example, when the variation of the output value "Out" only has high-frequency components or a variation of the output value "Out" is small, interference fringes are less likely to occur. Interference fringes are also less likely to occur unless the variation of the output value "Out" has periodicity.

Therefore, several barrier parameters used for eliminating moiré resulting from interference between a black region and the opening 230 may be selected on the basis of the output value "Out". For example, a barrier parameter which reduces a variation of the output value "Out" or causes a variation of the output value "Out" including only high-frequency components may be selected as a preferable barrier parameter.

Data about an output value "Out" as shown in FIG. 14 may be output from the interference estimator 126 to the stripe analyzer 127. The stripe analyzer 127 may analyze whether or not a shape of the opening 230 determined by the barrier parameter causes horizontal stripes on the basis of the aforementioned frequency analysis.

The interference estimator 126 generates data about the output value "Out" on the basis of initial setting information and barrier parameters output from the initial adjuster 110. The data about the output value "Out" is output from the interference estimator 126 to the stripe analyzer 127. The stripe analyzer 127 estimates whether or not horizontal stripes occur, on the basis of the aforementioned frequency analysis. When the stripe analyzer 127 determines that data of the output value "Out" varies at a large period (i.e. the variation of the output value "Out" has low-frequency components), the period adjuster 123 may change a target barrier parameter on the basis of the adjustment techniques described in the context of the first embodiment.

As described in the context of the first embodiment, the vertical period width "dsv" of a notched structure is no more than a value, which is determined by a number of divisions "n" determined on the basis the bright-dark number "nn" described with reference to FIG. 4 (c.f. Expression 1). Therefore, a value obtained by dividing a vertical length "p" of a sub-pixel by the bright-dark number "nn" may be processed as the period width "dsvt" which is initially subjected to the aforementioned process. Subsequently, the period adjuster 123 may gradually reduce the period width "dsvt" to find a suitable period width "dsv".

Alternatively, a range of the period width "dsvt" which is subjected to the aforementioned process may be set in advance. A suitable period width "dsv" which satisfies "Condition 1" to "Condition 3" described in the context of the first embodiment may be found between the minimum and maximum values of the set range.

As described above, the display apparatus 100A estimates a vertical luminance distribution of a pixel. The display apparatus 100A assesses whether or not horizontal stripes happen on the basis of the luminance distribution estimation result. If it is estimated that the notched structure itself may cause adverse effects such as horizontal stripes, a vertical period width of the notched structure is appropriately adjusted. A notched structure designed on the basis of the appropriately adjusted period width is applied to the contour portion 220 of the slanted barrier 200.

Third Embodiment

Figure 15:
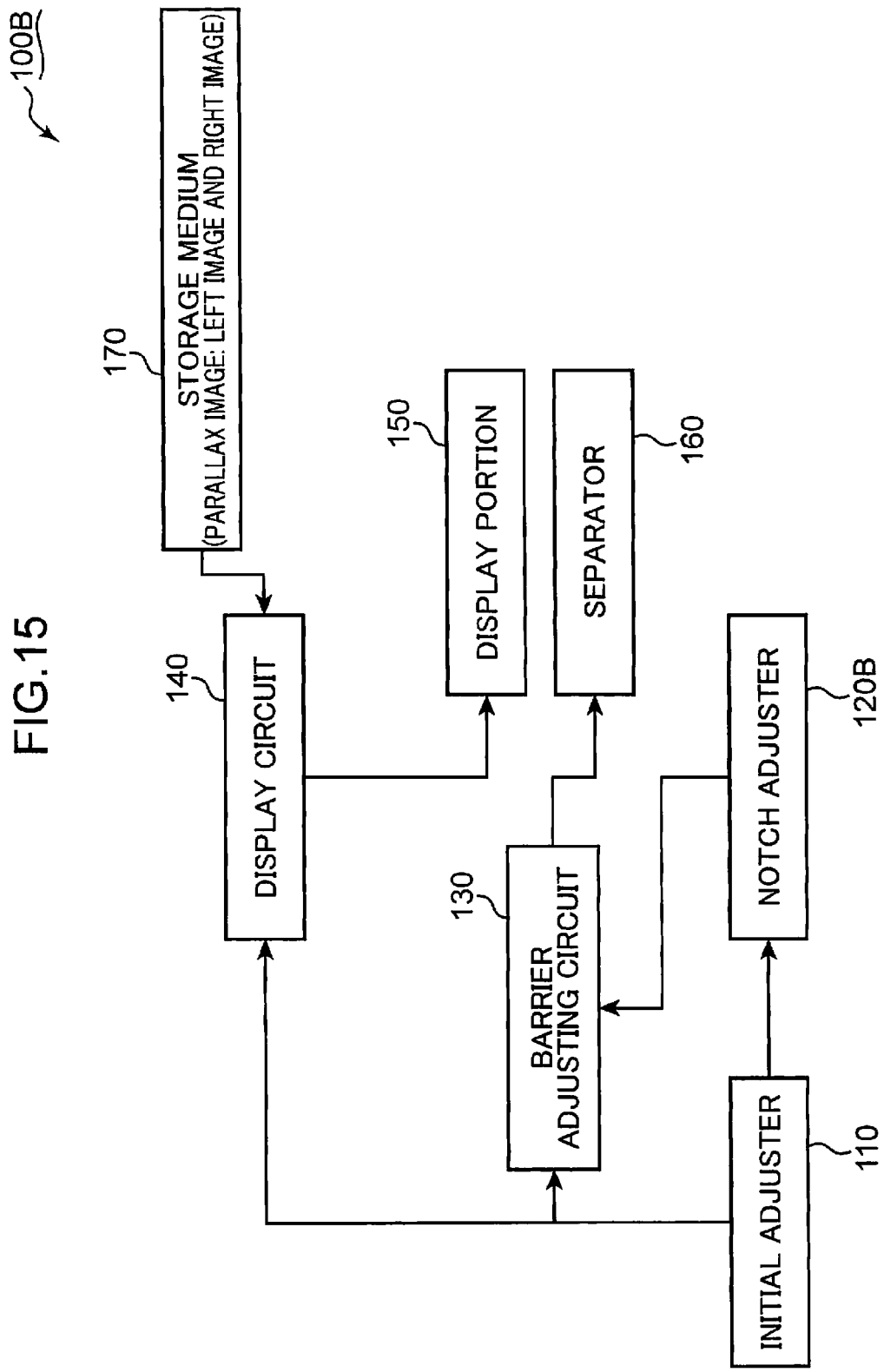
FIG. 15 is a schematic block diagram of a display apparatus according to the third embodiment.

FIG. 15 is a schematic block diagram of the display apparatus 100B according to the third embodiment. The display apparatus 100B is described with reference to FIG. 15. It should be noted that the same elements as the first and/or second embodiments are denoted by the same reference numerals. Descriptions of the first and/or second embodiments are applied to the elements denoted by the same reference numerals.

Like the second embodiment, the display apparatus 100B includes the initial adjuster 110, the barrier adjusting circuit 130, the display circuit 140, the display portion 150, the separator 160 and the storage medium 170. The display apparatus 100B further includes a notch adjuster 120B.

Figure 16:
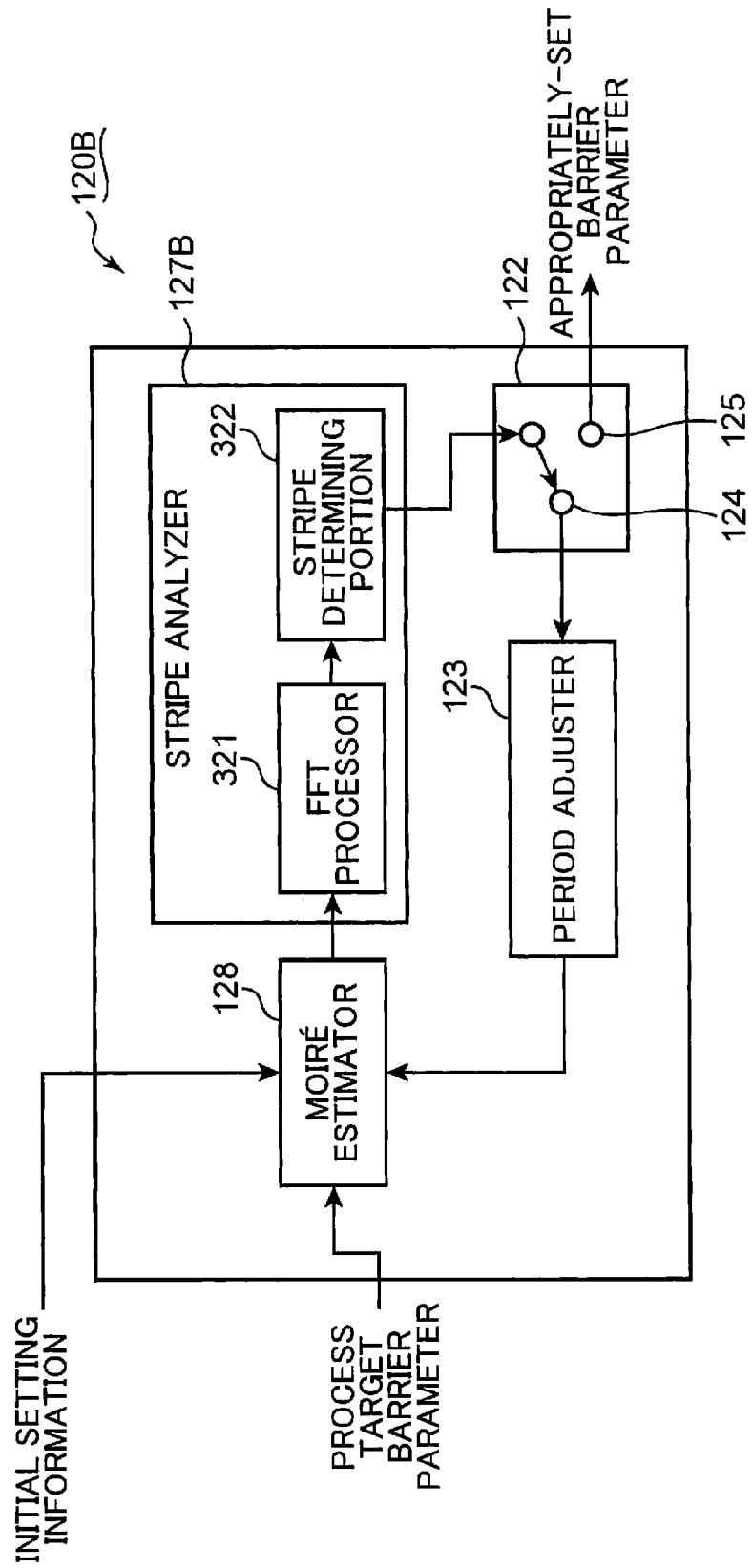
FIG. 16 is a schematic block diagram of a notch adjuster of the display apparatus shown in FIG. 15.

FIG. 16 is a schematic block diagram of the notch adjuster 120B. The notch adjuster 120B is described with reference to FIGS. 7 to 8B, 13, 15 and 16.

Like the second embodiment, the notch adjuster 120B includes the switcher 122 and the period adjuster 123. The notch adjuster 120B further includes a moiré estimator 128 and a stripe analyzer 127B.

The moiré estimator 128 receives information about a pixel structure from the initial adjuster 110. The moiré estimator 128 receives information about the aforementioned barrier parameter from the initial adjuster 110 or the period adjuster 123. The moiré estimator 128 generates a moiré image for the estimation simulation described with reference to FIGS. 7 to 8B.

The stripe analyzer 127B includes an FFT processor 321 and a stripe determining portion 322. Unlike the stripe analyzer 127 (the second embodiment) which performs one-dimensional (vertical direction) frequency analysis, the FFT processor 321 applies a two-dimensional FFT process to a moiré image output from the moiré estimator 128. The stripe determining portion 322 determines whether or not stripes happen, on the basis of results from the FFT process.

Figure 17A:
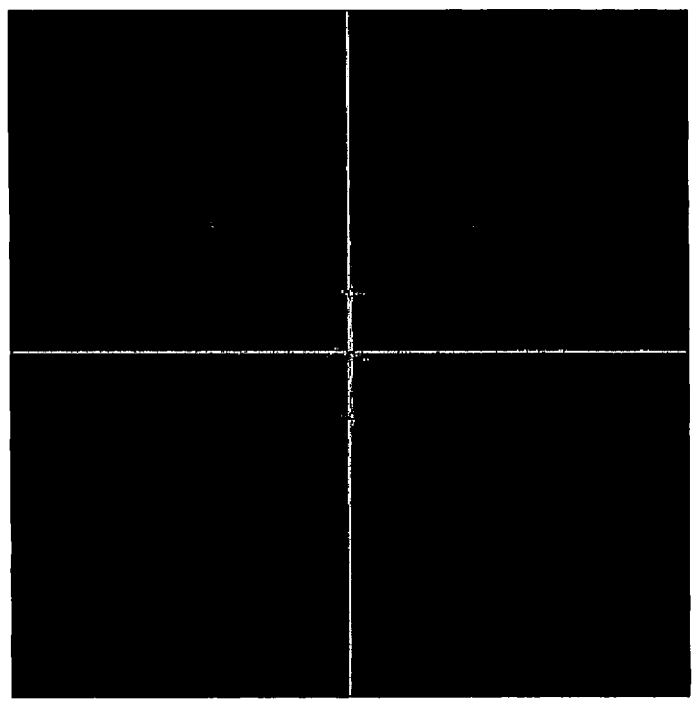
FIG. 17A is an exemplary image obtained by an FFT process.
Figure 17B:
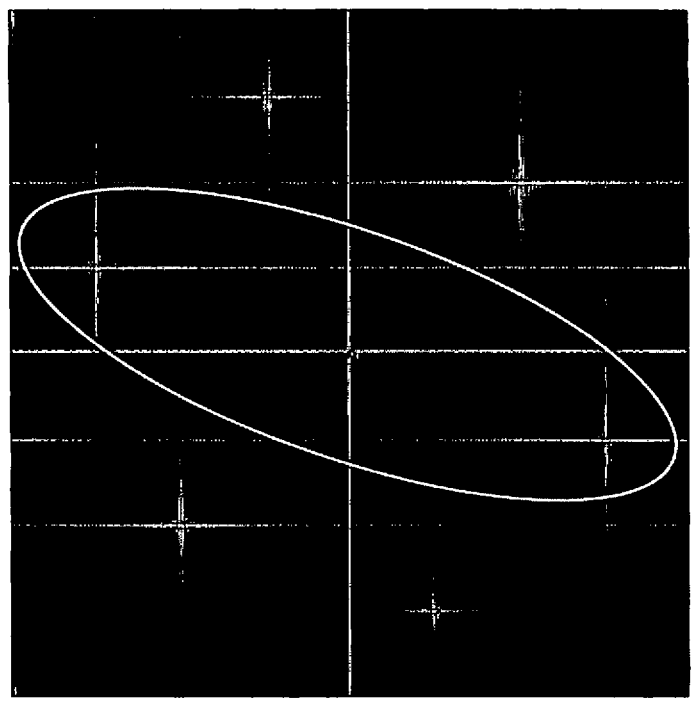
FIG. 17B is an exemplary image obtained by an FFT process.
Figure 17C:
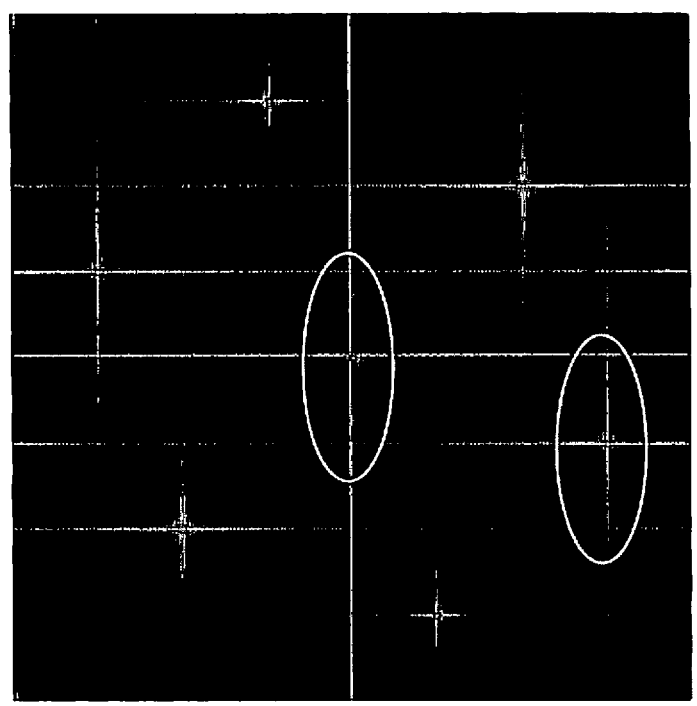
FIG. 17C is an exemplary image obtained by an FFT process.

FIGS. 17A to 17C show exemplary images obtained by the FFT process. The FFT process is described with reference to FIGS. 2, 5A, 16 and 17A to 17C.

The image shown in FIG. 17A is obtained from the image depicted in FIG. 5A. It should be noted that only fine horizontal stripes are shown in the image in FIG. 5A.

The image shown in FIG. 17B is obtained from a moiré image only showing diagonal stripes (without horizontal stripes). It should be noted that a sub-pixel pitch is set to "160 μm".

The image shown in FIG. 17C is obtained from a moiré image showing diagonal stripes described with reference to FIG. 17B and horizontal stripes created by a notched structure. It should be noted that the sub-pixel pitch is set to "160 μm".

Like an ordinary FFT image, centers of the images shown in FIGS. 17A to 17C indicate a direct-current component. Distances from the centers of the images in the horizontal and vertical directions represent a magnitude of power of a periodic component in a corresponding direction.

A periodic component corresponding to horizontal stripes appears in the image shown in FIG. 17A. As shown in a region enclosed in a white circle, a periodic component corresponding to diagonal stripes appears in the image shown in FIG. 17B. As shown in a region enclosed in a white circle, a periodic component corresponding to diagonal stripes appears in the image shown in FIG. 17C. It should be noted that the periodic component of the diagonal stripes in the image shown in FIG. 17C is smaller than the periodic component of the diagonal stripes in the image shown in FIG. 17B. However, a periodic component corresponding to the horizontal stripes is added to the periodic component shown in FIG. 17C.

Data about the FFT process shown in FIGS. 17A to 17C are output from the FFT processor 321 to the stripe determining portion 322. The stripe determining portion 322 extracts periodic components having a power no less than a predetermined magnitude from the data received from the FFT processor 321. For example, the stripe determining portion 322 may determine whether or not there is periodicity in the horizontal direction (the region enclosed by the white circle in FIG. 17C) on the basis of the extracted periodic components. Based on the determination result, the stripe determining portion 322 determines whether not a process target barrier parameter (e.g. the vertical period width "dsvt" of a notched structure) is appropriate. Subsequently, the switcher 122 performs a switching operation in response to the determination result of the stripe determining portion 322.

Depending on the vertical luminance distribution described in the context of the second embodiment, a moiré pattern may not be clearly determined. In the present embodiment, the notch adjuster 120B performs estimation of a moiré image, and then the notch adjuster 120B performs a two-dimensional FFT process on the moiré image. Since the notch adjuster 120B determines whether there are stripes with periodicity on the basis of the FFT process, the estimation about the generation of stripes may be appropriately performed in comparison with the second embodiment.

The adjustment to the vertical period width of a notched structure is described in the second and third embodiments. Alternatively, a period width "ds" of a notched structure (c.f. Expression 2 above) may be processed as the process target.

As described in the context of the first embodiment, the left and right protrusions 211, 212 and the left and right notched regions 232, 233 are triangular. Alternatively, these elements which constitute a notched structure may be trapezoids or parallelograms. Further alternatively, contours of these elements may be curved lines (e.g. elliptical arcs).

In the second and third embodiments, a notched structure is described with reference to the slanted barrier 200. Alternatively, a notched structure may be applied to a vertical stripe barrier or a stepped barrier.

As shown in FIG. 2, the left and right protrusions 211, 212 protrude horizontally toward the center line CL. Alternatively, protruding directions of the left and right protrusions may be perpendicular to the center line CL.

The relationship about the area of an opening described with reference to Expressions 12 to 14 above is also applicable to the second and third embodiments. When a sum of a horizontal height "dwhL" of a notched structure on the left of the center line of an opening and a horizontal height "dwhR" of a notched structure on the right of the center line of the opening is equal to twice as large as the horizontal height "dwh" of a notched structure represented by Expression 12 above, the relationship represented by Expression 14 above is applicable. Therefore, the horizontal heights "dwhL", "dwhR" of the notched structures may be set to different numerical values from each other.

In order to set an appropriate average opening ratio "rhAve" in consideration of crosstalk, the maximum opening width "hmax" may be set no more than the sub-pixel pitch "sp". When the minimum opening width "hmin" equals or falls below "0.5 times" as large as the sub-pixel pitch "sp", adverse effects such as fringes on an image may occur because of a rapid variation in opening width. Or an observed image may become susceptible to a variation of an observing position of an observer in the horizontal and/or vertical directions. Therefore, the minimum opening width "hmin" may be set to a value no more than "0.7 times" as large as the sub-pixel pitch "sp".

A sub-pixel pitch is used as various criteria about a parallax image. As described above, by appropriately setting an average opening ratio, a maximum opening width, and a minimum opening width on the basis of the sub-pixel pitch, a moiré pattern may be reduced with little increased crosstalk.

Fourth Embodiment

In the context of the fourth embodiment, a change parameter for causing a phase shift between left and right notched structures, another change parameter for varying a gap between left and right notched structures, and yet another change parameter for varying a maximum opening width are described. These change parameters significantly enlarge an adjustment range to a notched structure. Like the first to third embodiments, estimation of a moiré pattern is performed by means of a set notched structure. A moiré pattern obtained from the set notched structure is compared with frequency characteristics of a moiré pattern obtained from a predetermined reference barrier member. An appropriate barrier parameter is set on the basis of the comparison results. A barrier parameter designed by means of the appropriately set barrier parameter is applied to a barrier member. In the present embodiment, a moiré pattern is quantitatively evaluated.

(Display Apparatus)

Figure 18:
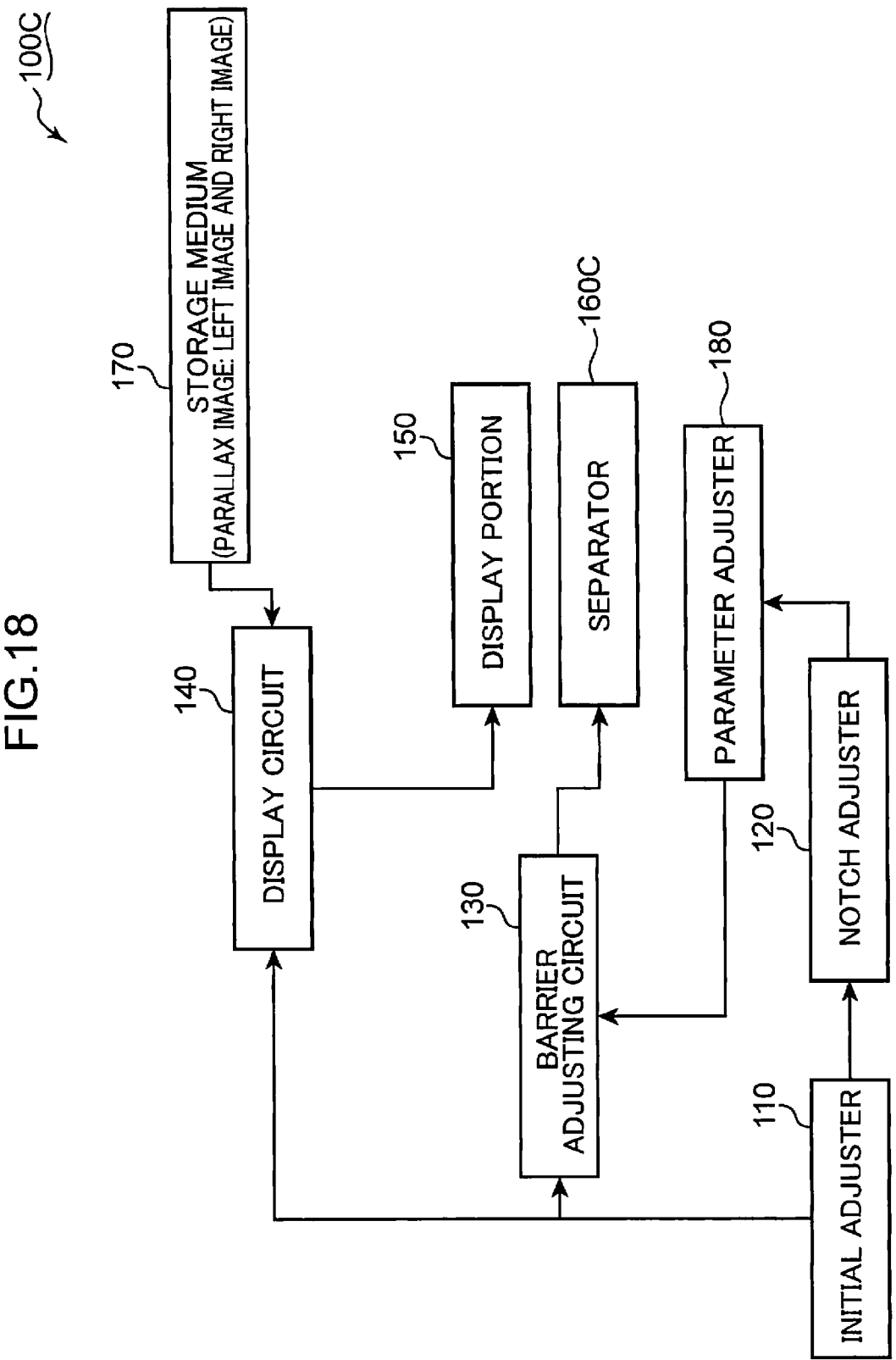
FIG. 18 is a schematic block diagram of a display apparatus according to the fourth embodiment.

FIG. 18 is a schematic block diagram of the display apparatus 100C according to the fourth embodiment. The display apparatus 100C is described with reference to FIGS. 18 and 52B. It should be noted that the same elements as the first embodiment are denoted by the same reference numerals. The description of the first embodiment is applied to the elements denoted by the same reference numerals.

Like the first embodiment, the display apparatus 100C includes the initial adjuster 110, the notch adjuster 120, the barrier adjusting circuit 130, the display circuit 140, the display portion 150 and the storage medium 170. The display apparatus 100C further includes a separator 160C and a parameter adjuster 180. Like the first to third embodiments, the notch adjuster 120 determines whether or not a notched structure may cause adverse effects such as horizontal stripes. The notch adjuster 120 adjusts a period width of a notched structure. Data about the appropriately adjusted period width of the notched structure are output from the notch adjuster 120 to the parameter adjuster 180. The parameter adjuster 180 adjusts other barrier parameters (e.g. a width or an angle of an opening) in response to the data about the period width of the notched structure output from the notch adjuster 120.

The initial adjuster 110 performs initial adjustments to the notch adjuster 120, the barrier adjusting circuit and the display circuit 140. The storage medium 170 stores image data about a parallax image which is a composite of a left image to be observed by the left eye and a right image to be observed by the right eye. The image data are transmitted from the storage medium 170 to the display circuit 140. The display circuit 140 processes the image data to generate drive signals. The drive signals are transmitted from the display circuit 140 to the display portion 150. The display portion 150 displays a parallax image (2D) in response to the drive signals.

The separator 160C may be a parallax barrier situated away from the display portion 150. Image light representing a parallax image is emitted from the display portion 150 to the separator 160C. The separator 160C includes a barrier portion which blocks the image light. Openings to allow transmission of the image light are formed on the barrier portion. Therefore, the image light may reach the eyes of an observer through the opening. The separator 160C is formed so that image light corresponding to a left image is incident to the left eye whereas image light corresponding to a right image is incident to the right eye of the observer at a predetermined position. In addition, the separator 160C is formed so that the barrier portion blocks the image light of the right image which propagates toward the left eye whereas the image light of the left image which propagates toward the right eye. Therefore, the separator 160C may appropriately separate the image light into image light corresponding to the left image and image light corresponding to the right image to provide the observer with the left and right images. Since the left and right images are different from each other by binocular parallax, the observer may perceive the parallax image displayed on the display portion 150 as a stereoscopic image.

The separator 160C may have a structure of the slanted barriers described in the context of the first to third embodiments. Alternatively, the separator 160C may have another structure of the stepped barrier described with reference to FIG. 52A.

The separator 160C may be a fixed barrier member which is formed from a thin film or a highly-transparent material (e.g. glass). Alternatively, the separator 160C may be a barrier apparatus (e.g. a TFT liquid crystal panel) which may vary parameters such as a shielding position, a shielding area, an opening position and an opening area under voltage application.

The initial adjuster 110 adjusts the notch adjuster 120, the barrier adjusting circuit 130, and the display circuit 140 once the display apparatus 100C starts displaying images or once the display apparatus 100C is placed in a usage environment. If the separator 160C is an active parallax barrier such as a TFT liquid crystal panel, the initial adjuster 110 adjusts parameters such as intervals between the openings, widths of the openings and a distance from the display portion 150 to the separator 160C, on the basis of an observing position, which is determined in advance as an optimum viewing distance. The initial adjuster 110 may perform positional control for the openings and the barrier portion of the separator 160C every pixel or sub-pixel. When the separator 160C is a fixed barrier member, the initial adjuster 110 may adjust a distance between the display portion 150 and the separator 160C, and an inclination angle of the separator 160C with respect to the display portion 150. A predetermined adjustment image may be used in the adjustment to the separator 160C by the initial adjuster 110.

During the aforementioned adjustment operation by the initial adjuster 110, evaluation and adjustment work about a stereoscopic image to be observed may be performed by means of a test image. An observer observing at an optimum observing distance may observe the test image to evaluate visibility and a degree of blur/fusion of the stereoscopic image. The observer may use the display circuit 140 to tune gradation characteristics. Optionally, the observer may adjust a parallax image to change a parallax amount between left and right images (e.g. intensity control or adjustment to a horizontal shift amount by means of a linear coefficient).

Figure 19:
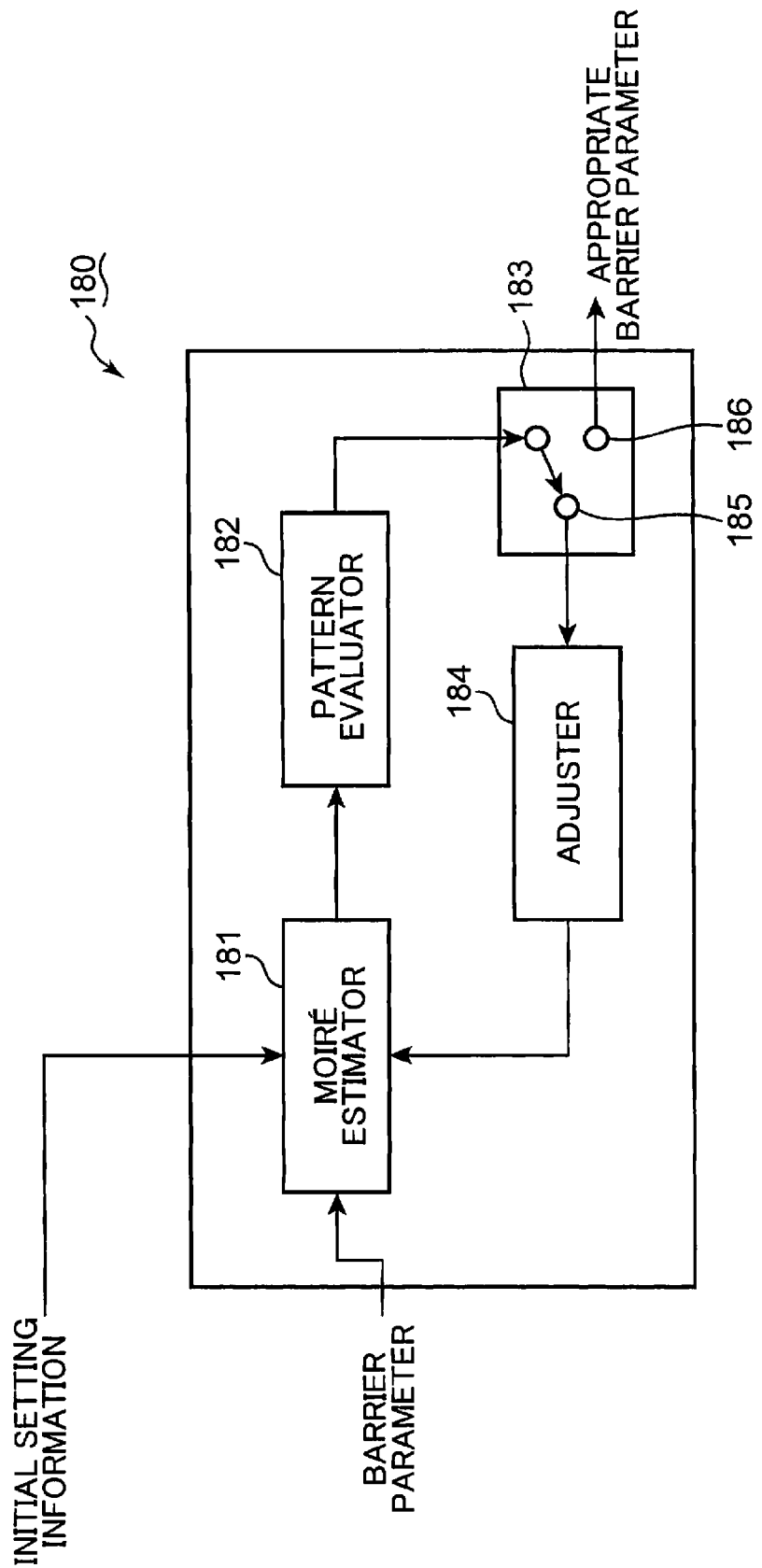
FIG. 19 is a schematic block diagram of a parameter adjuster of the display apparatus shown in FIG. 18.

FIG. 19 is a schematic block diagram of the parameter adjuster 180. The parameter adjuster 180 is described with reference to FIGS. 18 and 19.

The parameter adjuster 180 includes a moiré estimator 181, a pattern evaluator 182, a switcher 183 and an adjuster 184. The moiré estimator 181 estimates a moiré pattern on the basis of a shape of an opening. The pattern evaluator 182 performs frequency analysis on the estimated moiré pattern or a reference pattern used as evaluation criteria for the estimated moiré pattern. The pattern evaluator 182 determines whether or not barrier parameters require adjustment, on the basis of results from the frequency analysis.

The switcher 183 includes a first contact point 185 and a second contact point 186. When the pattern evaluator 182 determines that it is unnecessary to adjust the barrier parameters, the switcher 183 uses the second contact point 186 to set a data output pathway. Accordingly, appropriate barrier parameters are output to the barrier adjusting circuit 130. When the pattern evaluator 182 determines that it is necessary to adjust the barrier parameters, the switcher 183 uses the first contact point 185 to set a data output pathway. Accordingly, the barrier parameters subjected to the evaluation process by the pattern evaluator 182 are changed to new barrier parameters by the adjuster 184.

Figure 20:
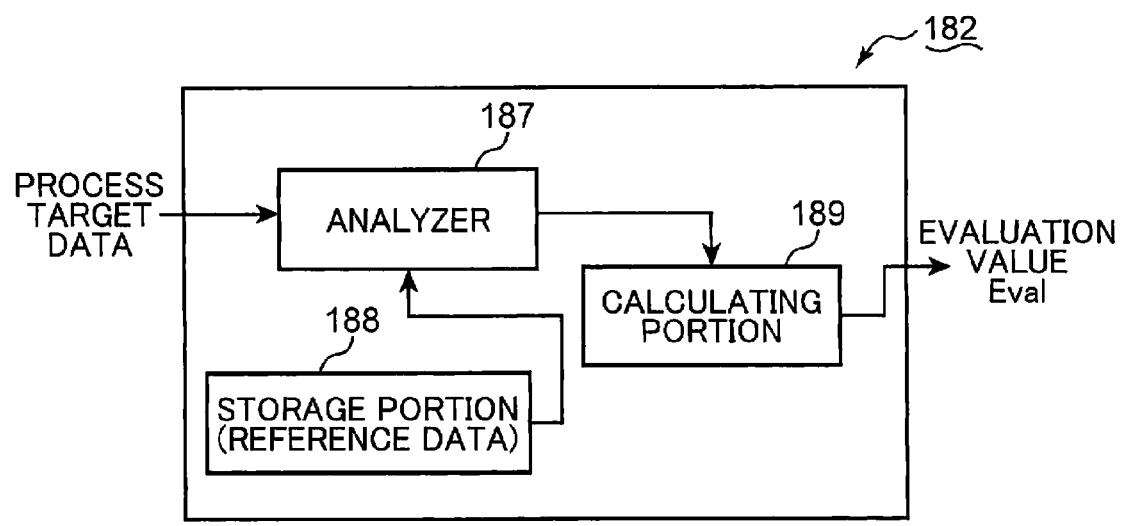
FIG. 20 is a schematic block diagram of a pattern evaluator of the parameter adjuster shown in FIG. 19.

FIG. 20 is a schematic block diagram of the pattern evaluator 182. The pattern evaluator 182 is described with reference to FIG. 20.

The pattern evaluator 182 includes an analyzer 187, a storage portion 188 and a calculating portion 189. The storage portion 188 stores data about a reference pattern (reference data). The analyzer 187 executes a frequency analysis on an estimated moiré pattern and a reference pattern. The calculating portion 189 determines an evaluation value of a moiré pattern of a process target barrier parameter on the basis of results from the frequency analysis by the analyzer 187.

FIG. 21 is a schematic view of a slanted barrier 200C which may be utilized as the separator 160C. The slanted barrier 200C is described with reference to FIGS. 3C, 18 and 21.

The slanted barrier 200C includes a barrier portion 210C which blocks image light emitted from the display portion 150. Openings 230C are formed on the barrier portion 210C to allow transmission of the image light. The openings 230C are inclined at an angle "θ" from the vertical line VL and extend continuously. FIG. 21 is an enlarged view of the slanted barrier 200C around the opening 230C. Therefore, only one opening 230C is shown in FIG. 21 although several openings 230C are formed on the slanted barrier 200C.

The barrier portion 210C includes a contour portion 220C which defines a shape of the opening 230C. The contour portion 220C includes a left contour 221C formed on the left of the center line CL of the opening 230C and a right contour 222C formed on the right of the center line CL of the opening 230C. The right contour 222C faces the left contour 221C. In the present embodiment, the left contour 221C may be exemplified as the first contour. The right contour 222C may be exemplified as the second contour.

The left contour 221C defines left protrusions 211C which periodically protrude toward the center line CL. The right contour 222C defines right protrusions 212C which periodically protrude toward the center line CL. The left and right protrusions 211C, 212C are trapezoidal. Alternatively, the left and right protrusions may have other shapes. In the present embodiment, the left protrusion 211C may be exemplified as the first protrusion. The right protrusion 212C may be exemplified as the second protrusion.

The left protrusion 211C includes an inner edge 213C, which is the closest to the center line CL. The right protrusion 212C includes an inner edge 214C, which is the closest to the center line CL. A virtual line PLL extending along the inner edge 213C is approximately parallel to the center line CL. A virtual line PLR extending along the inner edge 214C is approximately parallel to the center line CL.

Like the first embodiment, the opening 230C includes the opening region 231 between the virtual lines PLL, PLR. The opening 230C includes left notched regions 232C adjacent to the left protrusions 211C on the left of the virtual line PLL and right notched regions 233C adjacent to the right protrusions 212C on the right of the virtual line PLR. The opening region 231 is a rectangular region continuously extending along the center line CL which is inclined at an angle "θ" from the vertical line VL. Unlike the left protrusions 211C, the left notched regions 232C are triangular. Unlike the right protrusions 212C, the right notched regions 233C are triangular. In the present embodiment, the left and right protrusions 211C, 212C are exemplified as the protrusions.

Like the first embodiment, concavo-convex structures formed in left and right edge regions of the opening 230C are referred to as "notched structures". The notched structures are designed to reduce moiré contrast without unnecessarily increasing crosstalk.

The left contour 221C includes left troughs 215C which define peaks of the left notched regions 232C. The right contour 222C includes right troughs 216C which define peaks of the right notched regions 233C. In FIG. 21, a horizontal distance between the left and right troughs 215C, 216C is referred to as "maximum opening width". The maximum opening width is denoted by the symbol "hmax" in FIG. 21. In FIG. 21, a horizontal width of the opening region 231 is referred to as "minimum opening width". The minimum opening width is denoted by the symbol "hmin" in FIG. 21.

In FIG. 21, a distance between upper and lower ends of the left notched region 232C is denoted by the symbol "dsv". A dimension denoted by the symbol "dsv" represents a vertical period width of the left notched regions 232C. When a number of the left notched regions 232C in one pixel pitch is defined as a number of divisions "n", Expression 1 described in the context of the first embodiment may be applied to the vertical period width "dsv" of the left notched regions 232C.

In FIG. 21, a distance between the upper and lower ends of the right notched region 233C is denoted by the symbol "dsv'". A dimension denoted by the symbol "dsv'" represents a vertical period width of the right notched region 233C. The vertical period width "dsv'" of the right notched region 233C may be expressed by the following equation. It should be noted that in the following equation, the symbol "kdsR" denotes a change parameter, which is used to adjust the vertical period width "dsv'" of the right notched regions 233C. Due to the change parameter "kdsR", the right protrusions 212C become different in a formation pattern (period width) from the left protrusions 211C.

$$dsv' = dsv \times (1 + kdsR)$$ [Expression 15]

The upper end of the upper left notched region 232C coincides with the upper end of the opening region 231 whereas the upper end of the upper right notched region 233C is deviated downward from the upper end of the opening region 231 by "dpv". In the following description, a dimension denoted by the symbol "dpv" is referred to as "phase shift". Due to the phase shift "dpv", the right protrusions 212C become different in the formation pattern from the left protrusions 211C.

A vertical distance between the lower end of the upper left notched region 232C and the upper end of the lower left notched region 232C is denoted by the symbol "ddsv". In the following description, a dimension denoted by the symbol "ddsv" is referred to as "notched region gap". It should be noted that a vertical distance between the lower end of the upper right notched region 233C and the upper end of the lower right notched region 233C may be as long as a vertical distance between the lower end of the upper left notched region 232C and the upper end of the lower left notched region 232C.

In FIG. 21, an angle between the upper contour which shapes the right notched regions 233C and the horizontal line HL is denoted by the symbol "φ".

Like the first embodiment, the slanted barrier 200C causes the moiré reducing effect described with reference to FIG. 3C. The left and right protrusions 211C, 212C cover a bright region whereas the left and right notched regions 232C, 233C increase an exposure area. The notched structure is utilized to appropriately control a degree and a range of blur. In addition, since a change parameter is used in the present embodiment, a blur adjustment range is enlarged. For example, a shape of the opening 230C may be determined so as to allow manufacturing errors which occur during manufacturing the slanted barrier 200C. The minimum opening width "hmin" is likely to contain the manufacturing errors. Change parameters may be set in consideration of the manufacturing errors. For example, a moiré pattern may be estimated in consideration of the manufacturing errors.

(Parameter Adjuster)

The parameter adjuster 180 is described with reference to FIGS. 6 and 18 to 21. In the present embodiment, the parameter adjuster 180 is exemplified as the adjuster.

The parameter adjuster 180 receives initial setting information and barrier parameters from the notch adjuster 120. The initial setting information may be the same as that described in the context of the first to third embodiments. The barrier parameters are those processed by the notch adjuster 120 by means of the methods described in the context of the first to third embodiments.

The barrier parameters may include the angles "θ", "φ", the period width "dsv", the maximum opening width "hmax", the minimum opening width "hmin", the phase shift "dpv", the interval "ddsv", and the change parameter "kdsR" described with reference to FIG. 21. The barrier parameters may include an average opening ratio "rhAve" (an average opening ratio for one pixel pitch in the vertical direction) of the opening 230C. These factors which determine the barrier parameters may all be variable parameters. Alternatively, some of these factors may be fixed values. For example, the average opening ratio "rhAve", the angle "θ" and the minimum opening width "hmin" may be fixed design values which are determined on the basis of a structure of the pixels of the display portion 150.

The maximum opening width "hmax" may be a variable value. A change parameter may be assigned to the maximum opening width "hmax". For example, when a change parameter corresponding to a horizontal height (the dimension value denoted by the symbol "dwh" in the first to third embodiments) of the notched structure is set, a value of the maximum opening width "hmax" varies appropriately.

Among the aforementioned various factors, the period width "dsv" is appropriately set by the notch adjuster 120. Therefore, the parameter adjuster 180 does not perform a process for changing the period width "dsv".

The initial setting information may include information such as a preferred viewing distance "dlen", a distance between the display portion 150 and the separator 160C (the slanted barrier 200C), a pixel pitch "p", a sub-pixel pitch "sp" and a parallax number "N". These factors are appropriately adjusted by the initial adjuster 110.

The moiré estimator 181 estimates a moiré pattern on the basis of the method described with reference to FIG. 6. The moiré estimator 181 generates data about the estimated moiré pattern. The data about the estimated moiré pattern are output from the moiré estimator 181 to the pattern evaluator 182.

Reference data stored in the storage portion 188 are related to first and second reference patterns. The first reference pattern is a left image and a moiré pattern obtained from a slanted barrier configured to appropriately separate the left image. The slanted barrier associated with the first reference pattern causes little crosstalk. An inclination angle "θ" of the slanted barrier associated with the first reference pattern is set to "18.435 degrees (3:1)". The second reference pattern is a moiré pattern obtained from a slanted barrier designed so as to moderate moiré. A larger inclination angle "θ" of the slanted barrier associated with the second reference pattern is set than the inclination angle "θ", which is associated with the first reference pattern. In the present embodiment, the inclination angle "θ" of the slanted barrier associated with the second reference pattern is set to "23 degrees". An opening ratio of the slanted barrier associated with the second reference pattern is set to "1.0".

The reference data may be actual image data or an estimation image generated on the basis of the method (moiré simulation) described with reference to FIG. 6.

Figure 22A:
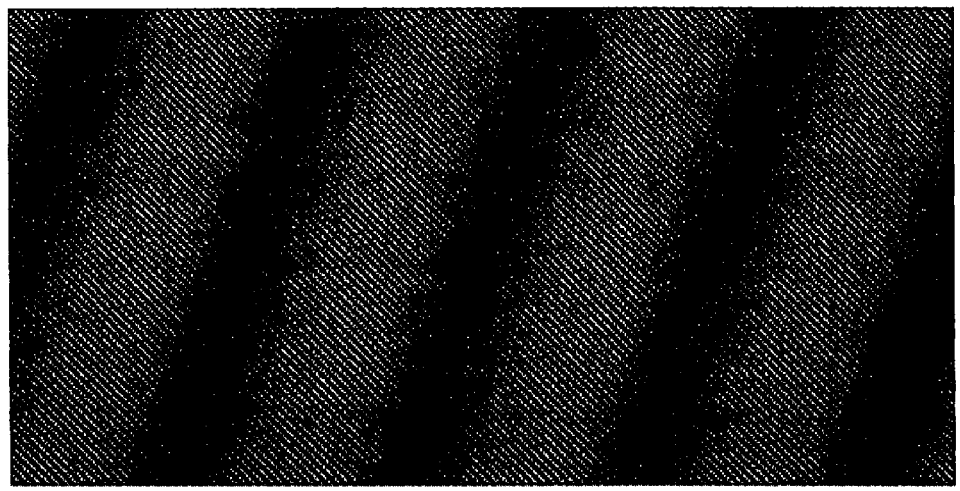
FIG. 22A is an estimation image representing a first reference pattern.
Figure 22B:
FIG. 22B is an estimation image representing a second reference pattern.

FIG. 22A is an estimation image representing a first reference pattern. FIG. 22B is an estimation image representing a second reference pattern. An estimation image is described with reference to FIGS. 6, 22A and 22B.

The estimation images shown in FIGS. 22A and 22B are obtained under the following conditions. A preferred viewing distance is set to "3000 mm". An observing position is set to a position "1000 mm" from image center. A parallax number is set to "4". The estimation images are sized in "400 pixels" by "200 pixels". If actual photography data are used as the reference data, processes such as average brightness correction or color balance correction may be performed as necessary. In the present embodiment, a difference amount is used in frequency analysis about brightness. In this case, the aforementioned correction processes are unnecessary.

Figure 23:
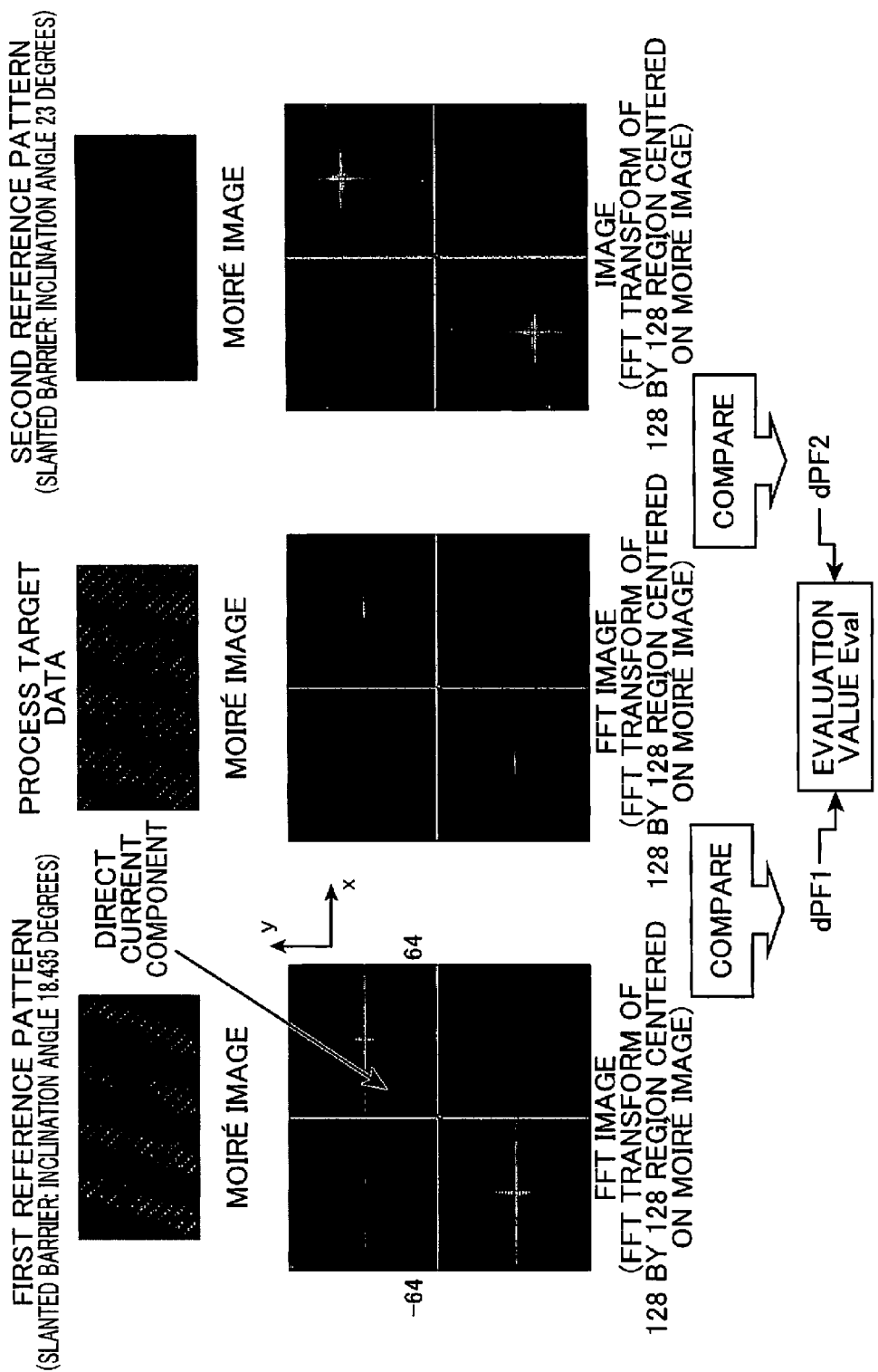
FIG. 23 is a conceptual view of a process performed by the parameter adjuster shown in FIG. 19.

FIG. 23 is a conceptual view of a process performed by the parameter adjuster 180. The process performed by the parameter adjuster 180 is described with reference to FIGS. 21 and 23.

FIG. 23 shows moiré images of first and second reference patterns read by the analyzer 187 from the storage portion 188. FIG. 23 shows process target data output from the moiré estimator 181 to the analyzer 187. It should be noted that the process target data are a moiré image obtained from the slanted barrier 200C determined on the basis of the aforementioned barrier parameters.

The analyzer 187 performs frequency analysis on these moiré images and calculates an average power spectrum within a predetermined frequency range. The analyzer 187 then calculates a difference value "dPF1" between an average power spectrum obtained from the first reference pattern and a power spectrum obtained from the process target data. In addition, the analyzer 187 calculates a difference value "dPF2" between an average power spectrum obtained from the second reference pattern and the power spectrum obtained from the process target data. The calculating portion 189 calculates an evaluation value "Eval" for barrier parameters by means of the following equation.

$$\mathrm{Eval} = (dPF\,\mathrm{Max}1 - dPF1) \times (1.0 - w) + w \times dPF2 \quad [\text{Expression 16}]$$

The symbol "w" used in the aforementioned equation denotes a weight coefficient (0.0≤w≤1.0). The symbol "dPFMax1" used in the aforementioned equation denotes the maximum value of the difference value "dPF1".

A small evaluation value "Eval" means that a frequency distribution of the process target data is significantly different from a frequency distribution obtained from the first reference pattern and that the frequency distribution of the process target data is closer to a frequency distribution obtained from the second reference pattern than the frequency distribution obtained from the first reference pattern. In the following description, the barrier parameter is defined to be appropriate when a small evaluation value "Eval" is obtained. When a small evaluation value "Eval" is obtained, the slanted barrier 200C defined by the barrier parameter associated with the process target data may provide similar performance to crosstalk characteristics of a slanted barrier which causes the first reference pattern. In addition, when a small evaluation value "Eval" is obtained, the slanted barrier 200C defined by the barrier parameter associated with the process target data has a large inclination angle "θ", like a slanted barrier which causes the second reference pattern and moderates moiré.

When the weight coefficient "w" approximates to "θ", the evaluation value "Eval" of process target data, which cause a frequency distribution far from the frequency distribution of the first reference pattern, becomes smaller. In this case, the pattern evaluator 182 determines that the barrier parameter associated with the process target data is appropriate.

When the weight coefficient "w" approximates to "1.0", the evaluation value "Eval" of process target data, which cause a frequency distribution close to the frequency distribution of the second reference pattern, becomes smaller. In this case, the pattern evaluator 182 determines that the barrier parameter associated with the process target data is appropriate.

According to the barrier parameter setting techniques described above, an adjustment range to notched structures is enlarged. According to the barrier parameter evaluation techniques described above, it is determined whether or not a selected barrier parameter is appropriate.

The opening 230C may be formed on a glass plate using emulsion. The notched region gap "ddsv" may result from manufacturing errors which occur at this point. Manufacturing errors may cause a variation in the maximum opening width "hmax". In addition, manufacturing errors may create a phase shift "dpv". The aforementioned dimension errors may also occur in an active barrier such as a liquid crystal barrier. In the present embodiment, the aforementioned errors may be taken into consideration for formation of a notched structure.

The present inventors discovered the following qualitative features.

With respect to an evaluation value of the notched region gap "ddsv", a period with a value "0.2 times" to "0.4 times" as long as the period width "dsv" is likely to appear. The notched region gap "ddsv" set to a value "0.2 times" to "0.4 times" as long as the vertical period width "dsv" of a notched structure is likely to end in favorable results.

With respect to an evaluation value of the phase shift "dpv" of the right notched regions 233C, a period with a value of the vertical period width "dsv" of a notched structure is likely to appear. The phase shift "dpv" set to a value close to "0.5" times as long as the vertical period width "dsv" of a notched structure is likely to end in favorable results.

With respect to an evaluation value of the change parameter "kdsR", a period with a value "0.2 times" to "0.4 times" as long as the period width "dsv" is likely to appear.

With respect to an evaluation value of the vertical period width "dsv" of a notched structure, the period of the evaluation value becomes larger as the minimum opening width "hmin" gets smaller because a small minimum opening width "hmin" allows a large horizontal height of the notched structure (in the first to third embodiments, the dimension value denoted by the symbol "dwh") to be set in order to keep the average opening ratio "rhAve" constant.

In the present embodiment, adjustment using a vertical period width of a notched structure is described. Alternatively, a period width "ds" of a notched structure (c.f. Expression 2 above) may be used for adjustment.

In the present embodiment, the left and right notched regions 232C, 233C are triangular. Alternatively, these elements which constitute a notched structure may be trapezoids or parallelograms. Further alternatively, contours of these elements may be curved lines (e.g. elliptical arcs).

In the present embodiment, a notched structure is described with reference to the slanted barrier 200C. Alternatively, a notched structure may be applied to a vertical stripe barrier or a stepped barrier.

As shown in FIG. 21, the left and right protrusions 211C, 212C protrude horizontally toward the center line CL. Alternatively, protruding directions of the left and right protrusions may be perpendicular to the center line CL.

The relationship about the area of an opening described with reference to Expressions 12 to 14 above is applicable to the present embodiment. When a sum of a horizontal height "dwhL" of a notched structure on the left of the center line of an opening and a horizontal height "dwhR" of a notched structure on the right of the center line of the opening is equal to twice as large as the horizontal height "dwh" of a notched structure represented by Expression 12 above, the relationship represented by Expression 14 above is applicable. Therefore, the horizontal heights "dwhL", "dwhR" of the notched structures may be set to different numerical values from each other.

In order to set an appropriate average opening ratio "rhAve" in consideration of crosstalk, the maximum opening width "hmax" may be set no more than the sub-pixel pitch "sp". When the minimum opening width "hmin" equals or falls below "0.5 times" as large as the sub-pixel pitch "sp", adverse effects such as fringes on an image may occur because of a rapid variation in opening width. Or an observed image may become susceptive to a variation of an observing position of an observer in the horizontal and/or vertical directions. Therefore, the minimum opening width "hmin" may be set to a value no less than "0.7 times" as large as the sub-pixel pitch "sp".

A sub-pixel pitch is used as various criteria about a parallax image. As described above, by appropriately setting an average opening ratio, maximum and minimum opening widths on the basis of a sub-pixel pitch, a moiré pattern may be reduced with little increased crosstalk.

In the present embodiment, the analyzer 187 applies a two-dimensional FFT process to process target data output from the moiré estimator 181. Alternatively, the analyzer may perform an analysis by means of the luminance distribution described in the context of the second embodiment. Alternatively, the analyzer may perform a comparison of moiré patterns by means of image-recognition techniques.

Fifth Embodiment

Figure 24:
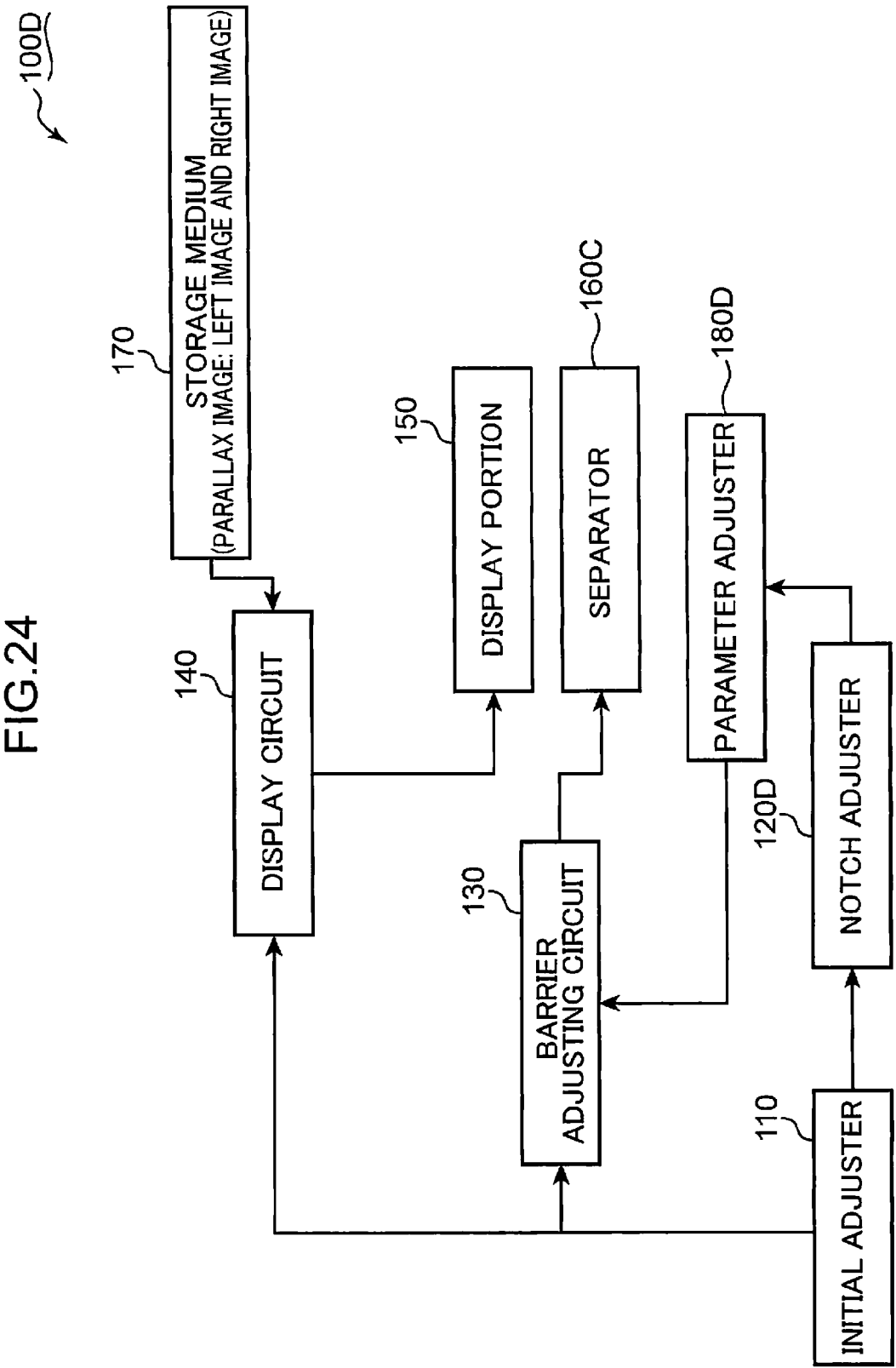
FIG. 24 is a schematic block diagram of a display apparatus according to the fifth embodiment.

FIG. 24 is a schematic block diagram of the display apparatus 100D according to the fifth embodiment. The display apparatus 100D is described with reference to FIG. 24. It should be noted that the same elements as the fourth embodiment are denoted by the same reference numerals. The description of the fourth embodiment is applied to the elements denoted by the same reference numerals.

Like the fourth embodiment, the display apparatus 100D includes the initial adjuster 110, the barrier adjusting circuit 130, the display circuit 140, the display portion 150, the separator 160C and the storage medium 170. The display apparatus 100D further includes a notch adjuster 120D and a parameter adjuster 180D.

The display apparatus 100D is different from the fourth embodiment in the notch and parameter adjusters 120D, 180D. The notch adjuster 120D outputs several candidates about a barrier parameter. The parameter adjuster 180D performs a quantitative evaluation for the candidates.

FIG. 25 is a conceptual view of data output from the notch adjuster 120D to the parameter adjuster 180D. The notch adjuster 120D is described with reference to FIGS. 24 and 25.

The notch adjuster 120D determines whether or not the notched structure itself may cause adverse effects such as horizontal diagonal and vertical stripes by means of the methods described in the context of the first to third embodiments. The notch adjuster 120D determined that the notched structure itself may cause adverse effects such as horizontal, diagonal and vertical stripes adjusts a vertical period width "dsv" of the notched structure. The notch adjuster 120D calculates several candidates of an appropriate period width "dsv".

The notch adjuster 120 assigns a barrier parameter to each calculated candidate. As shown in FIG. 25, the notch adjuster 120D calculates "nnum" number of the candidates.

FIG. 26 is a schematic block diagram of the parameter adjuster 180D. It is described how to process the data output from the notch adjuster 120D with reference to FIGS. 6, 20, 21 and 24 to 26. In the present embodiment, the parameter adjuster 180D is exemplified as the adjuster.

As shown in FIG. 26, the parameter adjuster 180D includes a parameter setting portion 381. The "nnum" number of candidates calculated by the notch adjuster 120D are input to the parameter adjuster 180D.

As shown in FIG. 25, the parameter setting portion 381 assigns "gnum" number of barrier parameters to each candidate. Therefore, the parameter setting portion 381 generates a total of ("nnum"×"gnum") number of barrier parameters. In the present embodiment, a number of barrier parameters assigned to each candidate is constant. Alternatively, the numbers of barrier parameters assigned to the candidates may be different from each other.

The barrier parameters may include the angles "θ", "φ", the period width "dsv", the maximum and minimum opening widths "hmax", "hmin", the phase shift "dpv", the interval "ddsv", and the change parameter "kdsR" described with reference to FIG. 21. The barrier parameters may include an average opening ratio "rhAve" (an average opening ratio with respect to one pixel pitch in the vertical direction) of the opening 230C. The parameter setting portion 381 uses these factors, which are used for barrier parameters to create several candidate vectors (a candidate vector group).

The parameter setting portion 381 receives initial setting information from the notch adjuster 120D. The initial setting information may be the same as the initial setting information described in the context of the first to third embodiments. The parameter setting portion 381 uses the initial setting information to output other fixed values (e.g. a distance between the display portion 150 and the slanted barrier 200C) necessary for estimating a moiré pattern.

The parameter adjuster 180D further includes a moiré estimator 181D. The moiré estimator 181D estimates a moiré pattern observed from an observing position U (Xc, Yc) (c.f. FIG. 6) for each candidate vector. The moiré estimator 181D may generate image data about the estimated moiré pattern. In the present embodiment, a moiré pattern represented by the image data is exemplified as the image light transmission pattern.

The parameter adjuster 180D further includes a pattern evaluator 182D. The pattern evaluator 182D performs frequency analysis by means of two-dimensional FFT on the image data output from the moiré estimator 181D. The pattern evaluator 182D may perform an evaluation of the barrier parameters by means of a similar method to that described with reference to FIG. 20.

Like the fourth embodiment, the parameter adjuster 180D further includes the switcher 183. When the pattern evaluator 182D obtains an evaluation value no less than a predetermined value, the switcher 183 uses the second contact point 186 to set a data output pathway. Accordingly, an appropriate barrier parameter selected from several candidates is output to the barrier adjusting circuit 130. Unless the pattern evaluator 182D obtains an evaluation value no less than a predetermined value, the switcher 183 uses the first contact point 185 to set a data output pathway.

The parameter adjuster 180D further includes a search portion 382. When the switcher 183 uses the first contact point 185 to set a data output pathway, the search portion 382 adjusts and searches the candidate vectors.

As described above, the parameter setting portion 381 generates a large number of candidate vectors. The pattern evaluator 182D assigns evaluation values to the candidate vectors. Based on the evaluation values, the search portion 382 performs a multivariate parameter optimal search (e.g. a genetic algorithm, a neural network, or a least square method).

Figure 27:
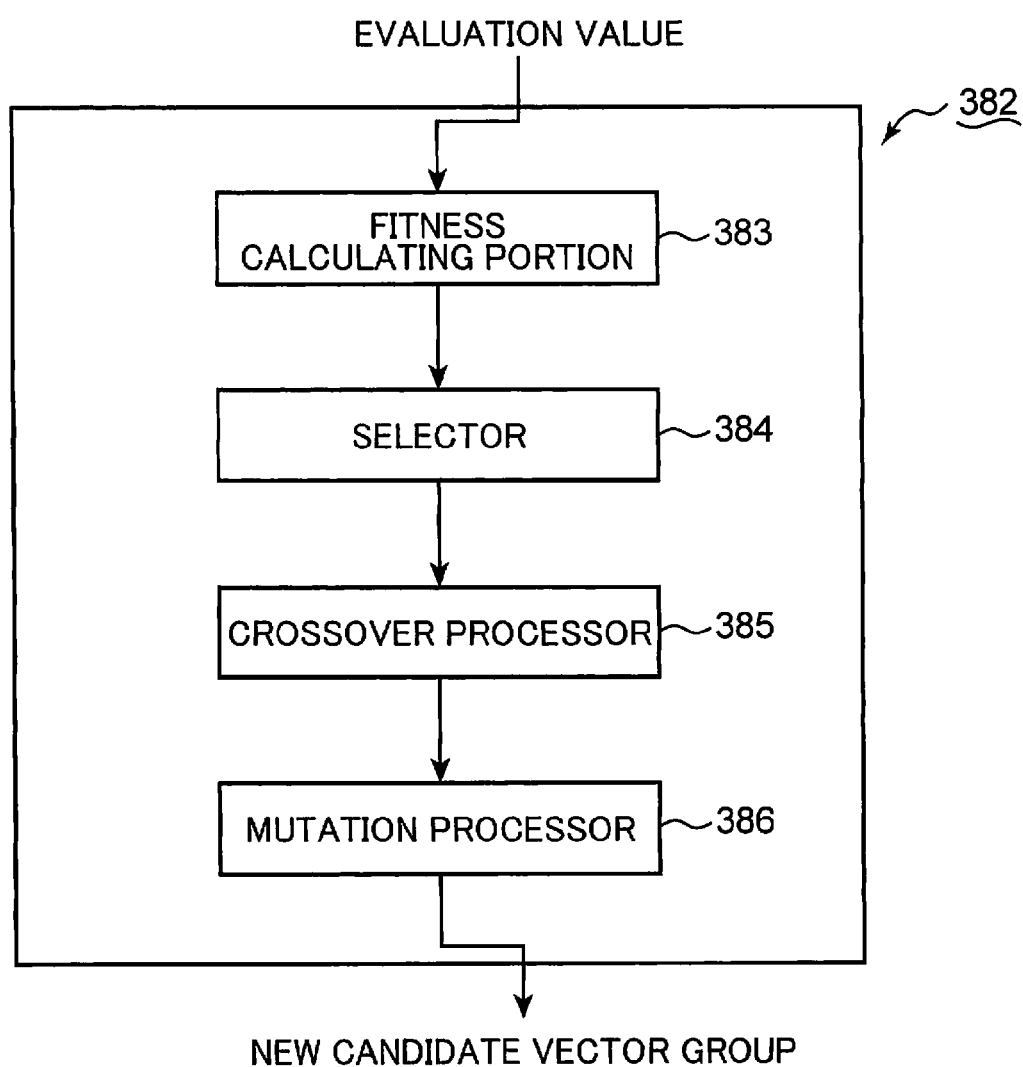
FIG. 27 is a schematic block diagram of a search portion of the parameter adjuster shown in FIG. 26.

FIG. 27 is a schematic block diagram of the search portion 382. The search portion 382 is described with reference to FIG. 27.

The search portion 382 includes a fitness calculating portion 383, a selector 384, a crossover processor 385 and a mutation processor 386. Processes performed by the fitness calculating portion 383, the selector 384, the crossover processor 385 and the mutation processor 386 are described hereinafter.

Figure 28:
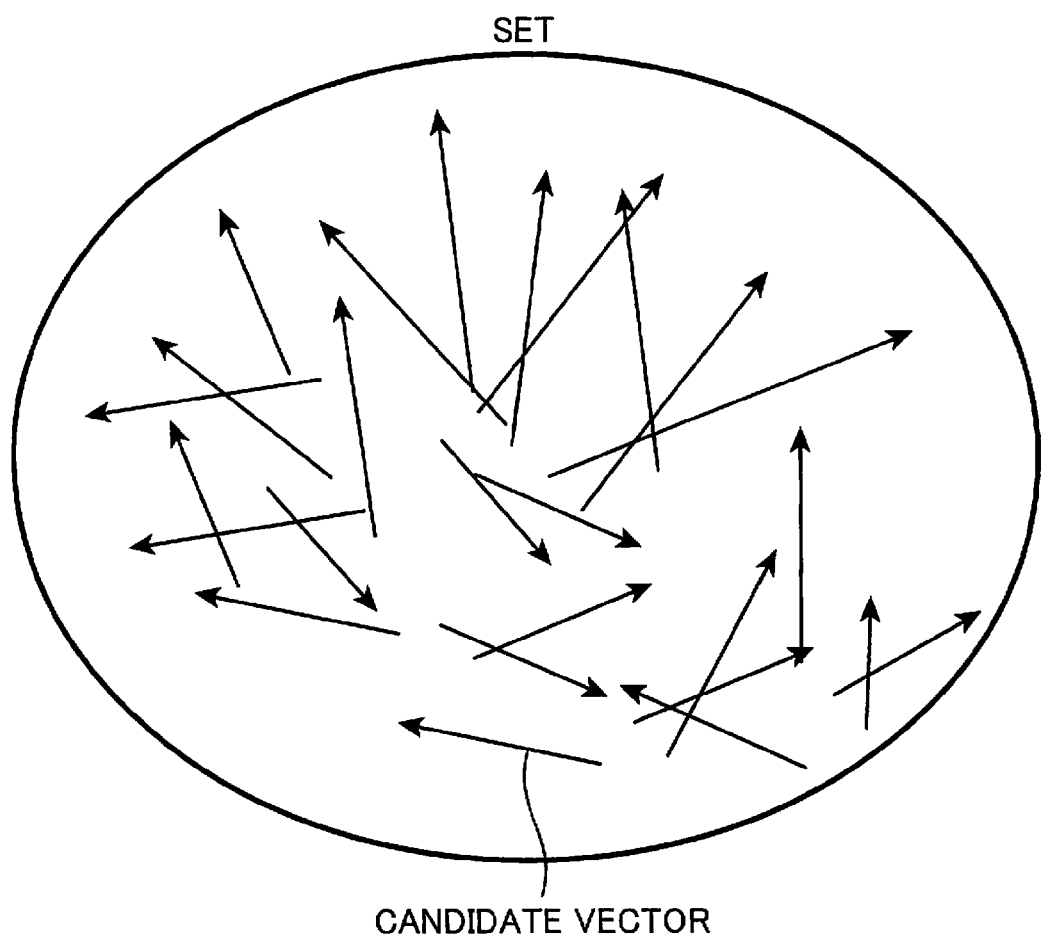
FIG. 28 is a conceptual view of data processed by the parameter adjuster shown in FIG. 26.

FIG. 28 is a conceptual view of data processed by the parameter adjuster 180D. Data processes by the parameter adjuster 180D are described with reference to FIGS. 8A, 8B and 26 to 28.

(Step 1)

As described above, the parameter setting portion 381 generates a total of ("nnum"×"gnum") number of candidate vectors. FIG. 28 represents a set consisting of the candidate vectors. Factors (the angles "θ", "φ", the period width "dsv", the maximum and minimum opening widths "hmax", "hmin", the phase shift "dpv", the interval "ddsv", the change parameter "kdsR", and the average opening ratio "rhAve") of candidate vectors represent specific solutions of parameters in an optimum solution search problem of a process target. A candidate vector corresponds to a specific solution vector. Borrowing from biological terminologies, these factors of candidate vectors are referred to as "genes". A candidate vector is referred to as "chromosome". The fitness calculating portion 383 uses the candidate vectors generated by the parameter setting portion 381 to create an initial set.

(Step 2)

The fitness calculating portion 383 evaluates a quality of a solution of a candidate vector on the basis of an evaluation scale (evaluation function) set in advance. In the present embodiment, the pattern evaluator 182D outputs ("nnum"× "gnum") number of evaluation values corresponding to the respective candidate vectors to the fitness calculating portion 383. The fitness calculating portion 383 may process the evaluation values received from the pattern evaluator 182D as an evaluation result. Alternatively, the fitness calculating portion 383 may use other linear transformation functions or non-linear transformation functions to evaluate a quality of a solution of a candidate vector. An evaluation value representing the evaluation result is output from the fitness calculating portion 383 to the selector 384.

(Step 3)

The selector 384 determines a fitness of a solution on the basis of a magnitude relationship of the evaluation values. The selector 384 may determine that a large evaluation value is a solution having good fitness (maximization problem). Alternatively, the selector 384 may determine that a small evaluation value is a solution having good fitness (minimization problem). The selector 384 deletes solution vectors with low fitness from the set (c.f. FIG. 28). Accordingly, solution vectors with high fitness remain in the set (selection). Various known methods may be used as a selection method.

(Step 4)

With respect to the set obtained in Step 3 above, the crossover and/or mutation processors 385, 386 perform genetic modification such as crossover (global search) and/or mutation (local search) to generate a new set of solution vectors (candidate vectors).

As a result of the modification process performed on a process target candidate vector, a new candidate vector is created. The pattern evaluator 182D calculates an evaluation value for the new candidate vector. When the evaluation value is greater than a predetermined value, the new candidate vector is output as an appropriate barrier parameter via the switcher 183. Alternatively, when an absolute value of a variation of an evaluation value is smaller than a predetermined value, the parameter adjuster 180D may end the process. The process routine of Steps 2 to 4 described above is repeated until the parameter adjuster 180D ends the process. Accordingly, an appropriate barrier parameter is extracted. Since an appropriate barrier parameter is output to the barrier adjusting circuit 130, a notched structure with an appropriate period width is formed.

From the data presented in FIGS. 8A and 8B, it is expected that there are several period widths of a notched structure which does not cause adverse effects such as horizontal stripes. It is also expected that there is several appropriate candidates of parameters such as an opening width and an inclination angle for a period width of a notched structure. The principles of the present embodiment allow automatic discovery of appropriate barrier parameters by means of a multivariate parameter vector optimization method. Since the quantitative evaluation described in the context of the fourth embodiment is applied to appropriately selected candidate vectors (barrier parameters), the notched structure is less likely to cause adverse effects such as horizontal stripes.

In the present embodiment, adjustment using a vertical period width of a notched structure is described. Alternatively, a period width "ds" of a notched structure (c.f. Expression 2 above) may be used for the adjustment.

In the present embodiment, the left and right notched regions 232C, 233C are triangular. Alternatively, these elements which constitute a notched structure may be trapezoids or parallelograms. Further alternatively, contours of these elements may be curved lines (e.g. elliptical arcs).

In the present embodiment, a notched structure is described with reference to the slanted barrier 200C. Alternatively, a notched structure may be applied to a vertical stripe barrier or a stepped barrier.

As shown in FIG. 21, the left and right protrusions 211C, 212C protrude horizontally toward the center line CL. Alternatively, protruding directions of the left and right protrusions may be perpendicular to the center line CL.

The relationship about the area of an opening described with reference to Expressions 12 to 14 above is also applicable to the present embodiment. When a sum of a horizontal height "dwhL" of a notched structure on the left of the center line of an opening and a horizontal height "dwhR" of a notched structure on the right of the center line of the opening is equal to twice as large as the horizontal height "dwh" of a notched structure represented by Expression 12 above, the relationship represented by Expression 14 above is applicable. Therefore, the horizontal heights "dwhL", "dwhR" of the notched structures may be set to different numerical values from each other.

In order to set an appropriate average opening ratio "rhAve" in consideration of crosstalk, the maximum opening width "hmax" may be set no more than the sub-pixel pitch "sp". When the minimum opening width "hmin" equals or falls below "0.5 times" as large as the sub-pixel pitch "sp", adverse effects such as fringes on an image may occur because of a rapid variation in opening width. Or an observed image may become susceptive to a variation of an observing position of an observer in the horizontal and/or vertical directions. Therefore, the minimum opening width "hmin" may be set to a value no less than "0.7 times" as large as the sub-pixel pitch "sp".

A sub-pixel pitch is used as various criteria about a parallax image. As described above, by appropriately setting an average opening ratio, maximum and minimum opening widths on the basis of a sub-pixel pitch, a moiré pattern may be reduced with little increased crosstalk.

In the present embodiment, the pattern evaluator 182D applies a two-dimensional FFT process to process target data output from the moiré estimator 181D. Alternatively, the pattern evaluator may perform an analysis by means of the luminance distribution described in the context of the second embodiment. Alternatively, the pattern evaluator may perform a comparison of moiré patterns by means of image-recognition techniques.

Sixth Embodiment

A notched structure of a display apparatus according to the present embodiment is designed so that areas of pixels observed through an opening are uniform in the horizontal direction. Accordingly, the notched structure may reduce moiré contrast with little increased crosstalk. The techniques described in the context of the first embodiment are applied to the notched structure according to the present embodiment. Therefore, the notched structure itself does not cause adverse effects such as horizontal stripes. It should be noted that the principles of the aforementioned various embodiments may be combined with the principles of the present embodiment.
(Principle of Moiré Generation)

Figure 29A:
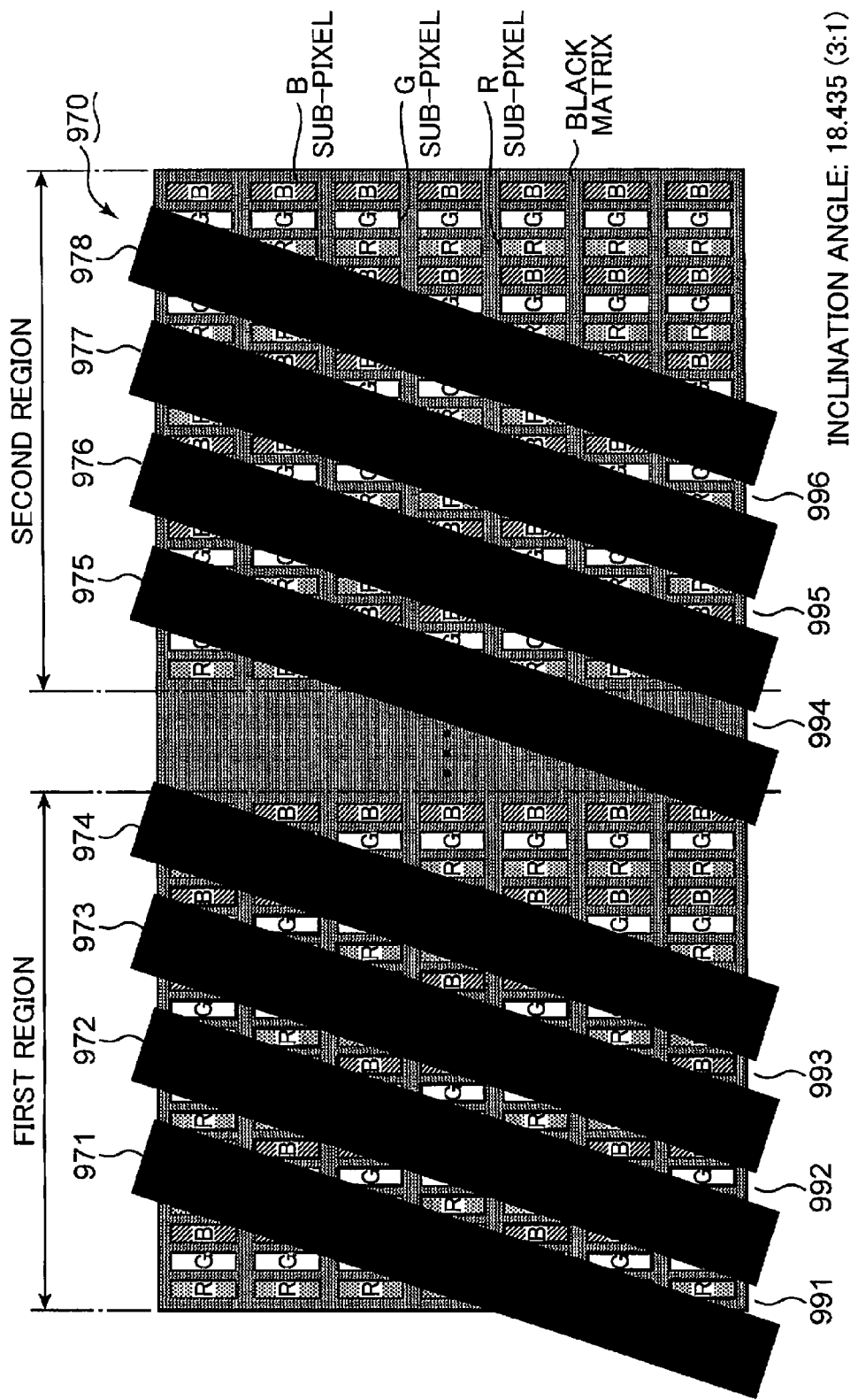
FIG. 29A is a schematic view of a slanted barrier overlaid on a display surface including sub-pixels, which are arranged in the vertical and horizontal directions, and a black matrix.
Figure 29B:
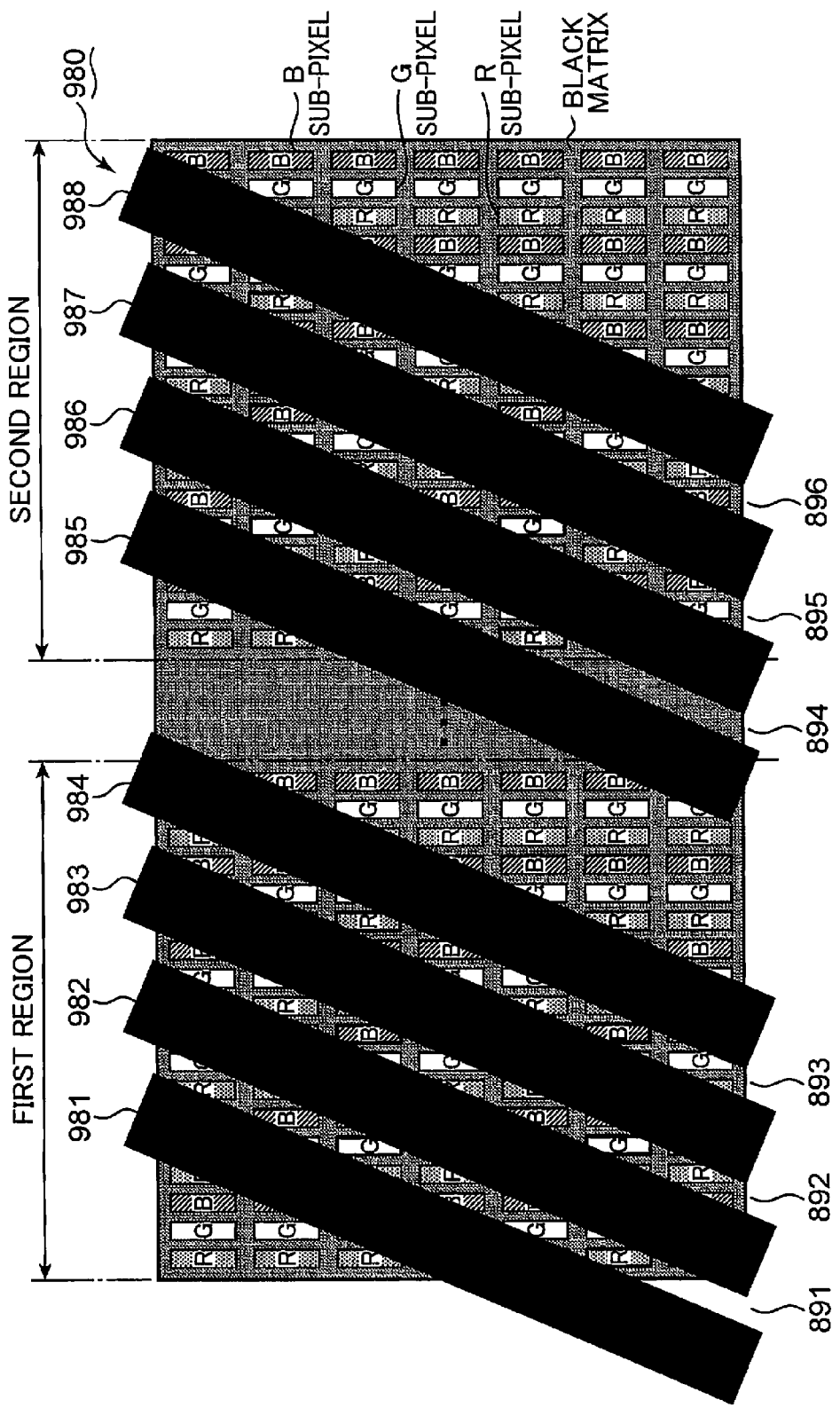
FIG. 29B is a schematic view of a slanted barrier overlaid on a display surface including sub-pixels, which are arranged in a matrix pattern, and a black matrix.

FIG. 29A is a schematic view of a slanted barrier 970 overlaid on a display surface including sub-pixels (R, G and B sub-pixels) aligned in the vertical and horizontal directions and a black matrix. FIG. 29B is a schematic view of a slanted barrier 980 overlaid on a display surface including sub-pixels (R, G and B sub-pixels) aligned in a matrix pattern and a black matrix. Principles of moiré generation are described with reference to FIGS. 29A and 29B.

FIGS. 29A and 29B show a first region and a second region on the right of the first region. It should be noted the second region is apart from the first region.

The slanted barrier 970 includes barrier portions 971, 972, 973, 974 which overlap the first region. The slanted barrier 970 includes barrier portions 975, 976, 977, 978 which overlap the second region. The barrier portions 971 to 978 are inclined at an angle of "18.435 degrees" (3:1) from the vertical line. The slanted barrier 970 has a structure which is likely to cause moiré.

An opening 991 is formed between the barrier portion 971 and the barrier portion 972 adjacent to the right of the barrier portion 971. An opening 992 is formed between the barrier portion 972 and the barrier portion 973 adjacent to the right of the barrier portion 972. An opening 993 is formed between the barrier portion 973 and the barrier portion 974 adjacent to the right of the barrier portion 973.

An opening 994 is formed between the barrier portion 975 and the barrier portion 976 adjacent to the right of the barrier portion 975. An opening 995 is formed between the barrier portion 976 and the barrier portion 977 adjacent to the right of the barrier portion 976. An opening 996 is formed between the barrier portion 977 and the barrier portion 978 adjacent to the right of the barrier portion 977. It should be noted that opening ratios of the openings 991 to 996 are set to "1.0".

The slanted barrier 980 includes barrier portions 981, 982, 983, 984 which overlap the first region. The slanted barrier 980 includes barrier portions 985, 986, 987, 988 which overlap the second region. The barrier portions 981 to 988 are inclined at an angle of "23 degrees" from the vertical line. In comparison to the slanted barrier 970, the slanted barrier 980 is less likely to cause moiré.

An opening 891 is formed between the barrier portion 981 and the barrier portion 982 adjacent to the right of the barrier portion 981. An opening 892 is formed between the barrier portion 982 and the barrier portion 983 adjacent to the right of the barrier portion 982. An opening 893 is formed between the barrier portion 983 and the barrier portion 984 adjacent to the right of the barrier portion 983.

An opening 894 is formed between the barrier portion 985 and the barrier portion 986 adjacent to the right of the barrier portion 985. An opening 895 is formed between the barrier portion 986 and the barrier portion 987 adjacent to the right of the barrier portion 986. An opening 896 is formed between the barrier portion 987 and the barrier portion 988 adjacent to the right of the barrier portion 987. It should be noted that opening ratios of the openings 891 to 896 are set to "1.0".

A parallax number of the slanted barriers 970, 980 is set to "4". The following principles of moiré generation are also common to slanted barriers with other parallax numbers.

With respect to the slanted barrier 970 shown in FIG. 29A, a large number of sub-pixels appear at each center of the openings 991, 992, 993 which correspond to the first region whereas a large number of black matrix regions appear at each center of the openings 994, 995, 996 which correspond to the second region. A barrier pitch is set to a value, which is close to a product of the parallax number and the sub-pixel pitch. Therefore, an area of sub-pixels exposed through the openings 991, 992, 993 increases in the first region whereas an area of sub-pixels exposed through the openings 994, 995, 996 decreases in the second region apart from the first region. Since a large number of sub-pixels are exposed in the first region, an observer recognizes the first region as a bright region. Since the area of exposed sub-pixels is small in the second region, the observer recognizes the second region as a dark region. Since bright and dark regions are alternately (periodically) created, a significant moiré pattern is generated in an image observed through the slanted barrier 970. As described above, a moiré pattern may be caused by heterogeneity in the areas of exposed sub-pixels.

With respect to the slanted barrier 980 shown in FIG. 29B, there is no significant difference between an area of sub-pixels exposed through the openings 891, 892, 893 which correspond to the first region and an area of sub-pixels exposed through the openings 894, 895, 896 which correspond to the second region. Therefore, the slanted barrier 980 does not cause locally bright regions (e.g. the first region described with reference to FIG. 29A). In addition, the slanted barrier 980 does not cause locally dark regions (e.g. the second region described with reference to FIG. 29A). Since the slanted barrier 980 causes little contrast in an image displayed on the display surface, the observer is less likely to recognize a moiré pattern. As a result of eliminating the heterogeneity in the exposure areas of sub-pixels described with reference to FIG. 29A, the slanted barrier 980 shown in FIG. 29B is less likely to cause a moiré pattern.

(Various Slanted Barriers)

Figure 30:
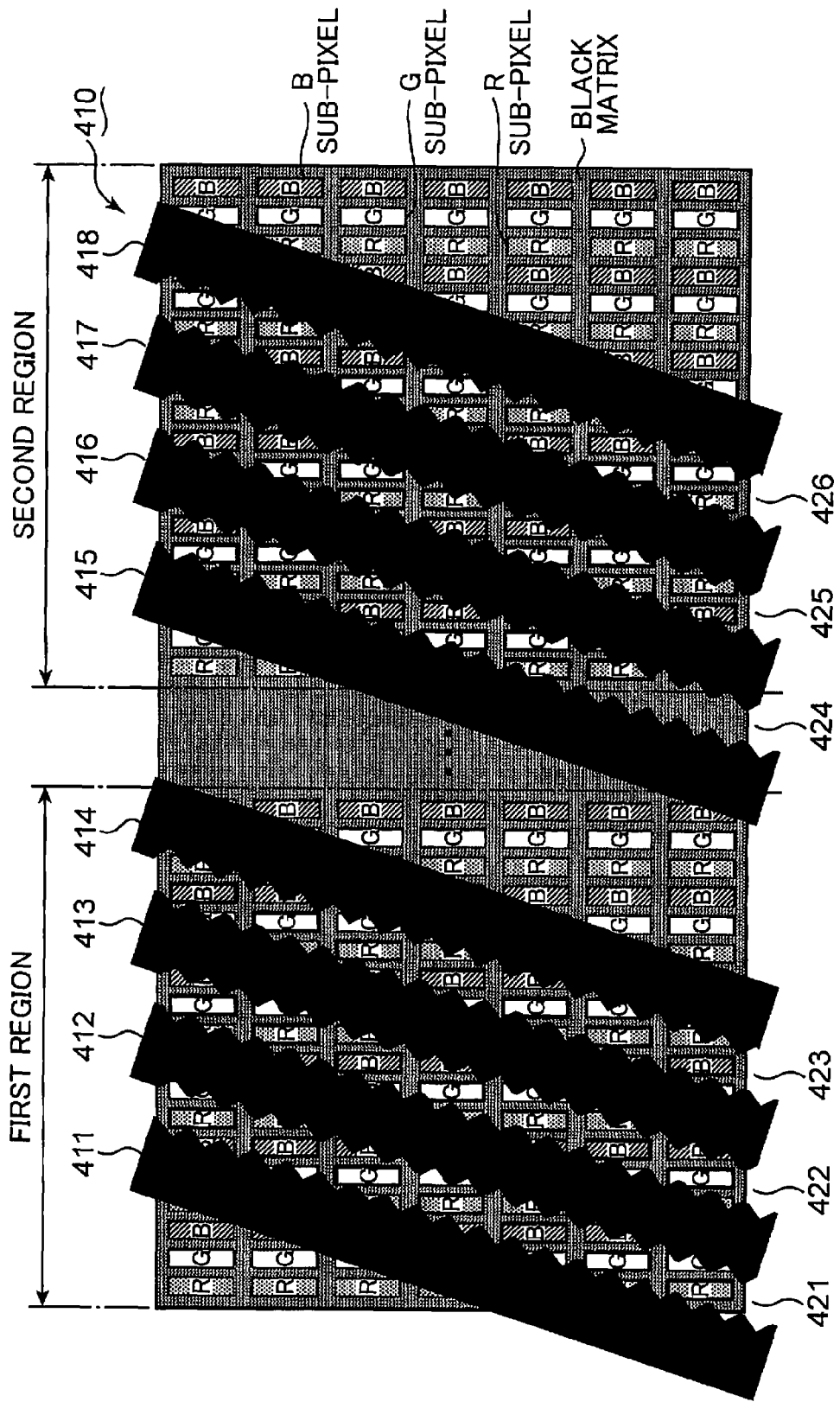
FIG. 30 is a schematic view of a slanted barrier created on the basis of principles of the first embodiment.

FIG. 30 is a schematic view of a slanted barrier 410 designed according to the principles of the first embodiment. The slanted barrier 410 is described with reference to FIGS. 2, 21, 29A and 30.

Like FIG. 29A, FIG. 30 shows the first and second regions. The slanted barrier 410 includes barrier portions 411, 412, 413, 414 which overlap the first region. The slanted barrier 410 includes barrier portions 415, 416, 417, 418 which overlap the second region. Like the slanted barrier 970 described with reference to FIG. 29A, the barrier portions 411 to 418 are inclined at an angle of "18.435 degrees" from the vertical line.

An opening 421 is formed between the barrier portion 411 and the barrier portion 412 adjacent to the right of the barrier portion 411. An opening 422 is formed between the barrier portion 412 and the barrier portion 413 adjacent to the right of the barrier portion 412. An opening 423 is formed between the barrier portion 413 and the barrier portion 414 adjacent to the right of the barrier portion 413.

An opening 424 is formed between the barrier portion 415 and the barrier portion 416 adjacent to the right of the barrier portion 415. An opening 425 is formed between the barrier portion 416 and the barrier portion 417 adjacent to the right of the barrier portion 416. An opening 426 is formed between the barrier portion 417 and the barrier portion 418 adjacent to the right of the barrier portion 417. It should be noted that an average opening ratio of the openings 421 to 426 is equal to the opening ratio of the slanted barrier 970 described with reference to FIG. 29A. Therefore, a ratio of a minimum opening width (the dimension denoted by the symbol "hmin" in FIG. 2) of the openings 421 to 426 to the sub-pixel pitch is smaller than the ratio of the slanted barrier 970 described with reference to FIG. 29A.

The number of divisions "n" of the notched structure of the slanted barrier 410 is set to "2.5". It should be noted that the number of divisions "n" of the notched structure of the slanted barrier 410 is set so as to satisfy "Condition 1" to "Condition 3" described in the context of the first embodiment. For example, the number of divisions "n" of the notched structure of the slanted barrier 410 is determined so that a value (quotient) obtained by dividing a vertical length of a sub-pixel by a vertical period width (the dimension denoted by the symbol "dsv" in FIG. 2) of the notched structure is a value away from an integer value. By setting the number of divisions "n" of the notched structure of the slanted barrier 410 so that the quotient is a value near an intermediate value of consecutive integers, the slanted barrier 410 may reduce a moiré pattern without little influence from manufacturing errors.

A horizontal height (the dimension denoted by the symbol "dwh" in FIG. 2) of the notched structure of the slanted barrier 410 is equal between the left and right notched structures. In addition, a phase shift (the dimension denoted by the symbol "dpv" in FIG. 21) between the left and right notched structures is set to "0".

With respect to the second region, the notched structure of the slanted barrier 410 increases the area of sub-pixels exposed through the openings 424, 425, 426. Accordingly, in comparison to the slanted barrier 970, the slanted barrier 410 may brighten an image displayed in the second region. It should be noted that the minimum opening width of the openings 424, 425, 426 is smaller than the opening width of the openings 994, 995, 996 described with reference to FIG. 29A. In the second region, since an exposure area of a black matrix is large, the minimum opening width set smaller than the opening width of the openings 994, 995, 996 is less likely to affect an exposure area of the sub-pixels.

Like the second region, the minimum opening width of the openings 421, 422, 423 is smaller than the opening width of the openings 991, 992, 993 described with reference to FIG. 29A. Unlike the second region, since a large number of sub-pixels appear at each center of the openings 421, 422, 423, the minimum opening width set smaller than the opening width of the openings 994, 995, 996 reduces the exposure area of sub-pixels. However, since the notched structure increases the exposure area of sub-pixels, the effect of the small minimum opening width is moderated by the notched structure. Therefore, in the first region, the slanted barrier 410 may achieve brightness, which is approximately equivalent to the slanted barrier 970 described with reference to FIG. 29A.

As described above, by using the slanted barrier 410, a difference in brightness between the first and second regions is reduced. Therefore, the observer is less likely to observe a significant moiré pattern.

Figure 31:
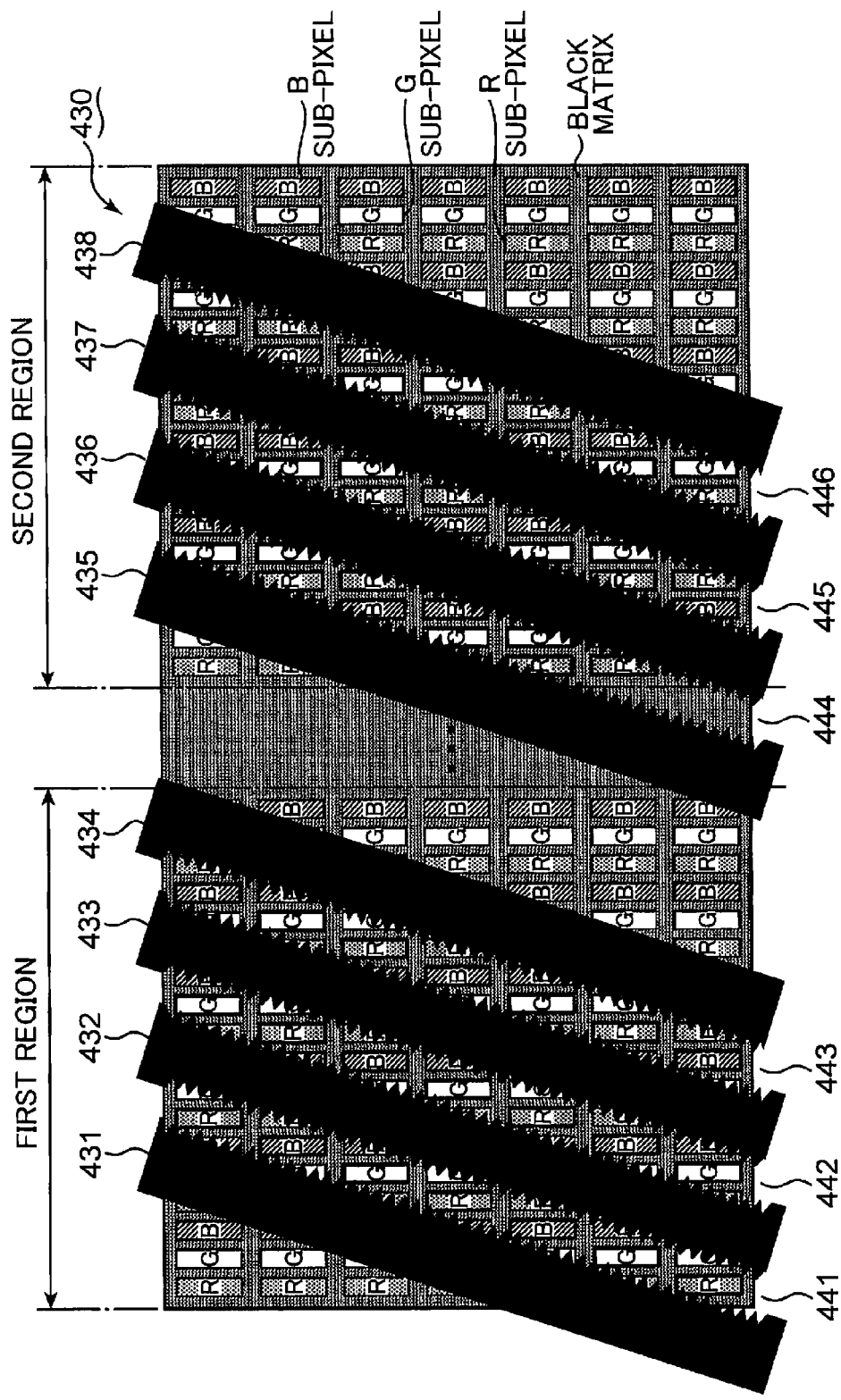
FIG. 31 is a schematic view of a slanted barrier created on the basis of principles of the first embodiment.

FIG. 31 is a schematic view of a slanted barrier 430 designed on the basis of the principles of the first embodiment. The slanted barrier 430 is described with reference to FIGS. 2, 21, 30 and 31.

Like FIG. 30, FIG. 31 shows the first and second regions. The slanted barrier 430 includes barrier portions 431, 432, 433, 434 which overlap the first region. The slanted barrier 430 includes barrier portions 435, 436, 437, 438 which overlap the second region. Like the slanted barrier 410 described with reference to FIG. 30, the barrier portions 431 to 438 are inclined at an angle of "18.435 degrees" from the vertical line.

An opening 441 is formed between the barrier portion 431 and the barrier portion 432 adjacent to the right of the barrier portion 431. An opening 442 is formed between the barrier portion 432 and the barrier portion 433 adjacent to the right of the barrier portion 432. An opening 443 is formed between the barrier portion 433 and the barrier portion 434 adjacent to the right of the barrier portion 433.

An opening 444 is formed between the barrier portion 435 and the barrier portion 436 adjacent to the right of the barrier portion 435. An opening 445 is formed between the barrier portion 436 and the barrier portion 437 adjacent to the right of the barrier portion 436. An opening 446 is formed between the barrier portion 437 and the barrier portion 438 adjacent to the right of the barrier portion 437. It should be noted that an average opening ratio of the openings 441 to 446 is equal to the opening ratio of the slanted barrier 410 described with reference to FIG. 30.

Like the slanted barrier 410 described with reference to FIG. 30, a horizontal height (the dimension denoted by the symbol "dwh" in FIG. 2) of the notched structure of the slanted barrier 430 is equal between the left and right notched structures. In addition, a phase shift (the dimension denoted by the symbol "dpv" in FIG. 21) between the left and right notched structures is set to "0". The number of divisions "n" used to design the notched structure of the slanted barrier 430 is "6.5". Therefore, the notched structure of the slanted barrier 430 is designed by means of a larger number of divisions (a smaller period width "dsv") than the slanted barrier 410 described with reference to FIG. 30.

With respect to the second region, an area of sub-pixels exposed through the openings 441 to 446 is larger than an area of sub-pixels exposed through the openings 421 to 426 described with reference to FIG. 30. Therefore, when the notched structure is designed by means of a large number of divisions, a difference in brightness (a difference in exposure areas of the sub-pixels) between the first and second regions is reduced. Consequently, the slanted barrier 430 may reduce a moiré pattern more effectively than the slanted barrier 410 described with reference to FIG. 30.

Figure 32:
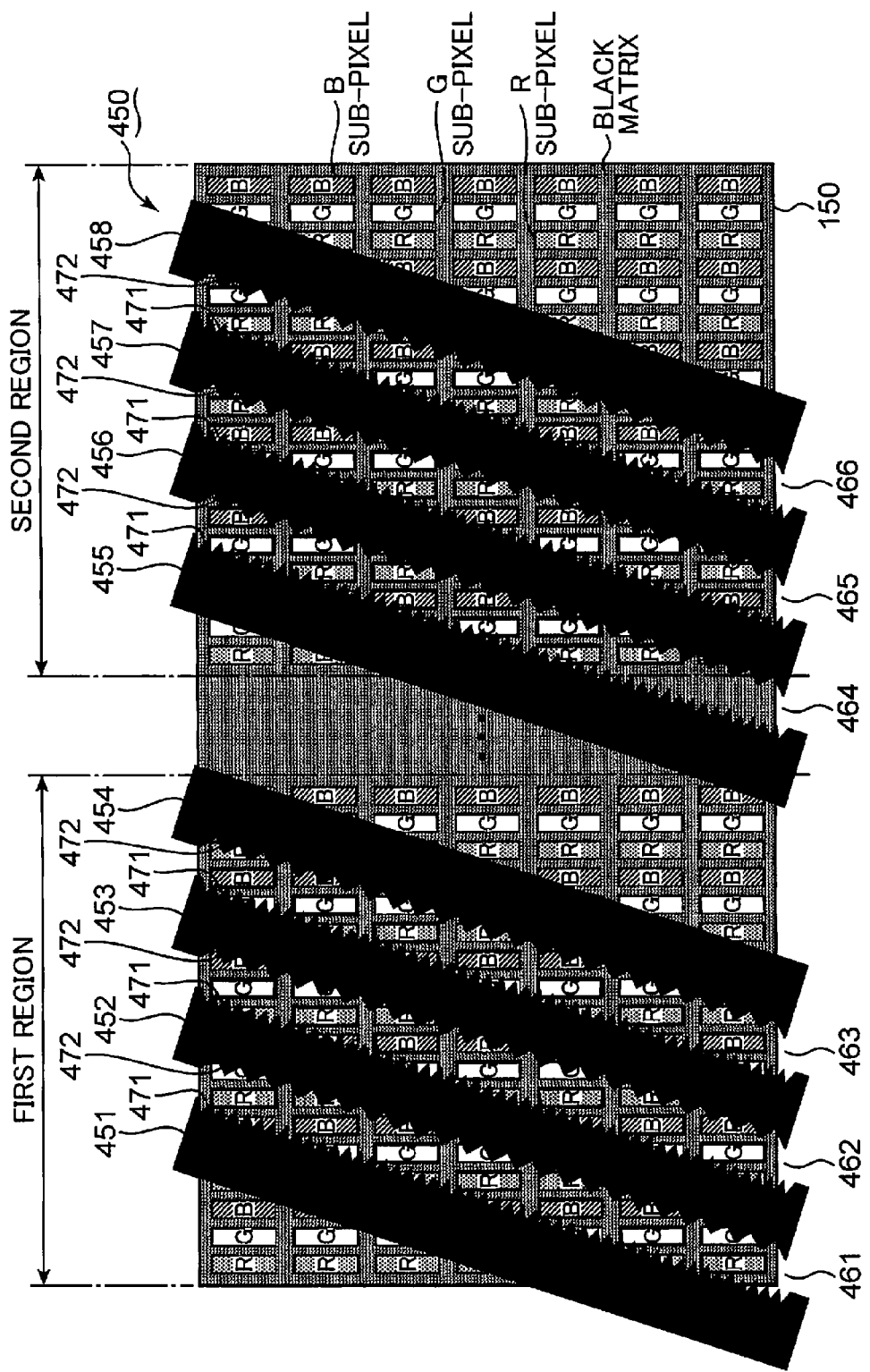
FIG. 32 is a schematic view of a slanted barrier created on the basis of principles of the first embodiment.

FIG. 32 is a schematic view of a slanted barrier 450 designed on the basis of the principles of the first embodiment. The slanted barrier 450 is described with reference to FIGS. 1, 2, 21, 30 and 32.

FIG. 32 shows a display surface including sub-pixels (R, G and B sub-pixels) aligned in the vertical and horizontal directions and a black matrix. The display surface corresponds to the display portion 150 described with reference to FIG. 1. Like FIG. 30, FIG. 32 shows the first and second regions on the display surface.

The slanted barrier 450 includes barrier portions 451, 452, 453, 454 which overlap the first region. The slanted barrier 450 includes barrier portions 455, 456, 457, 458 which overlap the second region. Like the slanted barrier 410 described with reference to FIG. 30, the barrier portions 451 to 458 are inclined at an angle of "18.435 degrees" from the vertical line.

An opening 461 is formed between the barrier portion 451 and the barrier portion 452 adjacent to the right of the barrier portion 451. An opening 462 is formed between the barrier portion 452 and the barrier portion 453 adjacent to the right of the barrier portion 452. An opening 463 is formed between the barrier portion 453 and the barrier portion 454 adjacent to the right of the barrier portion 453. In the present embodiment, any one of the openings 461, 462, 463 may be exemplified as the first opening.

An opening 464 is formed between the barrier portion 455 and the barrier portion 456 adjacent to the right of the barrier portion 455. An opening 465 is formed between the barrier portion 456 and the barrier portion 457 adjacent to the right of the barrier portion 456. An opening 466 is formed between the barrier portion 457 and the barrier portion 458 adjacent to the right of the barrier portion 457. It should be noted that an average opening ratio of the openings 461 to 466 is equal to the opening ratio of the slanted barrier 410 described with reference to FIG. 30. In the present embodiment, any one of the openings 464, 465, 466 which correspond to the second region set at a predetermined interval from the first region in the horizontal direction may be exemplified as the second opening.

Like the slanted barrier 410 described with reference to FIG. 30, a horizontal height (the dimension denoted by the symbol "dwh" in FIG. 2) of the notched structure of the slanted barrier 450 is equal between the left and right notched structures.

Unlike the slanted barrier 410 described with reference to FIG. 30, the notch adjuster 120 (c.f. FIG. 1) makes a difference in the number of divisions "n" used to design the notched structure of the slanted barrier 450 between the left and right notched structures. The left notched structure is designed by means of "6.5" as the value of the number of divisions. The right notched structure is designed by means of "3.5" as the value of the number of divisions.

The left notched structure includes several left protrusions 471 aligned along the openings 461 to 466. The right notched structure includes several right protrusions 472 aligned along the openings 461 to 466. As described above, since the right notched structure is designed by means of a smaller number of divisions than the left notched structure, a period width (the dimension denoted by the symbol "dsv" in FIG. 2) of the right protrusions 472 is greater than that of the left protrusions 471. Therefore, the notched structure of the slanted barrier 450 is formed by means of heterogeneous protrusions in shape between the left and right notched structures.

Due to the difference in the number of divisions between the left and right notched structures, a phase shift is created between the left and right protrusions 471, 472. However, the notch adjuster 120 may adapt an average opening ratio so as to coincide with the slanted barrier 410 described with reference to FIG. 30.

In comparison to the slanted barrier 410 described with reference to FIG. 30, the slanted barrier 450 may increase an exposure area of the sub-pixels in the second region. Therefore, the slanted barrier 450 may reduce a difference in exposure areas of the sub-pixels between the first and second regions. In other words, the slanted barrier 450 may reduce a difference in a positional relationship of sub-pixels with respect to the openings 461 to 466 between the first and second regions. In the present embodiment, the exposure area of the sub-pixels in the first region may be exemplified as the first area. The exposure area of the sub-pixels in the second region may be exemplified as the second area.

Figure 33:
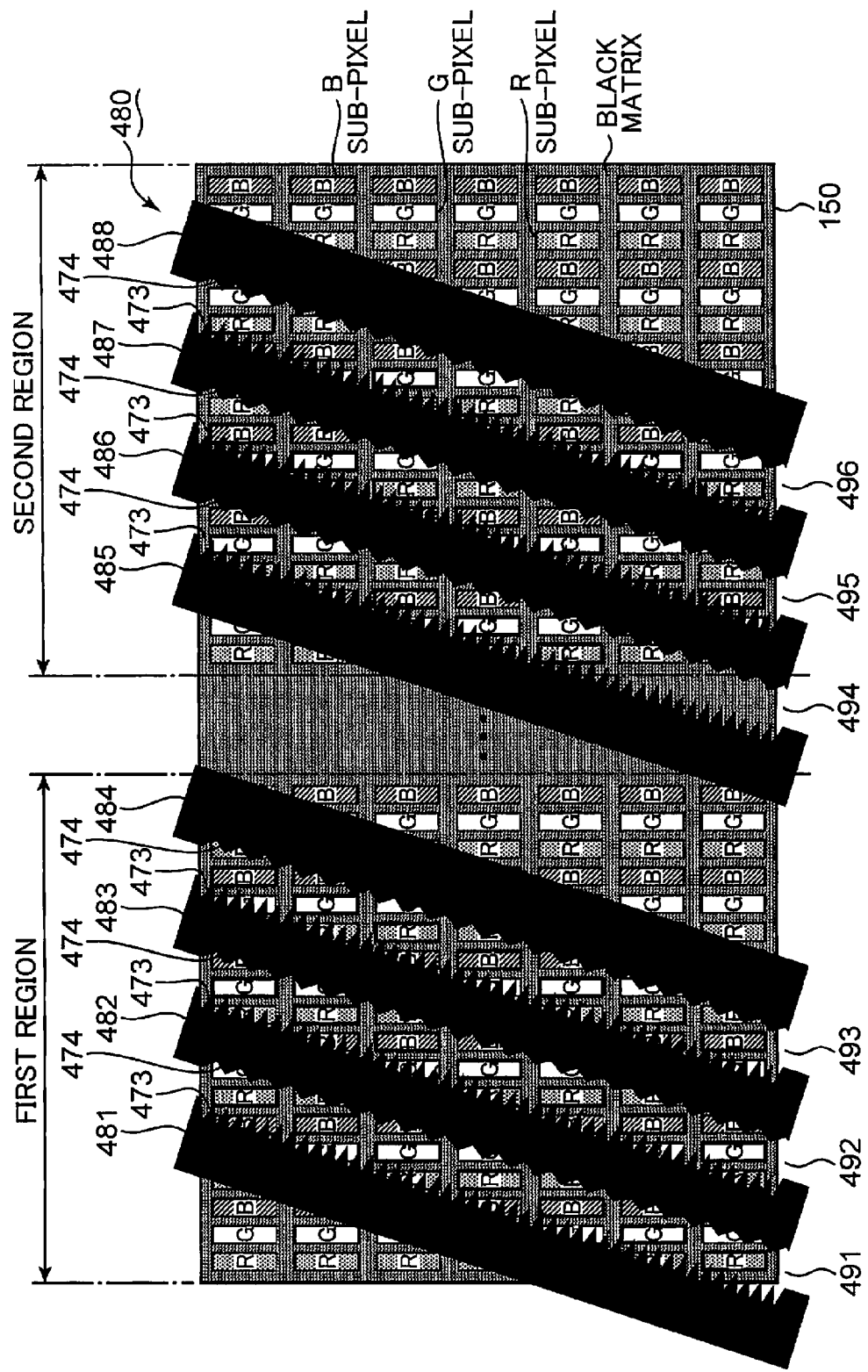
FIG. 33 is a schematic view of a slanted barrier created on the basis of principles of the first embodiment.

FIG. 33 is a schematic view of a slanted barrier 480 designed on the basis of the principles of the first embodiment. The slanted barrier 480 is described with reference to FIGS. 1, 2, 30, 32 and 33.

FIG. 32 shows a display surface including sub-pixels (R, G and B sub-pixels) aligned in the vertical and horizontal directions and a black matrix. The display surface corresponds to the display portion 150 described with reference to FIG. 1. Like FIG. 32, FIG. 32 shows the first and second regions on the display surface.

The slanted barrier 480 includes barrier portions 481, 482, 483, 484 which overlap the first region. The slanted barrier 480 includes barrier portions 485, 486, 487, 488 which overlap the second region. Like the slanted barrier 450 described with reference to FIG. 32, the barrier portions 451 to 458 are inclined at an angle of "18.435 degrees" from the vertical line.

An opening 491 is formed between the barrier portion 481 and the barrier portion 482 adjacent to the right of the barrier portion 481. An opening 492 is formed between the barrier portion 482 and the barrier portion 483 adjacent to the right of the barrier portion 482. An opening 493 is formed between the barrier portion 483 and the barrier portion 484 adjacent to the right of the barrier portion 483. In the present embodiment, any one of the openings 491, 492, 493 may be exemplified as the first opening.

An opening 494 is formed between the barrier portion 485 and the barrier portion 486 adjacent to the right of the barrier portion 485. An opening 495 is formed between the barrier portion 486 and the barrier portion 487 adjacent to the right of the barrier portion 486. An opening 496 is formed between the barrier portion 487 and the barrier portion 488 adjacent to the right of the barrier portion 487. It should be noted that an average opening ratio of the openings 491 to 496 is equal to the opening ratio of the slanted barrier 450 described with reference to FIG. 32. In the present embodiment, any one of the openings 494, 495, 496 which correspond to the second region set at a predetermined interval from the first region in the horizontal direction may be exemplified as the second opening.

Like the slanted barrier 450 described with reference to FIG. 32, the notch adjuster 120 (c.f. FIG. 1) makes a difference in the number of divisions "n" used to design the notched structure of the slanted barrier 450 between the left and right notched structures. Unlike the slanted barrier 450 described with reference to FIG. 32, the notch adjuster 120 also makes a difference in the horizontal height (the dimension denoted by the symbol "dwh" in FIG. 2) between the left and right notched structures. Therefore, the slanted barrier 480 has protrusions with heights which are heterogeneity between the left and right notched structures.

The left notched structure includes several left protrusions 473 aligned along the openings 491 to 496. The right notched structure includes several right protrusions 474 aligned along the openings 491 to 496.

The horizontal height (the dimension denoted by the symbol "dwh" in FIG. 2) of the left protrusions 471 described with reference to FIG. 32 is equal to the horizontal height of the right protrusions 472. When an increase in the horizontal height of the left protrusions 473 of the slanted barrier 480 (c.f. FIG. 33) from the horizontal height of the left protrusions 471 of the slanted barrier 450 (FIG. 32) coincides with a decrease in the horizontal height of the right protrusions 474 of the slanted barrier 480 (c.f. FIG. 33) from the horizontal height of the right protrusions 472 of the slanted barrier 450 (FIG. 32), an average opening ratio of the slanted barrier 480 is equal to the average opening ratio of the slanted barrier 450.

In comparison to the slanted barrier 410 described with reference to FIG. 30, the slanted barrier 480 may increase an exposure area of the sub-pixels in the second region. Therefore, the slanted barrier 480 may reduce a difference in exposure areas of the sub-pixels between the first and second regions. In other words, the slanted barrier 480 may reduce a difference in positional relationships of sub-pixels with respect to the openings 491 to 496 between the first and second regions. In the present embodiment, the exposure area of the sub-pixels in the first region may be exemplified as the first area. The exposure area of the sub-pixels in the second region may be exemplified as the second area.

The notch adjuster 120 may vary the horizontal height of the left protrusions in one pixel pitch in the vertical direction. For example, the notch adjuster 120 may set a horizontal height of several left protrusions larger than that of other left protrusions in one pixel pitch. Meanwhile, the notch adjuster 120 may set a horizontal height of corresponding right protrusions smaller than that of other right protrusions. Accordingly, the average opening ratio is maintained. With the aforementioned design method, a difference in exposure areas of the sub-pixels between the first and second regions is reduced as well.

The notch adjuster 120 may increase the horizontal height of the right protrusions with decreasing the horizontal height of the left protrusions. In this case, the opening region shifts relatively rightward. However, the difference in exposure areas of the sub-pixels between the first and second regions is reduced.

(Design Principle)

From the descriptions about the slanted barriers 410, 430, 450, 480 shown in FIGS. 30 to 33, a slanted barrier (or other barrier members) designed on the basis of the following design principles may appropriately reduce a moiré pattern.

The notched structure is designed by means of a large number of divisions "n". Accordingly, the notched structure includes a large number of protrusions with a small period width. It should be noted that the number of divisions "n" is appropriately set on the basis of the method described in the context of the first to third embodiments. The number of divisions "n" may be set so that a value obtained by dividing the pixel pitch in the vertical direction by a vertical period width (the dimension denoted by the symbol "dsv" in FIG. 2) of the notched structure becomes a value (quotient) apart from an integer value. For example, the number of divisions "n" may be set so that the quotient is an intermediate value between two consecutive integers. Accordingly, adverse effects (e.g. horizontal stripes) resulting from manufacturing errors of the slanted barrier are less likely to occur.

A dimension about a vertical period width (the dimension denoted by the symbol "dsv" in FIG. 2) is different between the left and right notched structures. Accordingly, a phase difference is created between the left and right notched structures.

A dimension about a horizontal height (the dimension denoted by the symbol "dwh" in FIG. 2) is different between the left and right notched structures. The difference in horizontal height between the left and right notched structures may be set on the basis of an average value of the horizontal height of the left protrusions which form the left notched structure and the horizontal height of the right protrusions which form the right notched structure. When the horizontal height of the left protrusions is greater than the horizontal height of the right protrusions, the horizontal height of the right protrusions may be set smaller than the average value by a difference between the horizontal height of the left protrusions and the average value.

For designing a slanted barrier with a notched structure, an opening width of an ordinary slanted barrier without a notched structure may be taken into consideration. The notched structure may be designed so that an average opening ratio equivalent to an opening ratio achieved by an ordinary slanted barrier is obtained. In order to obtain the average opening ratio equivalent to an opening ratio achieved by an ordinary slanted barrier, a minimum opening width (the dimension denoted by the symbol "hmin" in FIG. 2), which is narrower than an opening width of an ordinary slanted barrier, may be set. By setting a small minimum opening width, the aforementioned horizontal height may be set large. However, an excessively small minimum opening width results in an extremely sharp notched structure. Accordingly, adverse effects (e.g. horizontal stripes) resulting from manufacturing errors of the slanted barrier are more likely to occur. Therefore, the minimum opening width may be set to a value no less than "0.6 times" to "0.7 times" as large as the opening ratio of the ordinary slanted barrier which is used as a reference.

As described with reference to FIG. 4, the number of divisions "n" may be dependent on a structure of sub-pixels. The number of divisions "n" may be set to a larger value than the "bright-dark number" described with reference to FIG. 4. It should be noted that the number of divisions "n" may be set by means of a decimal value.

The principles of the present embodiment may be combined with the analysis methods or the evaluation methods according to the aforementioned various embodiments. For example, a comparison may be made between data about a moiré pattern generated in the first and second regions (e.g. an estimation image, a luminance distribution, or a frequency distribution). Alternatively, a comparison may be made between a distribution or an area of sub-pixels observed in the first and second regions.

In the present embodiment, a notched structure is set using triangular concavo-convex regions. Alternatively, these elements which constitute a notched structure may be trapezoids or parallelograms. Further alternatively, contours of these elements may be curved lines (e.g. elliptical arcs).

In the present embodiment, a notched structure is formed by applying the principles of the first embodiment. Alternatively, several barrier parameter candidates may be utilized to design a notched structure by applying the principles of the fifth embodiment.

In order to set an appropriate average opening ratio in consideration of crosstalk, a maximum opening width may be set no more than a sub-pixel pitch. When a minimum opening width equals or falls below "0.5 times" as large as the sub-pixel pitch, adverse effects such as fringes on an image may occur because of a rapid variation in opening width. Alternatively, an observed image may become susceptive to a variation of an observing position of an observer in the horizontal and/or vertical directions. Therefore, the minimum opening width may be set to a value no less than "0.7 times" as large as the sub-pixel pitch.

A sub-pixel pitch is used as various criteria about a parallax image. As described above, by appropriately setting an average opening ratio, maximum and minimum opening widths on the basis of a sub-pixel pitch, a moiré pattern may be reduced with little increased crosstalk.

In the present embodiment, a notched structure is described with reference to the slanted barrier. Alternatively, the design principles of a notched structure may be applied to a vertical stripe barrier or a stepped barrier.

Seventh Embodiment

A notched structure of a display apparatus according to the present embodiment is designed in consideration of a structure of sub-pixels. Accordingly, the notched structure may reduce moiré contrast with little increased crosstalk. The techniques described in the context of the first embodiment are applied to the notched structure according to the present embodiment. Therefore, the notched structure itself does not cause adverse effects such as horizontal stripes. It should be noted that the principles of the aforementioned various embodiments may be combined with the principles of the present embodiment.

(Principle of Moiré Generation)

Figure 34:
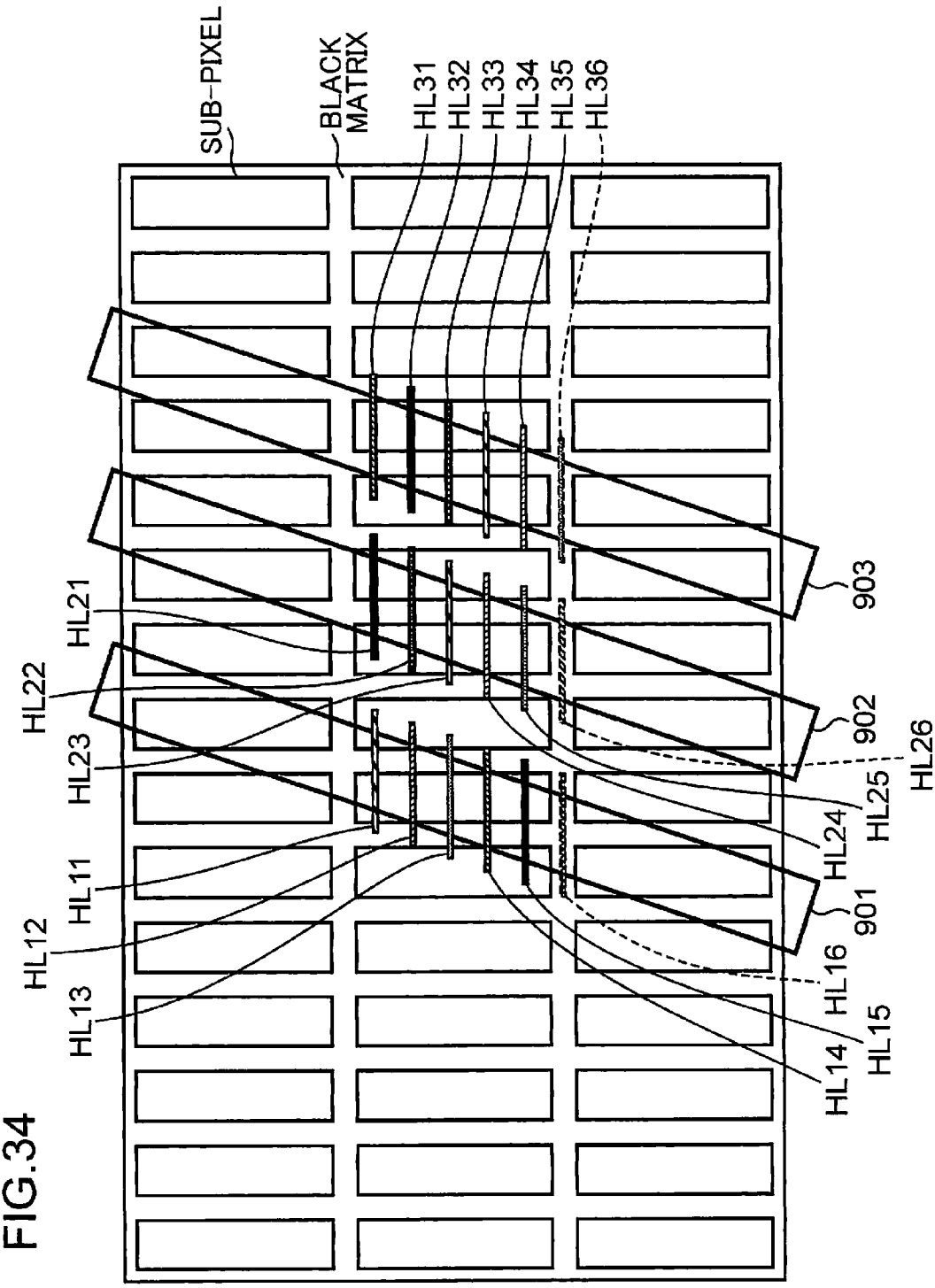
FIG. 34 is a schematic view of a display surface including sub-pixels, which are arranged in the vertical and horizontal directions, and a black matrix.

FIG. 34 is a schematic view of a display surface including sub-pixels aligned in the vertical and horizontal directions and a black matrix. Principles of moiré generation are described with reference to FIG. 34.

FIG. 34 shows three openings (a first opening 901, a second opening 902 and a third opening 903) included in an ordinary slanted barrier without a notched structure. The first opening 901 is depicted so that the center line of the first opening 901 approximately coincides with the center of a sub-pixel. The third opening 903 is depicted so that the center line of the third opening 903 passes through intermediate positions of sub-pixels aligned in the horizontal direction. The second opening 902 is depicted midway between the first and third openings 901, 903.

FIG. 34 depicts six horizontal lines (horizontal lines HL11 to HL16) across the first opening 901. The horizontal line HL11 is depicted at the top. The horizontal line HL16 is depicted at the bottom. It should be noted that since the horizontal line HL 16 is situated on a black matrix, the horizontal line HL16 is represented by a dotted line. The horizontal line HL12 is depicted immediately below the horizontal line HL11. The horizontal line HL13 is depicted immediately below the horizontal line HL12. The horizontal line HL15 is depicted immediately above the horizontal line HL16. The horizontal line HL14 is depicted immediately above the horizontal line HL15. Intervals between the horizontal lines HL11 to HL 16 are constant.

FIG. 34 also depicts six horizontal lines (horizontal lines HL21 to HL26) across the second opening 902. The horizontal line HL21 depicted at the top exists on an extended line of the horizontal line HL11. The horizontal line HL26 depicted at the bottom exists on an extended line of the horizontal line HL16. It should be noted that since the horizontal line HL26 is situated on a black matrix, the horizontal line HL26 is represented by a dotted line. The horizontal line HL22 depicted immediately below the horizontal line HL21 exists on an extended line of the horizontal line HL12. The horizontal line HL23 depicted immediately below the horizontal line HL22 exists on an extended line of the horizontal line HL13. The horizontal line HL25 depicted immediately above the horizontal line HL26 exists on an extended line of the horizontal line HL15. The horizontal line HL24 depicted immediately above the horizontal line HL25 exists on an extended line of the horizontal line HL14.

A positional relationship between a sub-pixel on the horizontal line HL21 and the black matrix coincides with a positional relationship between a sub-pixel on the horizontal line HL15 and the black matrix. Without a region of the black matrix extending in the horizontal direction, a positional relationship between a sub-pixel on the horizontal line HL22 and the black matrix coincides with a positional relationship between a sub-pixel on the horizontal line HL16 and the black matrix. A positional relationship between a sub-pixel on the horizontal line HL23 and the black matrix coincides with a positional relationship between a sub-pixel on the horizontal line HL11 and the black matrix. A positional relationship between a sub-pixel on the horizontal line HL24 and the black matrix coincides with a positional relationship between a sub-pixel on the horizontal line HL12 and the black matrix. A positional relationship between a sub-pixel on the horizontal line HL25 and the black matrix coincides with a positional relationship between a sub-pixel on the horizontal line HL13 and the black matrix. Without a region of the black matrix extending in the horizontal direction, a positional relationship between a sub-pixel on the horizontal line HL26 and the black matrix coincides with a positional relationship between a sub-pixel on the horizontal line HL14 and the black matrix.

FIG. 34 depicts six horizontal lines (horizontal lines HL31 to HL36) across the third opening 903. The horizontal line HL31 depicted at the top exists on an extended line of the horizontal line HL11. The horizontal line HL36 depicted at the bottom exists on an extended line of the horizontal line HL16. It should be noted that since the horizontal line HL36 is situated on a black matrix, the horizontal line HL36 is represented by a dotted line. The horizontal line HL32 depicted immediately below the horizontal line HL31 exists on an extended line of the horizontal line HL12. The horizontal line HL33 depicted immediately below the horizontal line HL32 exists on an extended line of the horizontal line HL13. The horizontal line HL35 depicted immediately above the horizontal line HL36 exists on an extended line of the horizontal line HL15. The horizontal line HL34 depicted immediately above the horizontal line HL35 exists on an extended line of the horizontal line HL14.

A positional relationship between a sub-pixel on the horizontal line HL31 and the black matrix coincides with a positional relationship between a sub-pixel on the horizontal line HL14 and the black matrix. A positional relationship between a sub-pixel on the horizontal line HL32 and the black matrix coincides with a positional relationship between a sub-pixel on the horizontal line HL15 and the black matrix. Without a region of the black matrix extending in the horizontal direction, a positional relationship between a sub-pixel on the horizontal line HL33 and the black matrix coincides with a positional relationship between a sub-pixel on the horizontal line HL16 and the black matrix. A positional relationship between a sub-pixel on the horizontal line HL34 and the black matrix coincides with a positional relationship between a sub-pixel on the horizontal line HL11 and the black matrix. A positional relationship between a sub-pixel on the horizontal line HL35 and the black matrix coincides with a positional relationship between a sub-pixel on the horizontal line HL12 and the black matrix. Without a region of the black matrix extending in the horizontal direction, a positional relationship between a sub-pixel on the horizontal line HL36 and the black matrix coincides with a positional relationship between a sub-pixel on the horizontal line HL13 and the black matrix.

Figure 35:
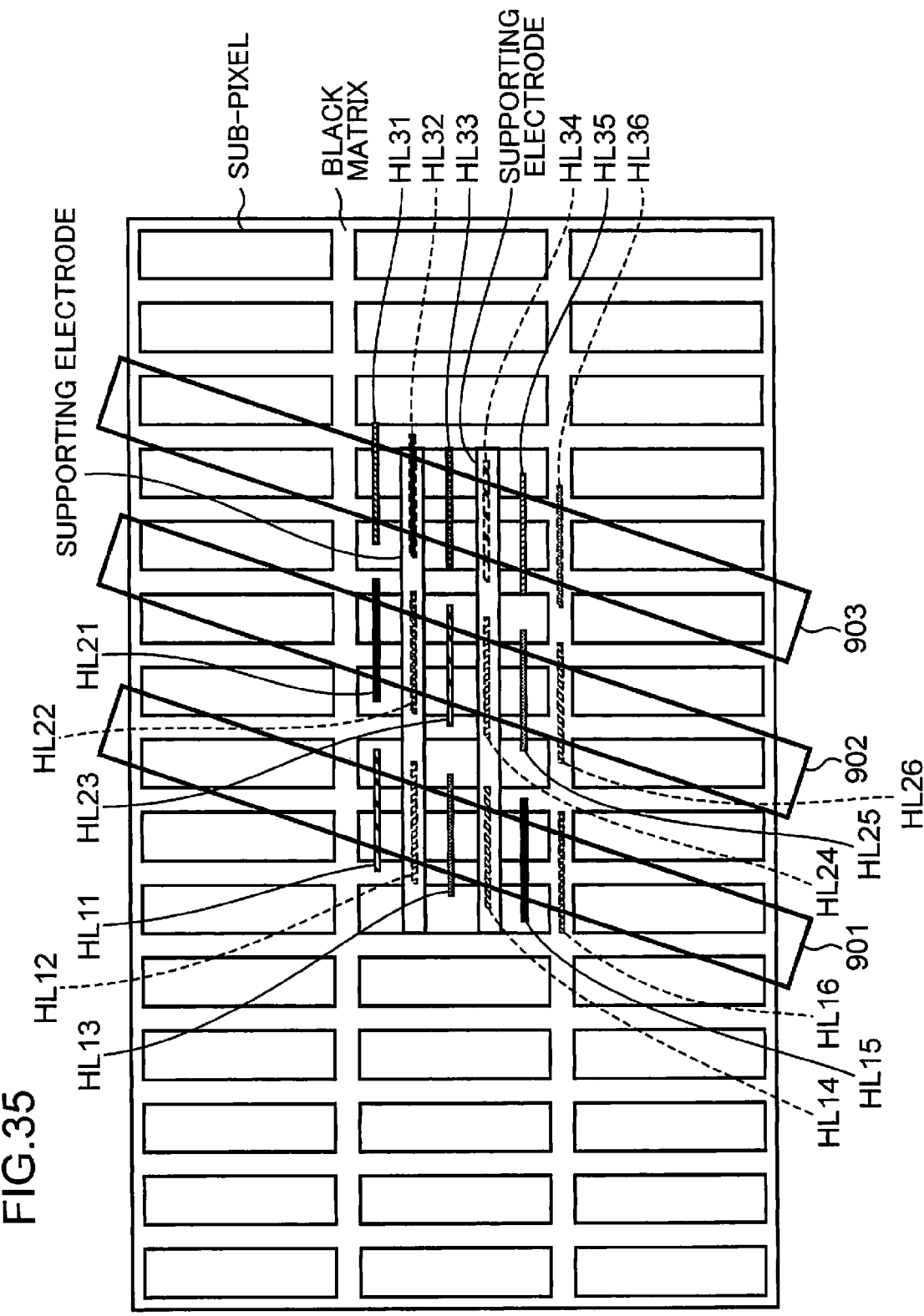
FIG. 35 is a schematic view of a display surface including sub-pixels, which are arranged in the vertical and horizontal directions, and a black matrix.

FIG. 35 is a schematic view of a display surface including sub-pixels aligned in the vertical and horizontal directions and a black matrix. Principles of moiré generation are described with reference to FIGS. 34 and 35.

Like FIG. 34, FIG. 35 shows the first, second and third openings 901, 902, 903, the horizontal lines HL11 to HL16 across the first opening 901, the horizontal lines HL21 to HL26 across the second opening 902, and the horizontal lines HL31 to HL36 across the third opening 903. FIG. 35 shows two supporting electrodes extending horizontally. The upper supporting electrode overlaps the horizontal lines HL12, HL22, HL 32. The lower supporting electrode overlaps the horizontal lines HL14, HL24, HL 34. Since sub-pixels do not emit light in regions corresponding to the supporting electrodes, the horizontal lines HL12, HL22, HL 32, HL14, HL24, HL 34 are depicted in dotted lines.

Since a region without light emission is created in a sub-pixel, a significant moiré pattern is likely to occur. When a notched structure described in the context of the aforementioned various embodiments is applied to the first to third openings 901-903 shown in FIGS. 34 and 35, light intensity of a non-emitting region may be compensated.

(Effect of Notched Structure)

Figure 36:
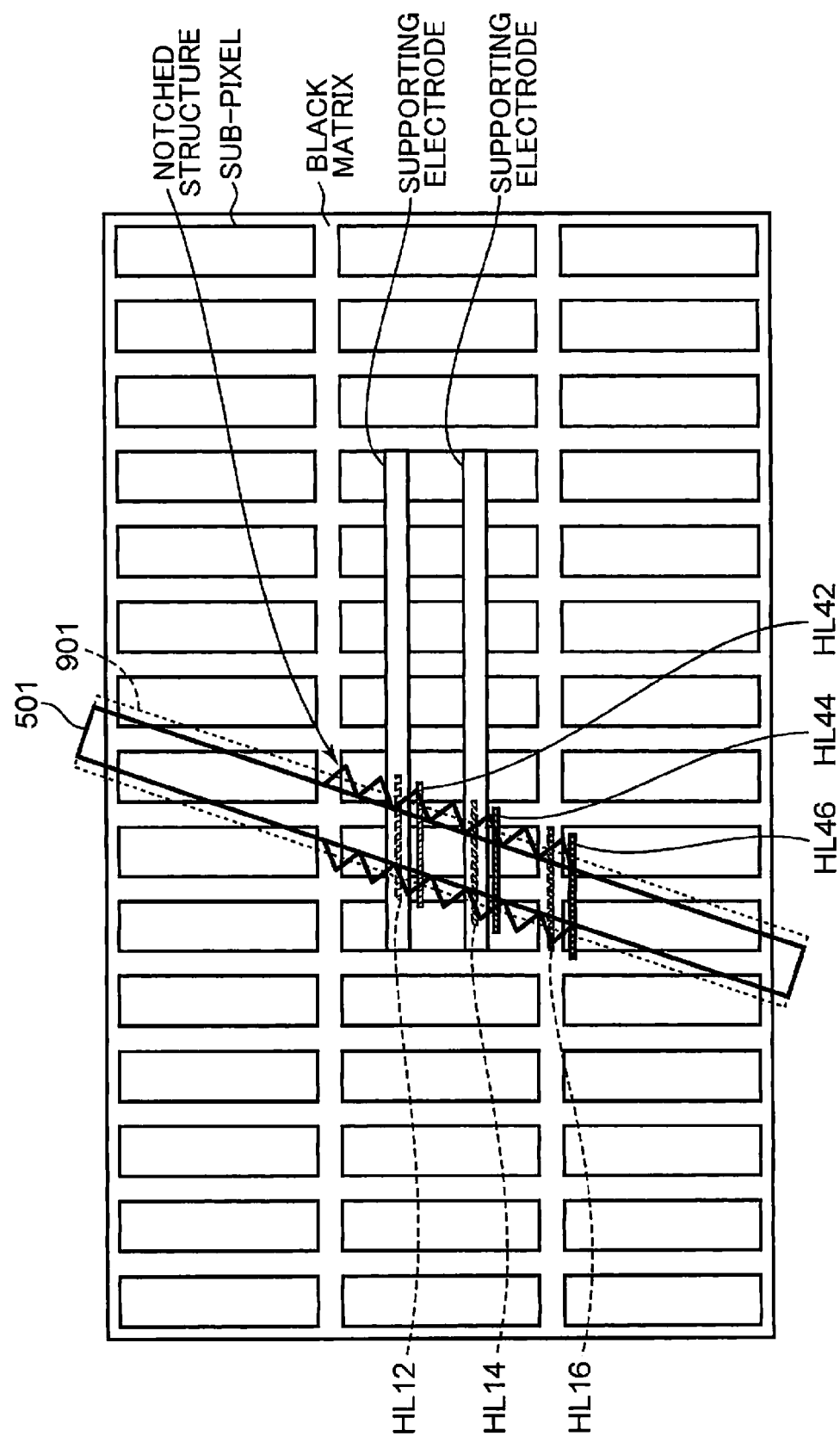
FIG. 36 is a schematic view of a display surface including sub-pixels, which are arranged in the vertical and horizontal directions, and a black matrix.

FIG. 36 is a schematic view of a display surface including sub-pixels aligned in the vertical and horizontal directions and a black matrix. Effects of a notched structure are described with reference to FIGS. 2, 35 and 36.

FIG. 36 depicts an opening 501 corresponding to the first opening 901 shown in FIG. 35. It should be noted the opening 501 is formed on the basis of the principles described in the context of the first embodiment. In FIG. 36, the first opening 901 is represented by a dotted line.

In order to make an average opening ratio coincident with an opening ratio of the first opening 901, a minimum opening width (the dimension denoted by the symbol "hmin" in FIG. 2) of the opening 501 is narrower than an opening width of the first opening 901. A phase of a left notched structure and a phase of a right notched structure are the same. In short, the left and right notched structures are line-symmetrical with respect to the central axis of the opening 501.

Like FIG. 35, FIG. 36 shows horizontal lines HL12, HL14, HL16. The horizontal lines HL12, HL14, HL16 overlap a supporting electrode or a black matrix.

FIG. 36 shows a horizontal line HL42. Without the upper supporting electrode, a positional relationship between a sub-pixel on the horizontal line HL42 and the black matrix coincides with a positional relationship between a sub-pixel on the horizontal line HL12 and the black matrix.

FIG. 36 shows a horizontal line HL44. Without the lower supporting electrode, a positional relationship between a sub-pixel on the horizontal line HL44 and the black matrix coincides with a positional relationship between a sub-pixel on the horizontal line HL14 and the black matrix.

FIG. 36 shows a horizontal line HL46. Without the black matrix extending in the horizontal direction, a positional relationship between a sub-pixel on the horizontal line HL46 and the black matrix coincides with a positional relationship between a sub-pixel on the horizontal line HL16 and the black matrix.

When the phase of the left notched structure coincides with the phase of the right notched structure, a deviation from the horizontal line HL12 to the horizontal line HL42, a deviation from the horizontal line HL14 to the horizontal line HL44, and a deviation from the horizontal line HL16 to the horizontal line HL46 do not become large significantly. The horizontal line HL42 roughly overlaps the supporting electrode.

Figure 37:
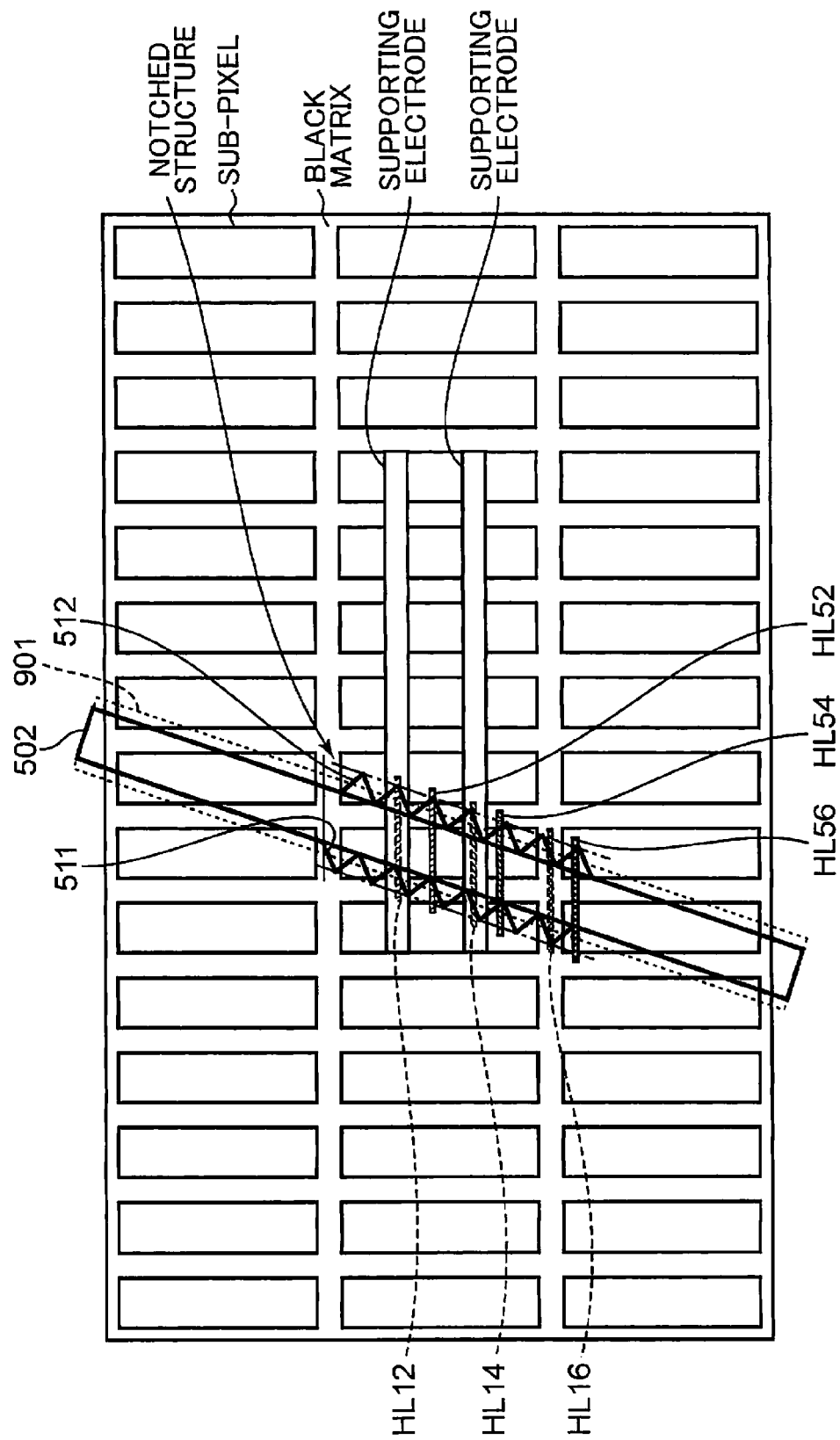
FIG. 37 is a schematic view of a display surface including sub-pixels, which are arranged in the vertical and horizontal directions, and a black matrix.

FIG. 37 is a schematic view of a display surface including sub-pixels aligned in the vertical and horizontal directions and a black matrix. Effects of a notched structure are described with reference to FIGS. 4, 21, 36 and 37.

FIG. 37 depicts an opening 502 corresponding to the first opening 901 shown in FIG. 36. It should be noted that the opening 502 is formed on the basis of the principles described in the context of the fourth embodiment. In FIG. 37, the first opening 901 is represented by a dotted line.

In order to make an average opening ration coincident with the opening ratio of the first opening 901, a minimum opening width (the dimension denoted by the symbol "hmin" in FIG. 21) of the opening 502 is narrower than an opening width of the first opening 901. Unlike the notched structure described with reference to FIG. 36, a phase of the right notched structure shown in FIG. 36 is deviated from a phase of the left notched structure. It should be noted that a phase difference between the right and left notched structures is set no more than a vertical period width (the dimension denoted by symbol "dsv" in FIG. 21) of the notched structure.

The left notched structure is formed by a left contour 511. The right notched structure is formed by a right contour 512. The left and right contours 511, 512 do not contain horizontal and vertical lines. Line segments of the left contour 511 are all inclined from to the horizontal and vertical lines. Line segments of the right contour 512 are all inclined from the horizontal and vertical lines.

Like FIG. 36, FIG. 37 shows horizontal lines HL12, HL14, HL16. The horizontal lines HL12, HL14, HL16 overlap a supporting electrode or a black matrix.

FIG. 37 shows a horizontal line HL52. Without the upper supporting electrode, a positional relationship between a sub-pixel on the horizontal line HL52 and the black matrix coincides with a positional relationship between a sub-pixel on the horizontal line HL12 and the black matrix.

FIG. 37 shows a horizontal line HL54. Without the lower supporting electrode, a positional relationship between a sub-pixel on the horizontal line HL54 and the black matrix coincides with a positional relationship between a sub-pixel on the horizontal line HL14 and the black matrix.

FIG. 37 shows a horizontal line HL56. Without the black matrix extending in the horizontal direction, a positional relationship between a sub-pixel on the horizontal line HL56 and the black matrix coincides with a positional relationship between a sub-pixel on the horizontal line HL16 and the black matrix.

In comparison to the horizontal lines HL42, HL44, HL46 shown in FIG. 36, the horizontal lines HL52, HL54, HL56 shown in FIG. 37 significantly deviate from the horizontal lines HL12, HL14, HL16, respectively. Therefore, the notched structure shown in FIG. 37 may reduce a moiré pattern more effectively than the notched structure shown in FIG. 36.

As described with reference to FIG. 4, the number of divisions "n" of the notched structure shown in FIGS. 36 and 37 may be dependent on a structure of sub-pixels. The number of divisions "n" may be set to a larger value than the "bright-dark number" described with reference to FIG. 4. It should be noted that the number of divisions "n" may be set by means of a decimal value.

As shown in FIGS. 36 and 37, the sub-pixels are divided in the vertical direction into three regions by the supporting electrodes. Therefore, the number of divisions "n" may be set on the basis of a value which is twice as great as the number of divided regions according to the principles described in the context of the first embodiment. A value of "6.5" is used for the number of divisions "n" shown in FIGS. 36 and 37. When the number of divisions "n" has a value of "6.5", a value obtained by dividing a vertical length of a sub-pixel by a vertical period width (the dimension denoted by the symbol "dsv" in FIG. 21) of the notched structure is set to a value near an intermediate value between two consecutive integers.

Figure 38:
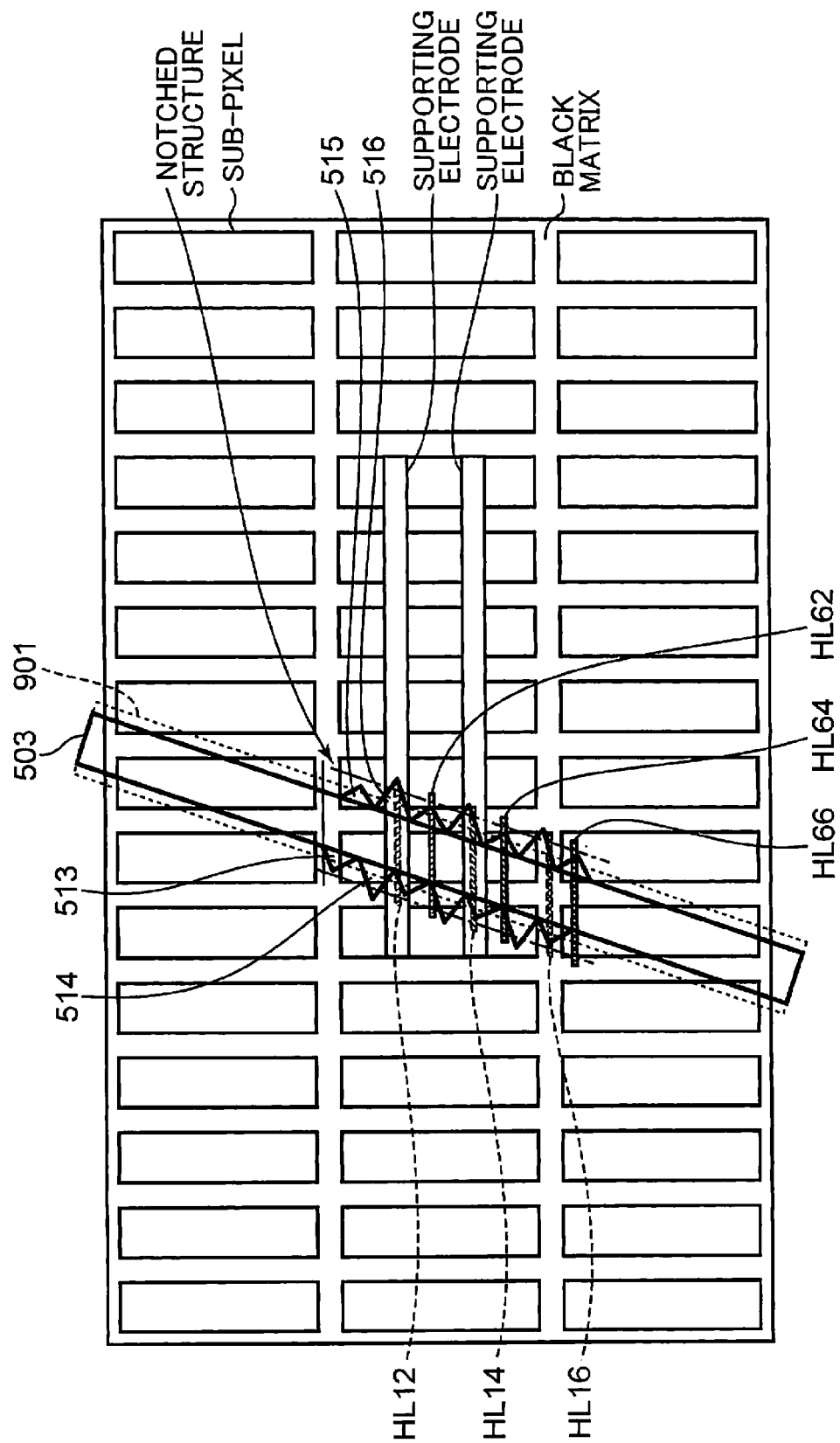
FIG. 38 is a schematic view of a display surface including sub-pixels, which are arranged in the vertical and horizontal directions, and a black matrix.

FIG. 38 is a schematic view of a display surface including sub-pixels aligned in the vertical and horizontal directions and a black matrix. Effects of a notched structure are described with reference to FIGS. 2, 36 and 38.

FIG. 38 depicts an opening 503 corresponding to the first opening 901 shown in FIG. 36. It should be noted that the opening 503 is formed on the basis of the principles described in the context of the sixth embodiment. In FIG. 38, the first opening 901 is represented by a dotted line.

In order to make an average opening ration coincident with the opening ratio of the first opening 901, a minimum opening width (the dimension denoted by the symbol "hmin" in FIG. 2) of the opening 503 is narrower than an opening width of the first opening 901.

A left notched structure shown in FIG. 38 includes narrow notched regions 513 and wide notched regions 514. The narrow and wide notched regions 513, 514 are alternately formed. Therefore, the left notched structure includes heterogeneous notched regions (and protrusions). The narrow and wide notched regions 513, 514 are obtained by varying a horizontal height (the dimension denoted by the symbol "dsh" in FIG. 2) of the notched structure.

A right notched structure shown in FIG. 38 includes narrow notched regions 515 and wide notched regions 516. The narrow and wide notched regions 515, 516 are alternately formed. Therefore, the right notched structure includes heterogeneous notched regions (and protrusions). The narrow and wide notched regions 515, 516 are obtained by varying a horizontal height (the dimension denoted by the symbol "dsh" in FIG. 2) of the notched structure.

Like FIG. 36, FIG. 38 shows horizontal lines HL12, HL14, HL16. The horizontal lines HL12, HL14, HL16 overlap a supporting electrode or a black matrix.

FIG. 38 shows a horizontal line HL62. Without the upper supporting electrode, a positional relationship between a sub-pixel on the horizontal line HL62 and the black matrix coincides with a positional relationship between a sub-pixel on the horizontal line HL12 and the black matrix.

FIG. 38 shows a horizontal line HL64. Without the lower supporting electrode, a positional relationship between a sub-pixel on the horizontal line HL64 and the black matrix coincides with a positional relationship between a sub-pixel on the horizontal line HL14 and the black matrix.

FIG. 38 shows a horizontal line HL66. Without the black matrix extending in the horizontal direction, a positional relationship between a sub-pixel on the horizontal line HL66 and the black matrix coincides with a positional relationship between a sub-pixel on the horizontal line HL16 and the black matrix.

In comparison to the horizontal lines HL42, HL44, HL46 shown in FIG. 36, the horizontal lines HL62, HL64, HL66 shown in FIG. 38 significantly deviate from the horizontal lines HL12, HL14, HL16, respectively. Therefore, the notched structure shown in FIG. 38 may reduce a moiré pattern more effectively than the notched structure shown in FIG. 36.

Figure 39:
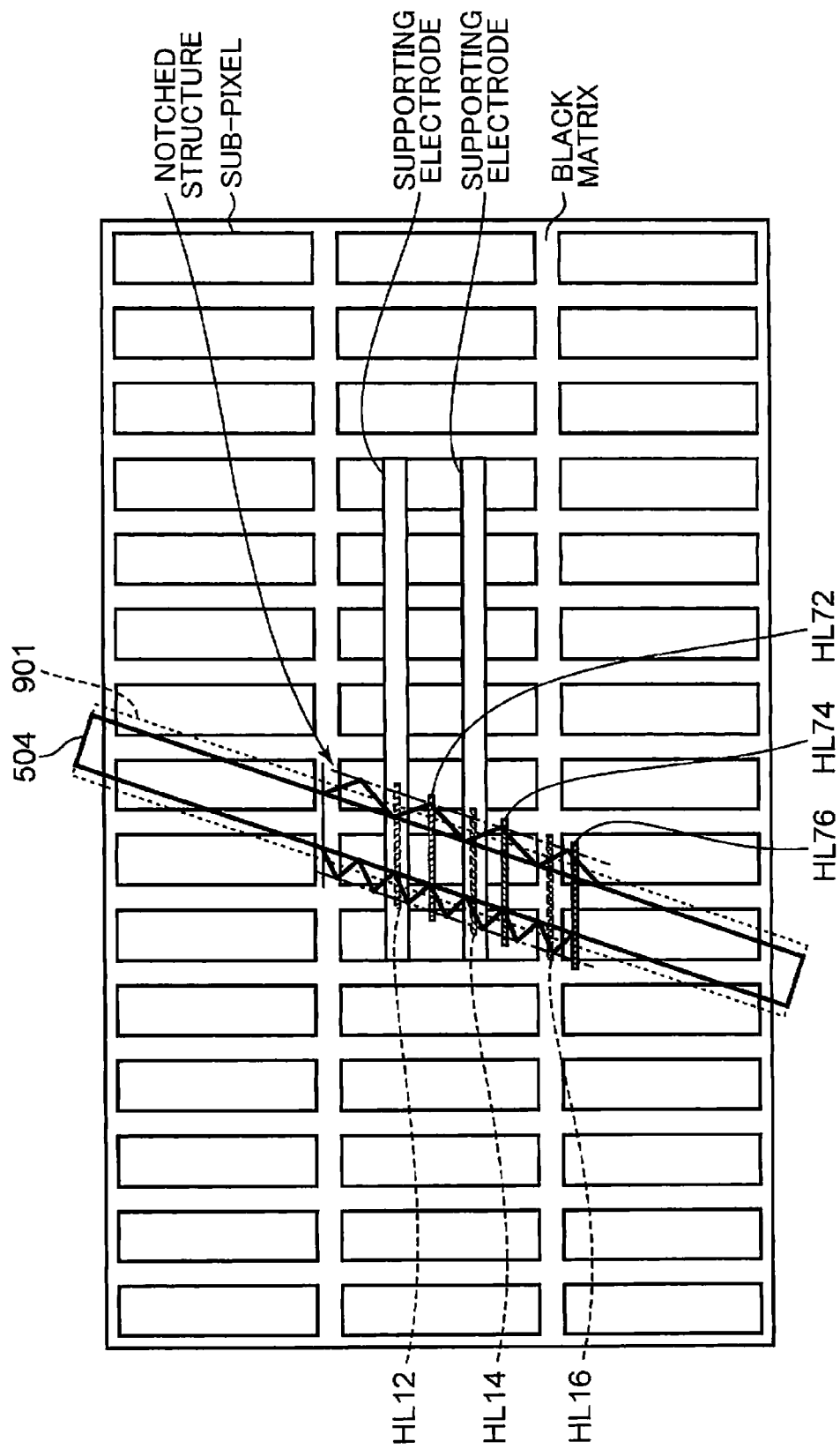
FIG. 39 is a schematic view of a display surface including sub-pixels, which are aligned in the vertical and horizontal directions, and a black matrix.

FIG. 39 is a schematic view of a display surface including sub-pixels aligned in the vertical and horizontal directions and a black matrix. Effects of a notched structure are described with reference to FIGS. 2, 36 and 39.

FIG. 39 depicts an opening 504 corresponding to the first opening 901 shown in FIG. 36. It should be noted that the opening 504 is formed on the basis of the principles described in the context of the sixth embodiment. In FIG. 39, the first opening 901 is represented by a dotted line.

In order to make an average opening ration coincident with the opening ratio of the first opening 901, a minimum opening width (the dimension denoted by the symbol "hmin" in FIG. 2) of the opening 504 is narrower than an opening width of the first opening 901.

The left notched structure shown in FIG. 39 is formed by means of a period width (the dimension denoted by the symbol "dsv" in FIG. 2) which is shorter than that of the right notched structure. The number of divisions "n" used to calculate a period width is set to a value of "6.5" for the left notched structure and to a value of "3.5" for the right notched structure. Accordingly, a phase difference is created between the left and right notched structures. When a ratio between the numbers of divisions "n" for the left and right notched structures is not an integral ratio, a phase difference between the left and right notched structures is created more easily.

Like FIG. 36, FIG. 39 shows horizontal lines HL12, HL14, HL16. The horizontal lines HL12, HL14, HL16 overlap a supporting electrode or a black matrix.

FIG. 39 shows a horizontal line HL72. Without the upper supporting electrode, a positional relationship between a sub-pixel on the horizontal line HL72 and the black matrix coincides with a positional relationship between a sub-pixel on the horizontal line HL12 and the black matrix.

FIG. 39 shows a horizontal line HL74. Without the lower supporting electrode, a positional relationship between a sub-pixel on the horizontal line HL74 and the black matrix coincides with a positional relationship between a sub-pixel on the horizontal line HL14 and the black matrix.

FIG. 39 shows a horizontal line HL76. Without the black matrix extending in the horizontal direction, a positional relationship between a sub-pixel on the horizontal line HL76 and the black matrix coincides with a positional relationship between a sub-pixel on the horizontal line HL16 and the black matrix.

In comparison to the horizontal lines HL42, HL44, HL46 shown in FIG. 36, the horizontal lines HL72, HL74, HL76 shown in FIG. 39 significantly deviate from the horizontal lines HL12, HL14, HL16, respectively. Therefore, the notched structure shown in FIG. 39 may reduce a moiré pattern more effectively than the notched structure shown in FIG. 36.

Figure 40:
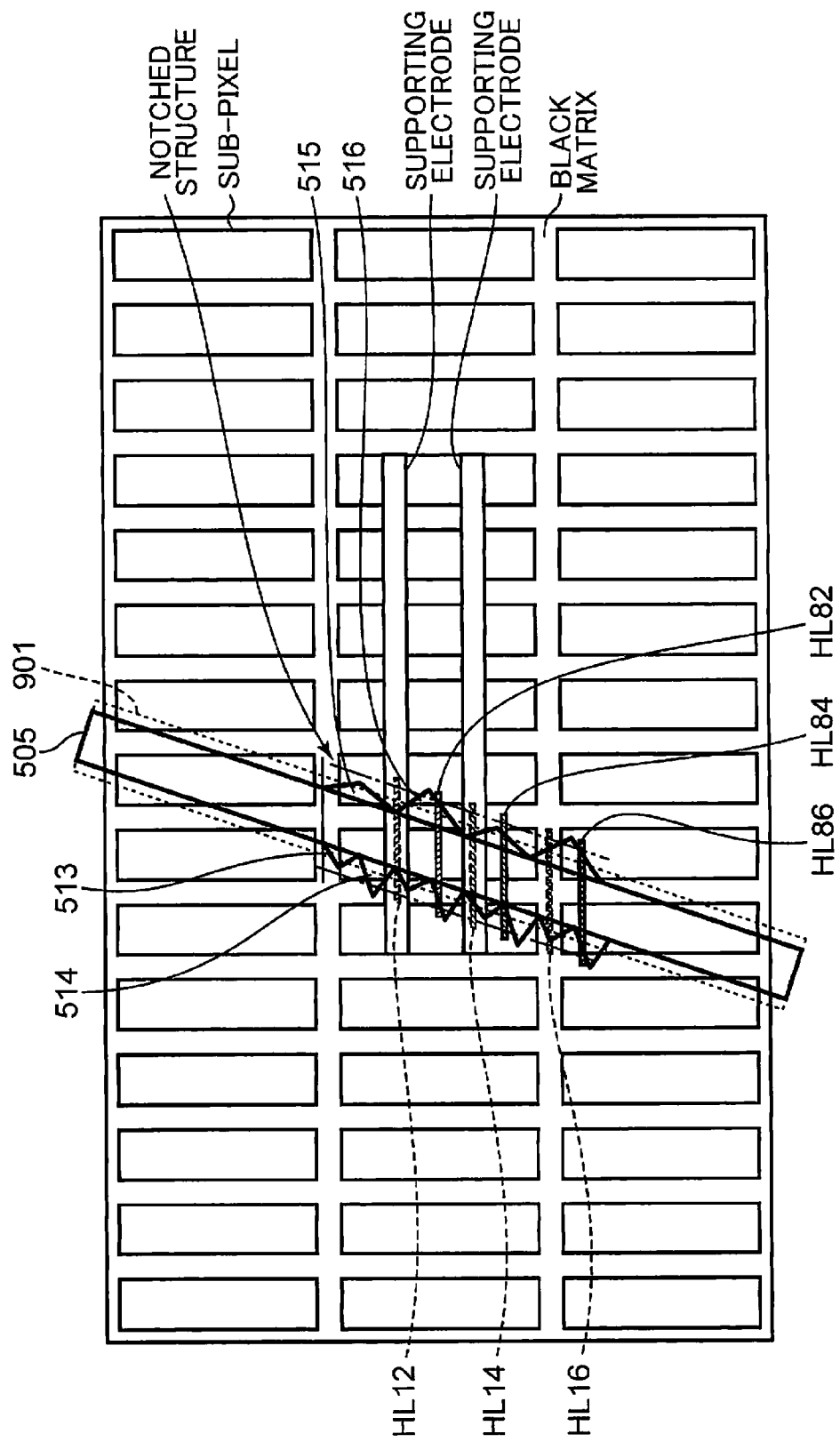
FIG. 40 is a schematic view of a display surface including sub-pixels, which are arranged in the vertical and horizontal directions, and a black matrix.

FIG. 40 is a schematic view of a display surface including sub-pixels aligned in the vertical and horizontal directions and a black matrix. Effects of a notched structure are described with reference to FIGS. 2, 36 and 38 to 40.

FIG. 40 depicts an opening 505 corresponding to the first opening 901 shown in FIG. 39. In order to make an average opening ration coincident with the opening ratio of the first opening 901, a minimum opening width (the dimension denoted by the symbol "hmin" in FIG. 2) of the opening 505 is narrower than an opening width of the first opening 901.

Like the notched structure shown in FIG. 39, the left notched structure shown in FIG. 40 is formed by means of a period width (the dimension denoted by the symbol "dsv" in FIG. 2) which is shorter than that of the right notched structure.

Like the notched structure shown in FIG. 38, the left notched structure shown in FIG. 40 includes narrow notched regions 513 and wide notched regions 514. The narrow and wide notched regions 513, 514 are alternately formed. Therefore, the left notched structure includes heterogeneous notched regions (and protrusions). The narrow and wide notched regions 513, 514 are obtained by varying a horizontal height (the dimension denoted by the symbol "dsh" in FIG. 2) of the notched structure.

Like the notched structure shown in FIG. 38, the right notched structure shown in FIG. 40 includes narrow notched regions 515 and wide notched regions 516. The narrow and wide notched regions 515, 516 are alternately formed. Therefore, the right notched structure includes heterogeneous notched regions (and protrusions). The narrow and wide notched regions 515, 516 are obtained by varying a horizontal height (the dimension denoted by the symbol "dsh" in FIG. 2) of the notched structure.

Like FIG. 36, FIG. 40 shows horizontal lines HL12, HL14, HL16. The horizontal lines HL12, HL14, HL16 overlap a supporting electrode or a black matrix.

FIG. 40 shows a horizontal line HL82. Without the upper supporting electrode, a positional relationship between a sub-pixel on the horizontal line HL82 and the black matrix coincides with a positional relationship between a sub-pixel on the horizontal line HL12 and the black matrix.

FIG. 40 shows a horizontal line HL84. Without the lower supporting electrode, a positional relationship between a sub-pixel on the horizontal line HL84 and the black matrix coincides with a positional relationship between a sub-pixel on the horizontal line HL14 and the black matrix.

FIG. 40 shows a horizontal line HL86. Without the black matrix extending in the horizontal direction, a positional relationship between a sub-pixel on the horizontal line HL86 and the black matrix coincides with a positional relationship between a sub-pixel on the horizontal line HL16 and the black matrix.

In comparison to the horizontal lines HL42, HL44, HL46 shown in FIG. 36, the horizontal lines HL82, HL84, HL86 shown in FIG. 40 significantly deviate from the horizontal lines HL12, HL14, HL16, respectively. Therefore, the notched structure shown in FIG. 40 may reduce a moiré pattern more effectively than the notched structure shown in FIG. 36. Like the notched structure shown in FIG. 40, if there is a phase difference between the left and right notched structures, the same positional relationship appears several times in a pixel pitch in the vertical direction. Therefore, regions with different positional relationships coexist in a vertical region which is shorter than that of the pixel pitch in the vertical direction. Since a variation in brightness due to a positional relationship is easily averaged, the effect of a non-emitting portion because of a supporting electrode or a black matrix is well moderated.

Figure 41:
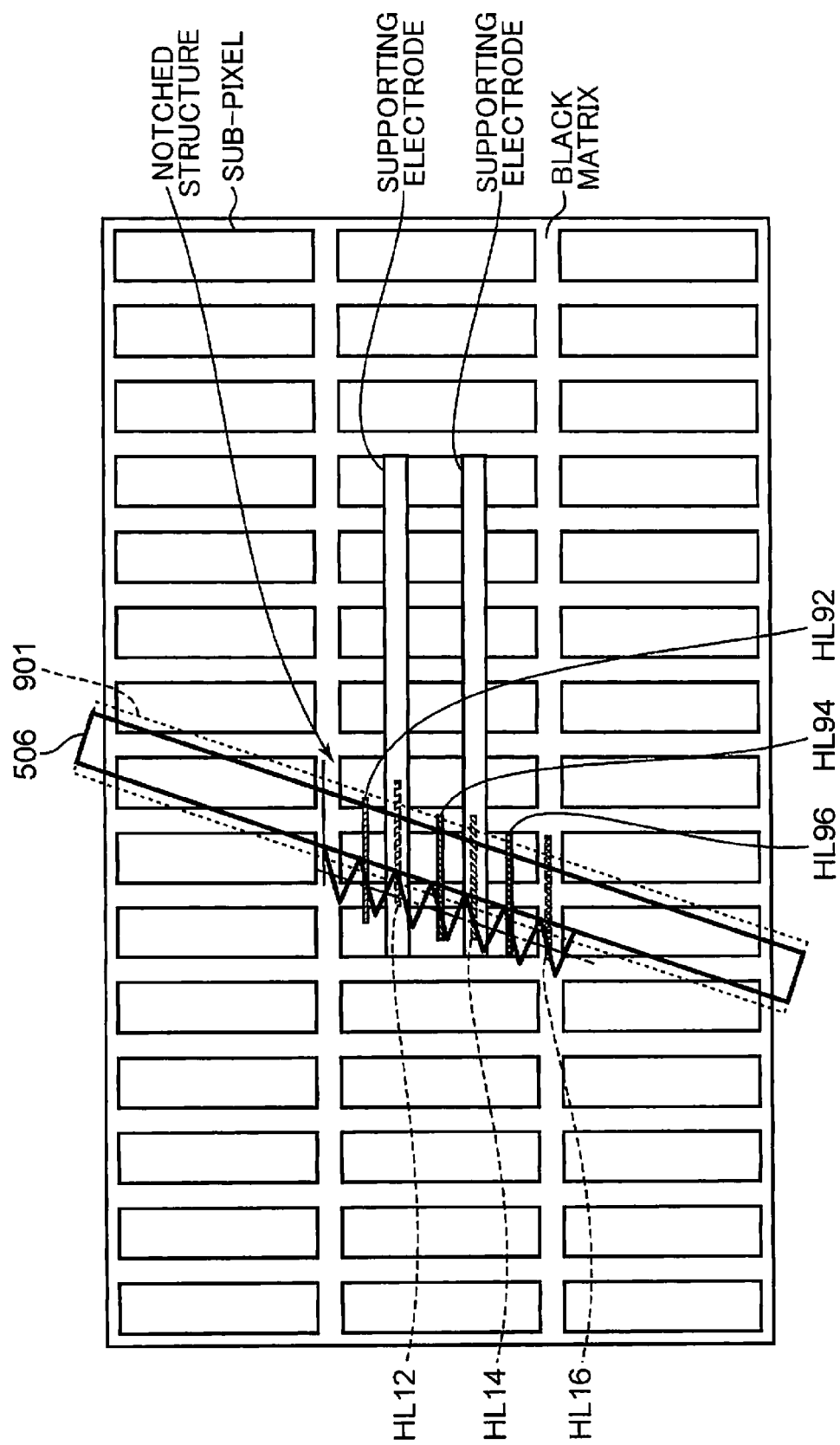
FIG. 41 is a schematic view of a display surface including sub-pixels, which are arranged in the vertical and horizontal directions, and a black matrix.

FIG. 41 is a schematic view of a display surface including sub-pixels aligned in the vertical and horizontal directions and a black matrix. Effects of a notched structure are described with reference to FIGS. 2, 36 and 41.

FIG. 41 depicts an opening 506 corresponding to the first opening 901 shown in FIG. 36. In order to make an average opening ratio coincident with the opening ratio of the first opening 901, a minimum opening width (the dimension denoted by the symbol "hmin" in FIG. 2) of the opening 506 is narrower than an opening width of the first opening 901.

Unlike the notched structure shown in FIG. 36, a notched structure shown in FIG. 41 only includes a left notched structure without a right notched structure. In order to make the average opening ratio coincident with the average opening ratio of the notched structure shown in FIG. 36, a horizontal height (the dimension denoted by the symbol "dsh" in FIG. 2) of the notched structure shown in FIG. 41 is set to a value twice as great as the horizontal height of the notched structure shown in FIG. 36. It should be noted that the number of divisions "n" is set to a value of "6.5".

Like FIG. 36, FIG. 41 shows horizontal lines HL12, HL14, HL16. The horizontal lines HL12, HL14, HL16 overlap a supporting electrode or a black matrix.

FIG. 41 shows a horizontal line HL92. Without the upper supporting electrode, a positional relationship between a sub-pixel on the horizontal line HL92 and the black matrix coincides with a positional relationship between a sub-pixel on the horizontal line HL12 and the black matrix.

FIG. 41 shows a horizontal line HL94. Without the lower supporting electrode, a positional relationship between a sub-pixel on the horizontal line HL94 and the black matrix coincides with a positional relationship between a sub-pixel on the horizontal line HL14 and the black matrix.

FIG. 41 shows a horizontal line HL96. Without the black matrix extending in the horizontal direction, a positional relationship between a sub-pixel on the horizontal line HL96 and the black matrix coincides with a positional relationship between a sub-pixel on the horizontal line HL16 and the black matrix.

In comparison to the horizontal lines HL42, HL44, HL46 shown in FIG. 36, the horizontal lines HL92, HL94, HL96 shown in FIG. 41 significantly deviate from the horizontal lines HL12, HL14, HL16, respectively. Therefore, the notched structure shown in FIG. 41 may reduce a moiré pattern more effectively than the notched structure shown in FIG. 36.

Figure 42:
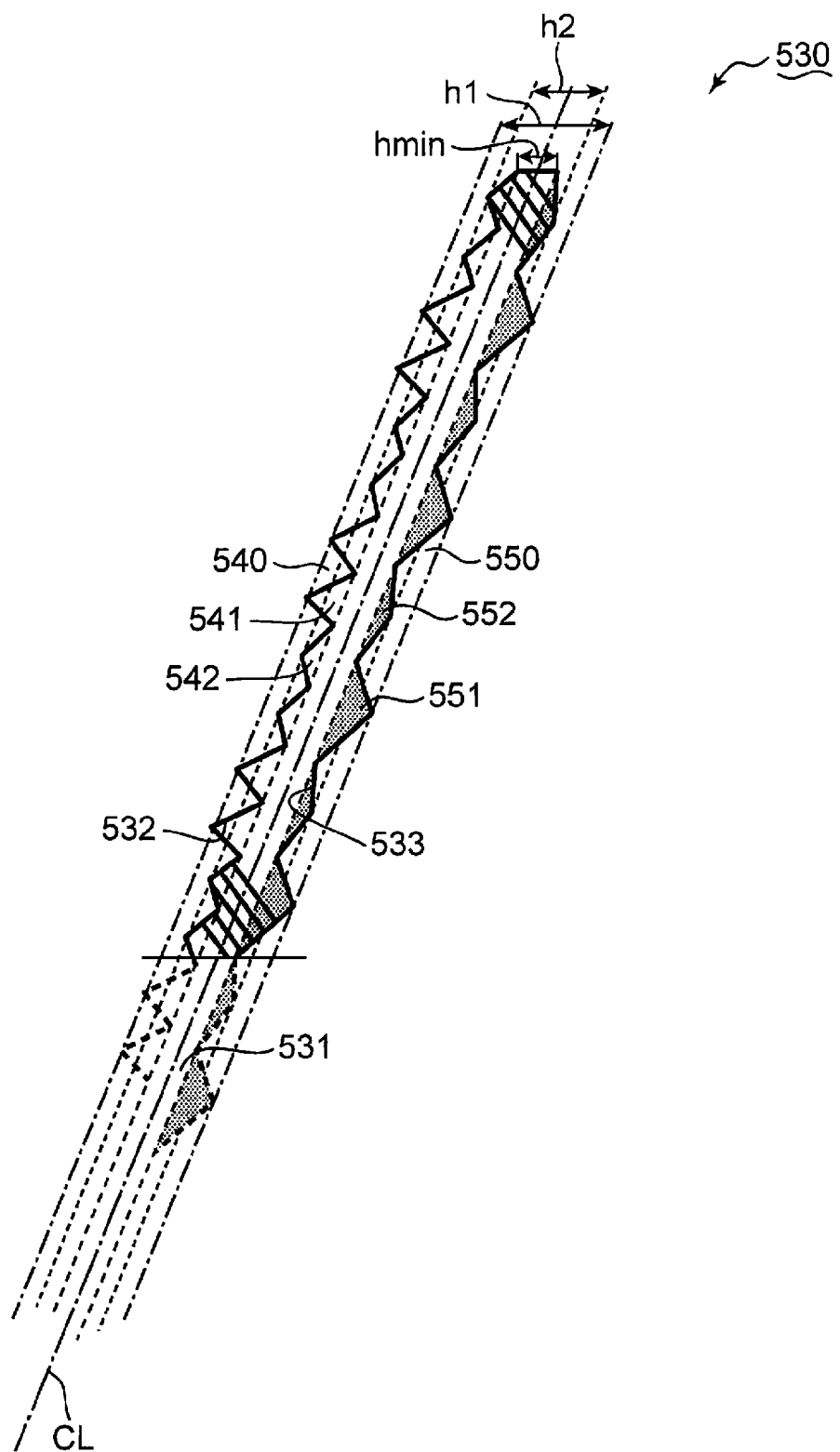
FIG. 42 is a schematic view of a slanted barrier.

FIG. 42 is a schematic view of a slanted barrier 503 developed on the basis of the aforementioned findings. The slanted barrier 530 is described with reference to FIGS. 2 and 42.

The slanted barrier 530 includes a left contour 532 which defines an opening 531 and a right contour 533 which defines the opening 531 on the right of the left contour 532. The left contour 532 defines a left notched structure 540. The right contour 533 defines a right notched structure 550.

The minimum opening width "hmin" is set to a value of "0.6". The left notched structure 540 is designed by means of the number of divisions "n" set to a value of "11.5". The right notched structure 550 is designed by means of the number of divisions "n" set to a value of "6.5".

As shown in FIG. 42, the left notched structure 540 includes wide notched regions 541 and narrow notched regions 542. The left notched structure 520 is formed by two notched regions 541 and two notched regions 542 which are alternately repeated.

As shown in FIG. 42, the right notched structure 550 includes wide notched regions 551 and narrow notched regions 552. The right notched structure 550 is formed by one notched region 551 and one notched region 552 which are alternately repeated.

Based on "Expression 4" described above, a horizontal height (the dimension denoted by the symbol "dwh" in FIG. 2) of the notched structure is calculated. It should be noted that the angle "φ" used in "Expression 4" may be arbitrarily determined. In addition, the parameter "dsv" used in "Expression 4" is calculated by means of "6.5" as a value of the number of divisions "n".

The following equations may be used in order to design a horizontal height "dwh1" of the wide notched regions 541, 551 and a horizontal height "dwh2" of the narrow notched regions 542, 552. It should be noted that the symbol "krate" in the following equations may be processed as a change parameter for the horizontal height. For designing the slanted barrier 530, a value of "0.5" is used as the change parameter "krate".

$$dwh1 = dwh \times (1.0 + krate) \quad \text{[Expression 17]}$$

$$dwh2 = dwh \times (1.0 - krate) \quad \text{[Expression 18]}$$

In FIG. 42, a dimension denoted by the symbol "h1" is a width dimension of the opening 531 defined by the wide notched regions 541, 551. A dimension denoted by the symbol "h2" is a width dimension of the opening 531 defined by the narrow notched regions 542, 552.

As apparent from the aforementioned two equations, a sum of the horizontal height "dwh1" of the wide notched regions 541, 551 and the horizontal height "dwh2" of the narrow notched regions 542, 552 is equal to a value twice as great as the horizontal height "dwh" of the notched structure calculated from "Expression 4" described above.

FIG. 42 is a partial enlargement of the opening 531. A pattern depicted by a solid line in FIG. 42 may be repeated along the center line CL of the opening 531.

Figure 43:
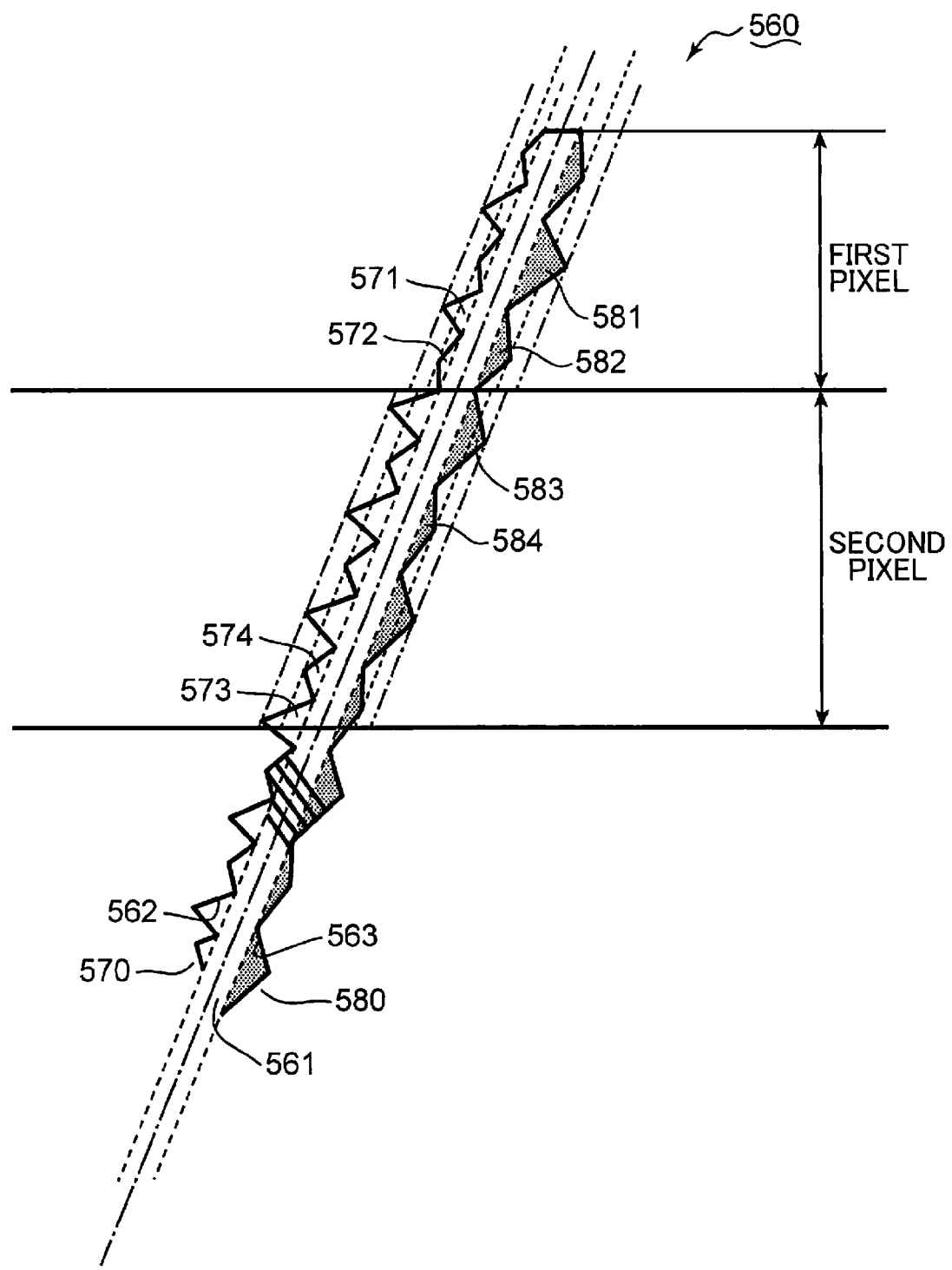
FIG. 43 is a schematic view of a slanted barrier.

FIG. 43 is a schematic view of a slanted barrier 560 developed on the basis of the aforementioned findings. The slanted barrier 530 is described with reference to FIGS. 2, 42 and 43.

The slanted barrier 560 has a horizontal height which varies according to pixels aligned in the vertical direction. FIG. 43 shows a first pixel and a second pixel which is situated immediately below the first pixel as the pixels aligned in the vertical direction.

The slanted barrier 560 includes a left contour 562 which defines an opening 561 and a right contour 563 which defines the opening 561 on the right of the left contour 562. The left contour 562 defines a left notched structure 570. The right contour 563 defines a right notched structure 580.

In a corresponding region to the first pixel, the left notched structure 570 includes wide notched regions 571 and narrow notched regions 572. In a corresponding region to the second pixel, the left notched structure 570 includes wide notched regions 573 and narrow notched regions 574.

In a corresponding region to the first pixel, the right notched structure 580 includes wide notched regions 581 and narrow notched regions 582. In a corresponding region to the second pixel, the right notched structure 580 includes wide notched regions 583 and narrow notched regions 584.

In a corresponding region to the first pixel, a horizontal height (the dimension denoted by the symbol "dwh" in FIG. 2) used to design the wide notched regions 571 of the left notched structure 570 may be set larger than a horizontal height used to design the wide notched regions 581 of the right notched structure 580. A horizontal height used to design the narrow notched regions 572 of the left notched structure 570 may be set larger than a horizontal height used to design the narrow notched regions 582 of the right notched structure 580. It should be noted that a sum of an average value of the horizontal heights of the wide notched regions 571, 581 and an average value of the horizontal heights of the narrow notched regions 542, 552 is equal to a value twice as great as the horizontal height "dwh" of the notched structure calculated from "Expression 4" described above.

In a corresponding region to the second pixel, a horizontal height (the dimension denoted by the symbol "dwh" in FIG. 2) used to design the wide notched regions 573 of the left notched structure 570 may be set smaller than a horizontal height used to design the wide notched regions 583 of the right notched structure 580. A horizontal height used to design the narrow notched regions 574 of the left notched structure 570 may be set smaller than a horizontal height used to design the narrow notched regions 584 of the right notched structure 580. It should be noted that a sum of an average value of the horizontal heights of the wide notched regions 573, 583 and an average value of the horizontal heights of the narrow notched regions 574, 584 is equal to a value twice as great as the horizontal height "dwh" of the notched structure calculated from "Expression 4" described above.

The slanted barriers 530, 560 shown in FIGS. 42 and 43 may cause moiré reducing effects as effective as a slanted barrier with an inclination angle of "23 degrees" which is exemplified as a reference pattern with less moiré.

In order to set an appropriate average opening ratio in consideration of crosstalk, a maximum opening width may be set no more than a sub-pixel pitch. When a minimum opening width equals or falls below "0.5 times" as large as the sub-pixel pitch, adverse effects such as fringes on an image may occur because of a rapid variation in opening width. Or an observed image may become susceptive to a variation of an observing position of an observer in the horizontal and/or vertical directions. Therefore, the minimum opening width may be set to a value no more than "0.7 times" as great as the sub-pixel pitch.

A sub-pixel pitch is used as various criteria about a parallax image. As described above, by appropriately setting an average opening ratio, maximum and minimum opening widths on the basis of a sub-pixel pitch, a moiré pattern may be reduced with little increased crosstalk.

The principles of the present embodiment may be combined with the analysis methods or the evaluation methods according to the aforementioned various embodiments. For example, it may be determined whether or not moiré is generated, on the basis of a comparison between positional relationship among sub-pixels, a supporting electrode and a black matrix in the first opening and a positional relationship among sub-pixels, a supporting electrode and a black matrix in the second and/or third openings. It may be determined whether or not moiré is generated on the basis of the aforementioned positional relationships by comparing distributions of brightness in the first, second and third openings.

In the present embodiment, a notched structure is set by means of triangular concavo-convex regions. Alternatively, these elements which constitute a notched structure may be trapezoids or parallelograms. Further alternatively, contours of these elements may be curved lines (e.g. elliptical arcs).

In the present embodiment, a notched structure is formed by applying the principles of the first embodiment. Alternatively, several barrier parameter candidates may be utilized to design a notched structure by applying the principles of the fifth embodiment.

In the present embodiment, a notched structure is described with reference to the slanted barrier. Alternatively, the design principles of a notched structure may be applied to a vertical stripe barrier or a stepped barrier.

Eighth Embodiment (Principle of Moiré Generation)

Figure 44:
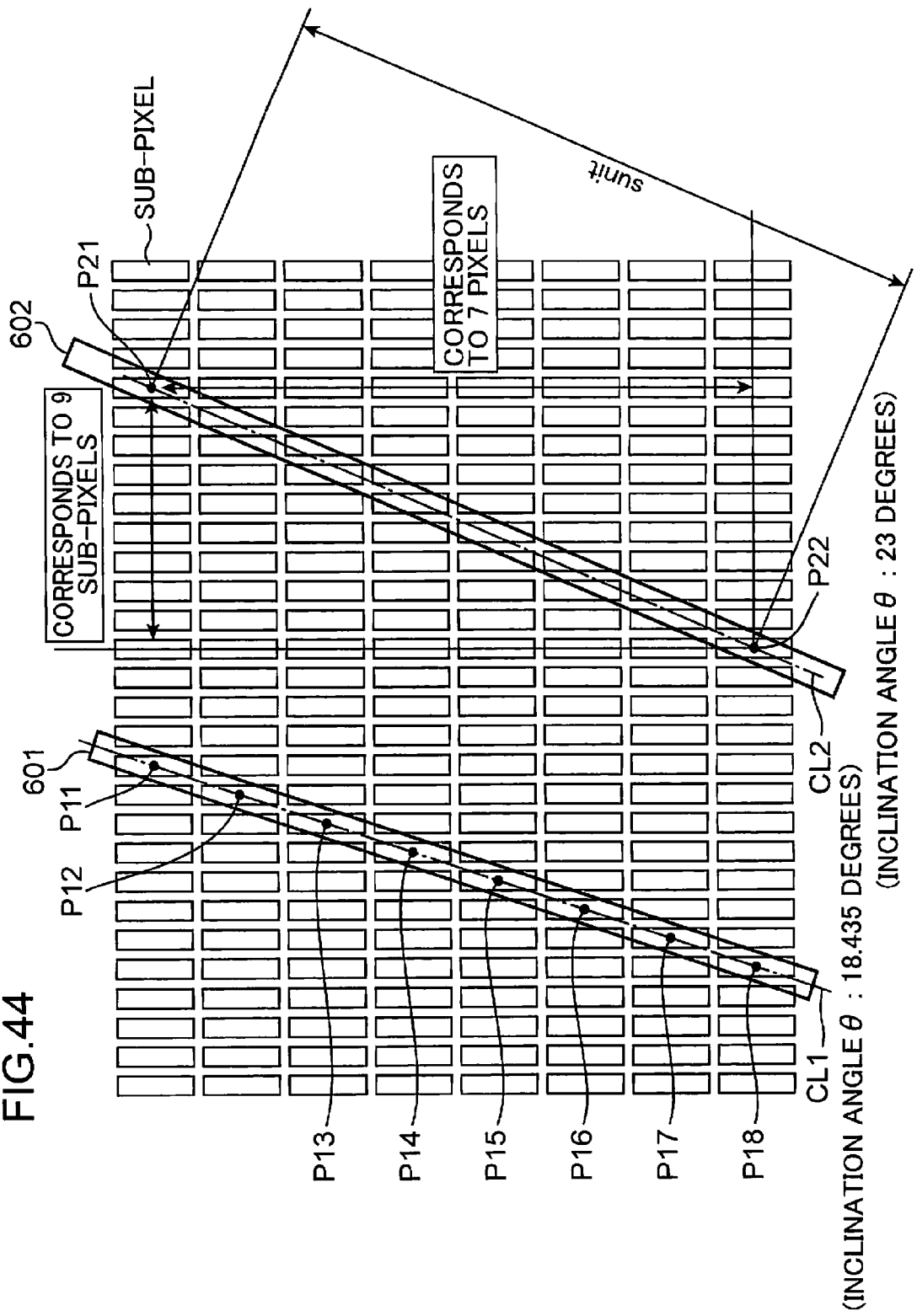
FIG. 44 is a schematic view of a display surface including sub-pixels arranged in a matrix pattern.

FIG. 44 is a schematic view of a display surface including sub-pixels aligned in a matrix pattern. Principles of moiré generation are described with reference to FIGS. 31, 32 and 44.

FIG. 44 shows two openings (openings 601, 602). The left opening 601 corresponds to any of the openings 441, 442, 443 in the first region described with reference to FIG. 31. The right opening 602 corresponds to any of the openings 461, 462, 463 described with reference to FIG. 32.

FIG. 44 shows a center line CL1 of the opening 601. Eight points P11 to P18 are shown on the center line CL1. The points P11 to P18 indicate that the centers of sub-pixels approximately overlap the center line CL1. It should be noted that an inclination angle of the center line CL1 from the vertical line is "18.435 degrees".

FIG. 44 shows the center line CL2 of the opening 602. Two points P21, P22 are shown on the center line CL2. The points P21, P22 indicate that centers of sub-pixels approximately overlap the center line CL2. It should be noted that an inclination angle of the center line CL1 from the vertical line is "23 degrees".

With respect to a positional relationship between the opening 601 and the sub-pixels, there is regularity that the centers of sub-pixels overlapping the opening 601 always overlap the center line CL1 of the opening 601. With respect to a positional relationship between the opening 602 and the sub-pixels, there is regularity that sub-pixels overlapping the center line CL2 of the opening 602 appear once every seven sub-pixels in the vertical direction and once every nine sub-pixels in the horizontal direction.

In the following description, a distance required for the coincidence between a center line of an opening and a center point of a sub-pixel is referred to as "coincidence distance". The symbol "sunit" is used as a variable which represents the coincidence distance. The coincidence distance "sunit" may be expressed as a square root of a sum of a square value of a number of sub-pixels in the vertical and horizontal directions from a sub-pixel having a center point, which coincides with a center line of an opening, to a next sub-pixel having a center point, which coincides with the center line of the opening. For example, with respect to the opening 601, the coincidence distance "sunit" has a value of "1" (horizontal direction: 1 sub-pixel, vertical direction: 1 sub-pixel). With respect to the opening 602, the coincidence distance "sunit" has a value of "11" (horizontal direction: 9 sub-pixels, vertical direction: 7 sub-pixels). When an inclination angle of the center line is "26.57 degrees", the coincidence distance "sunit" has a value of "2" (horizontal direction: 3 sub-pixels, vertical direction: 2 sub-pixels).

As described with reference to FIGS. 31 and 32, the opening 602 which has an inclination angle of "23 degrees" is less likely to cause a moiré pattern. Therefore, a moiré pattern are reduced by setting a coincidence distance "sunit" which coincides with or approximates the opening 602 using a notched structure.

(Design of Notched Structure)

Figure 45:
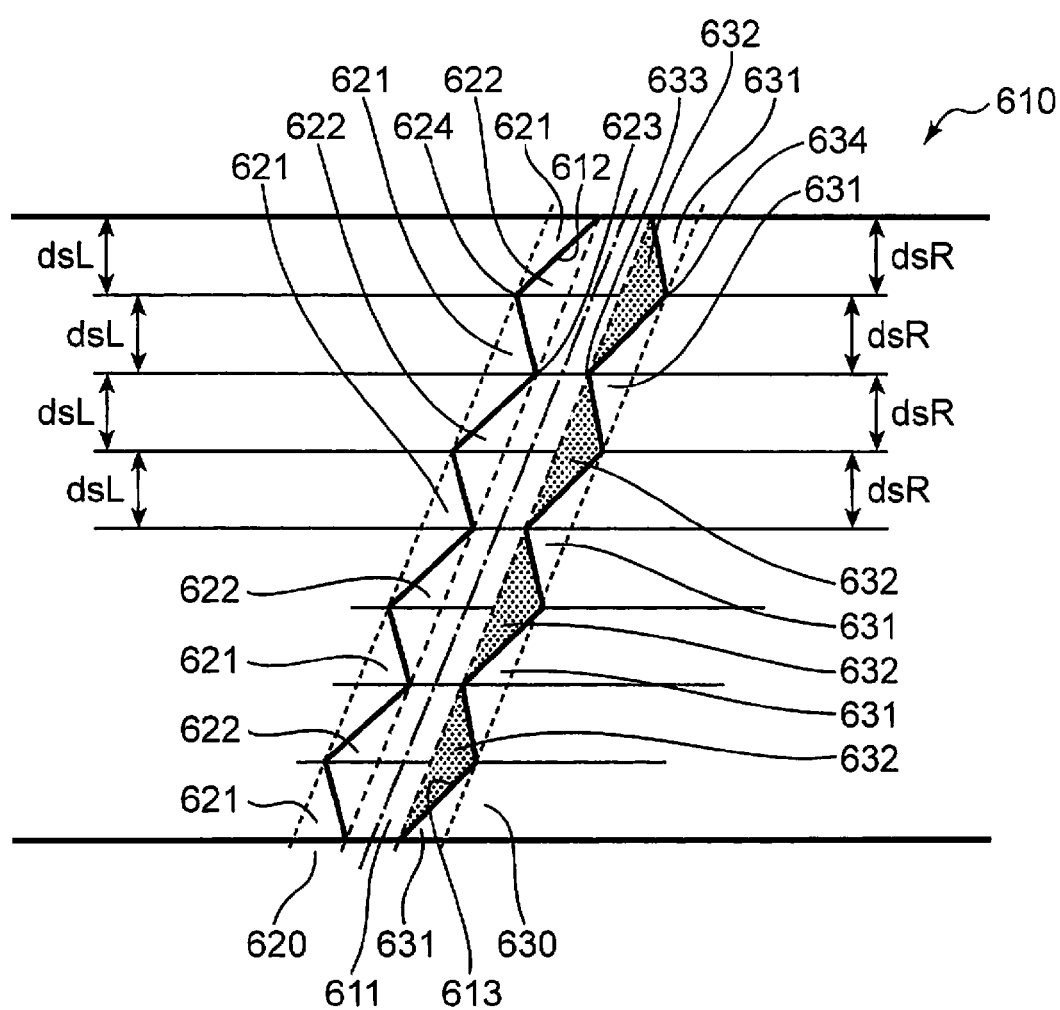
FIG. 45 is a schematic enlarged view of a slanted barrier.

FIG. 45 is a schematic enlarged view of a slanted barrier 610. The slanted barrier 610 is described with reference to FIG. 45.

The slanted barrier 610 includes a left contour 612 which defines an opening 611 and a right contour 613 which defines the opening 611 on the right of the left contour 612. The left contour 612 forms a left notched structure 620. The right contour 613 defines a right notched structure 630.

The left notched structure 620 includes several left protrusions 621 which protrude toward the center line CL of the opening 611. Left notched regions 622 are formed between the left protrusions 621. The left contour 612 includes left peaks 623 which correspond to corners of the triangular left protrusions 621 and left troughs 624 which correspond to corners of the triangular left notched regions 622. In the following description, a vertical distance between the left peaks 623 and the left troughs 624 is referred to as "period". A period set in the left notched structure 620 is denoted by the symbol "dsL".

The right notched structure 630 includes right protrusions 631 which protrude toward the center line CL of the opening 611. Right notched regions 632 are formed between the right protrusions 631. The right contour 613 includes right peaks 633 which correspond to corners of the triangular right protrusions 631 and right troughs 634 which correspond to corners of the triangular right notched regions 632. In the following description, a vertical distance between the right peaks 633 and the right troughs 634 is referred to as "period", like the left notched structure 620. A period set in the right notched structure 630 is denoted by the symbol "dsR".

The left and right peaks 623, 633 shown in FIG. 45 are aligned on the horizontal line. This means that a phase of the left notched structure 620 coincides with a phase of the right notched structure 630.

Figure 46:
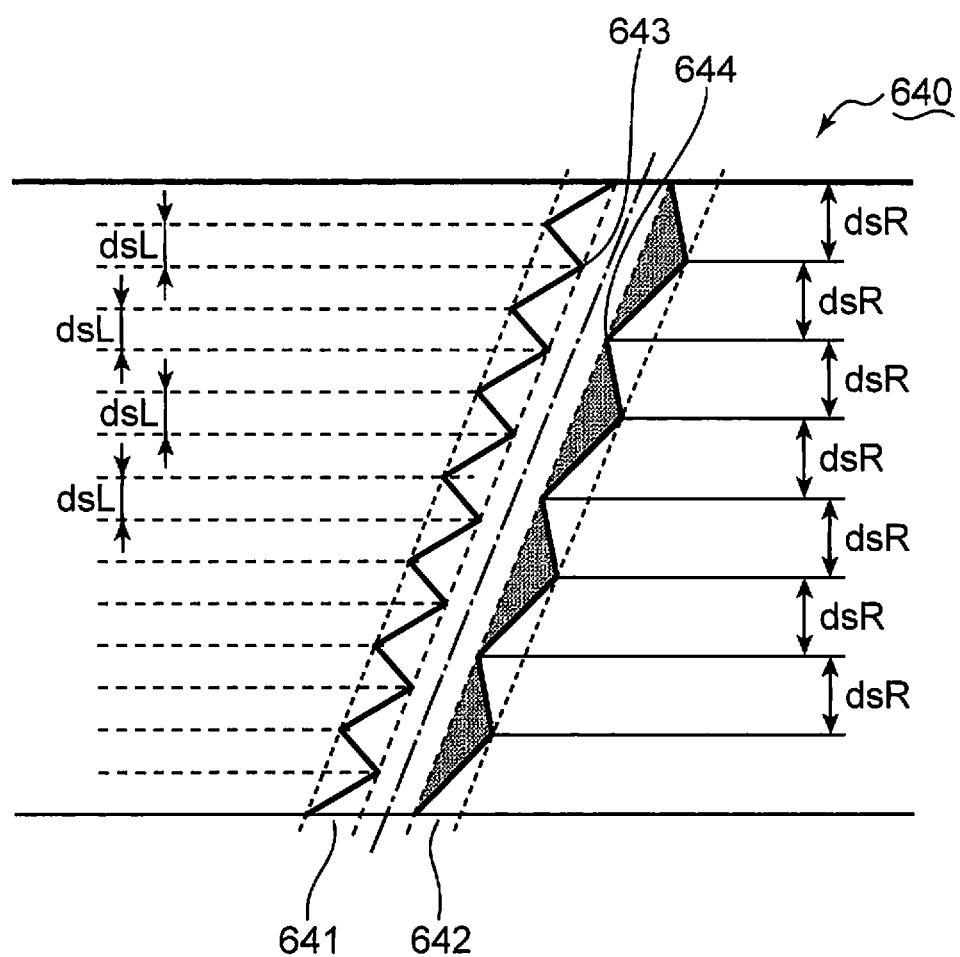
FIG. 46 is a schematic enlarged view of a slanted barrier.

FIG. 46 is a schematic enlarged view of a slanted barrier 640. The slanted barrier 640 is described with reference to FIGS. 45 and 46.

The slanted barrier 640 includes a left notched structure 641 and a right notched structure 642. The left notched structure 641 is designed by means of a period "dsL". The right notched structure 642 is designed by means of a period "dsR" longer than the period "dsL".

The left notched structure 641 includes left peaks 643 and right peaks 644. Unlike the slanted barrier 610 described with reference to FIG. 45, the left and right peaks 643, 644 are not aligned on the horizontal line. In this case, a phase of the left notched structure 641 deviates from a phase of the right notched structure 642.

Design of a notched structure is described on the basis of definitions described with reference to FIGS. 45 and 46.

Figure 47:
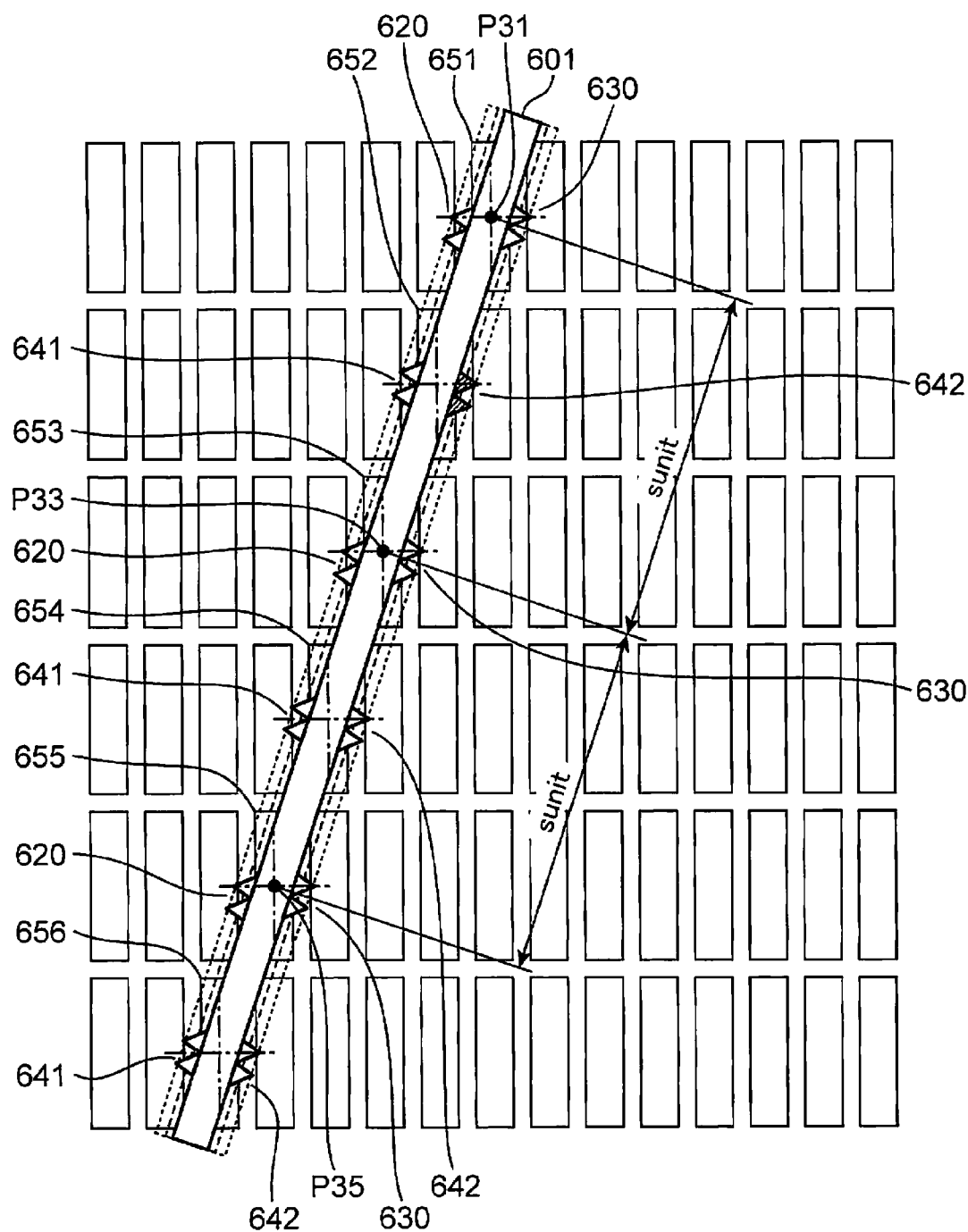
FIG. 47 is a conceptual view of a design of a notched structure.

FIG. 47 is a conceptual view of a design of a notched structure. The notched structure is described with reference to FIGS. 44 to 47.

FIG. 47 shows a display surface including sub-pixels aligned in a matrix pattern. The opening 601 described with reference to FIG. 44 is shown on the display surface. The sub-pixels include first to sixth sub-pixels 651-656 which overlap the opening 601. The first sub-pixel 651 is depicted at the top. The sixth sub-pixel 656 is depicted at the bottom. The second sub-pixel 652 is depicted below the first sub-pixel 651. The third sub-pixel 653 is depicted below the second sub-pixel 652. The fifth sub-pixel 655 is depicted above the sixth sub-pixel 656. The fourth sub-pixel 654 is depicted between the third and fifth sub-pixels 653, 655.

The notched structures 620, 630 described with reference to FIG. 45 are formed in a region corresponding to the first sub-pixel 651. As described with reference to FIG. 45, since the phases of the notched structures 620, 630 coincide with each other, the center position between the opening 601 and an opening region formed by the notched structures 620, 630 coincides with the center of the first sub-pixel 651. The point P31 depicted on the first sub-pixel 651 indicates that the center position between the opening 601 and the opening region formed by the notched structures 620, 630 coincides with the center of the first sub-pixel 651.

The notched structures 620, 630 described with reference to FIG. 45 are formed in a region corresponding to the third sub-pixel 653. As described with reference to FIG. 45, since the phases of the notched structures 620, 630 coincide with each other, the center position between the opening 601 and the opening region formed by the notched structures 620, 630 coincides with the center of the third sub-pixel 653. The point P33 depicted on the third sub-pixel 653 indicates that the center position between the opening 601 and the opening region formed by the notched structures 620, 630 coincides with the center of the third sub-pixel 653.

The notched structures 620, 630 described with reference to FIG. 45 are formed in a region corresponding to the fifth sub-pixel 655. As described with reference to FIG. 45, since the phases of the notched structures 620, 630 coincide with each other, the center position between the opening 601 and the opening region formed by the notched structures 620, 630 coincides with the center of the fifth sub-pixel 655. The point P35 depicted on the fifth sub-pixel 655 indicates that the center position between the opening 601 and the opening region formed by the notched structures 620, 630 coincides with the center of the fifth sub-pixel 653.

The notched structures 641, 642 described with reference to FIG. 46 are formed in a region corresponding to the second sub-pixel 652. As described with reference to FIG. 46, since the phases of the notched structures 641, 642 do not coincide with each other, the center position between the opening 601 and the opening region formed by the notched structures 641, 642 does not coincide with the center of the second sub-pixel 652. Therefore, unlike in FIG. 44, a point indicating a coincidence between a center of an opening region and a center of a sub-pixel is not shown on the second sub-pixel 652.

The notched structures 641, 642 described with reference to FIG. 46 are formed in a region corresponding to the fourth sub-pixel 654. As described with reference to FIG. 46, since the phases of the notched structures 641, 642 do not coincide with each other, the center position between the opening 601 and the opening region formed by the notched structures 641, 642 does not coincide with the center of the fourth sub-pixel 654. Therefore, unlike in FIG. 44, a point indicating a coincidence between a center of an opening region and a center of a sub-pixel is not shown on the fourth sub-pixel 654.

The notched structures 641, 642 described with reference to FIG. 46 are formed in a region corresponding to the sixth sub-pixel 656. As described with reference to FIG. 46, since the phases of the notched structures 641, 642 do not coincide with each other, the center position between the opening 601 and an opening region formed by the notched structures 641, 642 does not coincide with the center of the sixth sub-pixel 656. Therefore, unlike in FIG. 44, a point indicating a coincidence between a center of an opening region and a center of a sub-pixel is not shown on the sixth sub-pixel 656.

The coincidence distance "sunit" may be freely adjusted by means of the notched structures 620, 630 of which phases coincide with each other and the notched structures 641, 642 of which phases do not coincide with each other. Therefore, even based on a slanted barrier with an inclination angle of 18.435 degrees, the coincidence distance "sunit" defined by the opening 602 shown in FIG. 44 may be set.

In order to create phases which do not coincide with each other, the period "dsL" of the left notched structure and the period "dsR" of the right notched structure may be set so as to satisfy the equation and the inequality below. It should be noted that in the following expression, a parameter denoted by the symbol "dkks" may be processed as the change parameter.

$$dsL = dsR \times (1.0 - dkks)$$

$$0.0 < dkks < 1.0 \quad \text{[Expression 19]}$$

The aforementioned design principles have the following features.

By setting a large change parameter "dkks", the left notched structure becomes narrower than the right notched structure. Therefore, when the change parameter "dkks" is set large, there is an increased phase difference between the right and left notched structures.

When the coincidence distance "sunit" is long, a slanted barrier having a large inclination angle is simulated.

A period of a notched structure may be set in consideration of a position of a black matrix or a supporting electrode.

The change parameter "dkks" may have a negative value as long as an appropriate average opening ratio is obtained.

Figure 48:
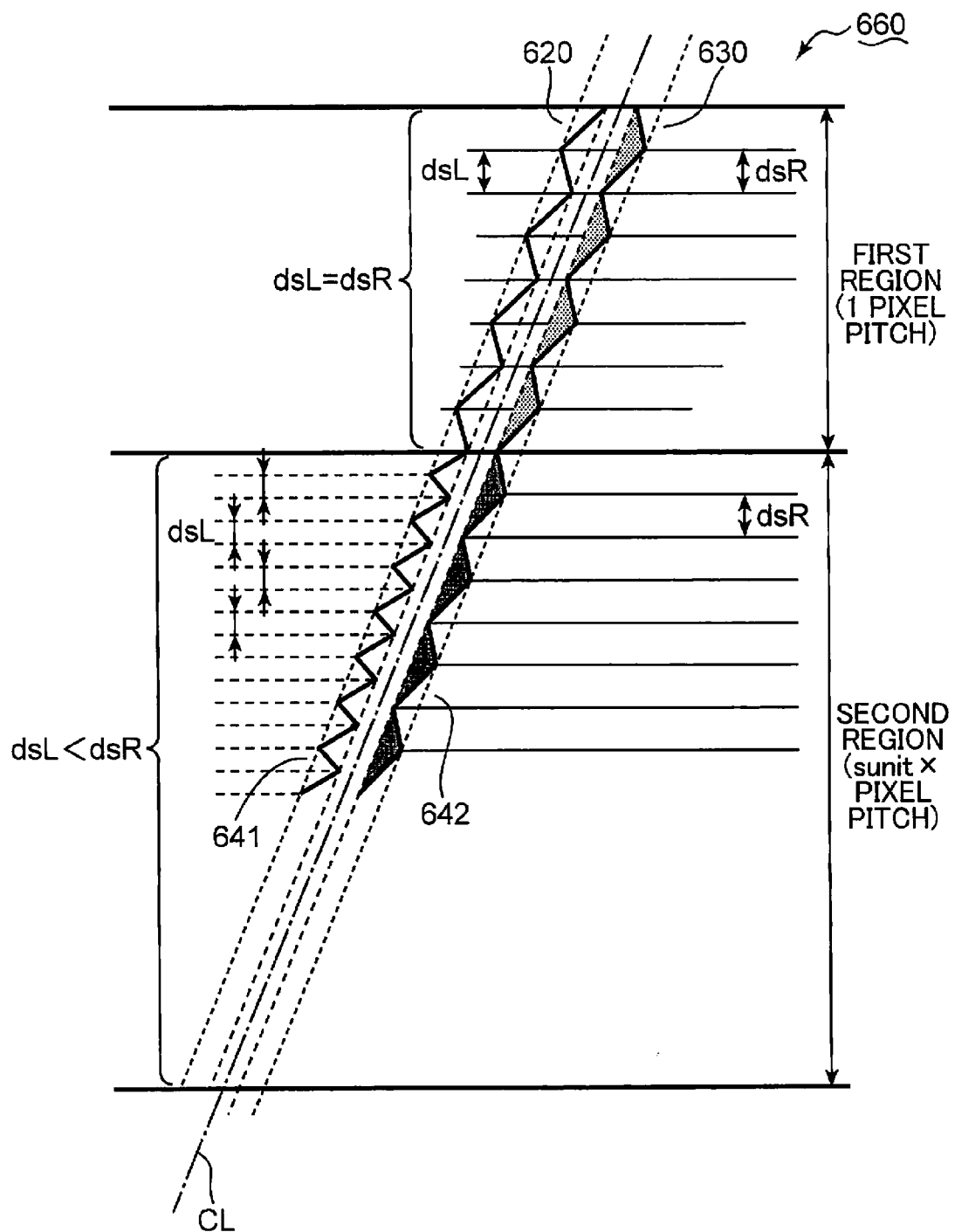
FIG. 48 is a schematic view of a slanted barrier.

FIG. 48 is a schematic view of a slanted barrier 660 designed on the basis of the aforementioned design principles. The slanted barrier 660 is described with reference to FIGS. 44 and 48.

The slanted barrier 660 includes a first region defined by notched structures 620, 630 and a second region defined by notched structures 641, 642. The first region is set to a length of one pixel pitch in the vertical direction.

Like the opening 602 described with reference to FIG. 44, the coincidence distance "sunit" is set to a value of "11". The second region is set to a length of 11 pixel pitches in the vertical direction. A set constituting the first and second regions is repeated along the center line CL.

The right notched structures 630, 642 are designed using "6.5" as a value of the number of divisions "n" along the first and second regions. In the first region, the left notched structure 620 is designed using the same number of divisions "n" as the right notched structure 630. In the second region, the left notched structure 641 is designed using "11.5" as a value of the number of divisions "n". It should be noted that the angle "φ" used in "Expression 4" described above is set to "34 degrees". The slanted barrier 660 shown in FIG. 48 may cause moiré reducing effects comparable to the opening 602 described with reference to FIG. 44.

Figure 49:
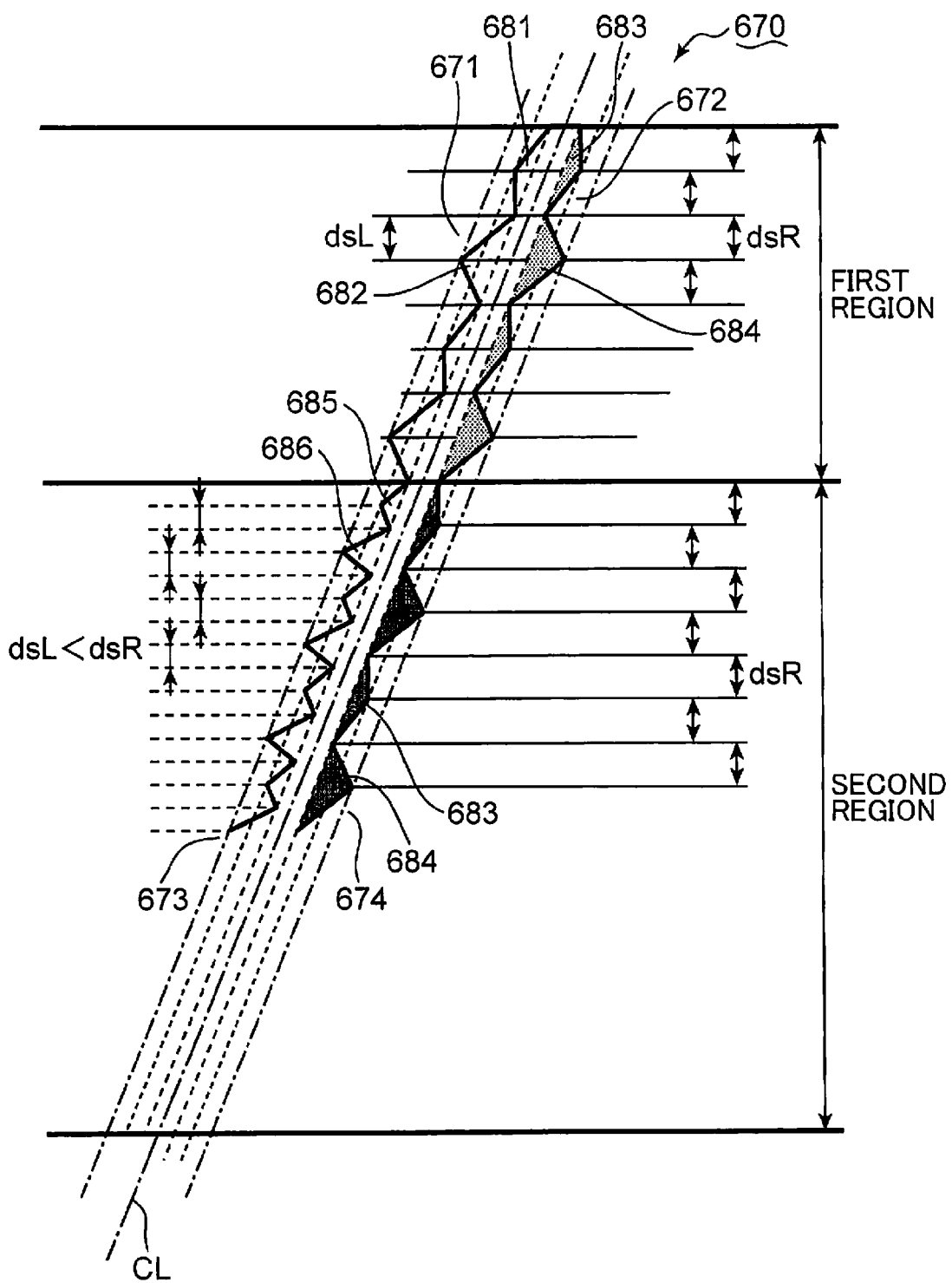
FIG. 49 is a schematic view of a slanted barrier.

FIG. 49 is a schematic view of a slanted barrier 670 designed on the basis of the aforementioned design principles and on the basis of the principles according to the seventh embodiment. The slanted barrier 670 is described with reference to FIGS. 2, 48 and 49.

Like the slanted barrier 660 described with reference to FIG. 48, the slanted barrier 670 includes the first and second regions.

The slanted barrier 670 includes a left notched structure 671 which is formed to the left of the center line CL in the first region, a right notched structure 672 which is formed to the right of the center line CL in the first region, a left notched structure 673 which is formed to the left of the center line CL in the second region, and a right notched structure 674 which is formed to the right of the center line CL in the second region. Like the slanted barrier 660 described with reference to FIG. 48, the right notched structures 672, 674 have a constant period "dsR". In addition, the left notched structure 671 in the first region has a period "dsL" as long as the period "dsR" of the right notched structure 672. The left notched structure 673 in the second region is designed using a period "dsL" shorter than the period of the right notched structures 672, 674.

The left notched structure 671 in the first region forms narrow notched regions 681 and wide notched regions 682. The alternately aligned notched regions 681, 682 are designed by altering a horizontal height (the dimension denoted by "dsh" in FIG. 2).

The right notched structures 672, 674 form narrow notched regions 683 and wide notched regions 684. The alternately aligned notched regions 683, 684 are designed by altering a horizontal height (the dimension denoted by "dsh" in FIG. 2). In the horizontal direction, the narrow notched regions 683 of the right notched structure 672 face the narrow notched regions 681 of the left notched structure 671. In the horizontal direction, the wide notched regions 684 of the right notched structure 672 face the wide notched regions 682 of the left notched structure 671.

The left notched structure 673 in the second region forms narrow notched regions 685 and wide notched regions 686. The alternately aligned notched regions 685, 686 are designed by altering a horizontal height (the dimension denoted by "dsh" in FIG. 2). In the second region, since the notched regions 683 to 686 with different sizes are used, there is an increased phase shift between the left and right notched structures 673, 674. On the other hand, in the first region, since the same period is used between the left and right notched structures 671, 672, a phase difference is not created between the left and right notched structures 671, 672.

Figure 50:
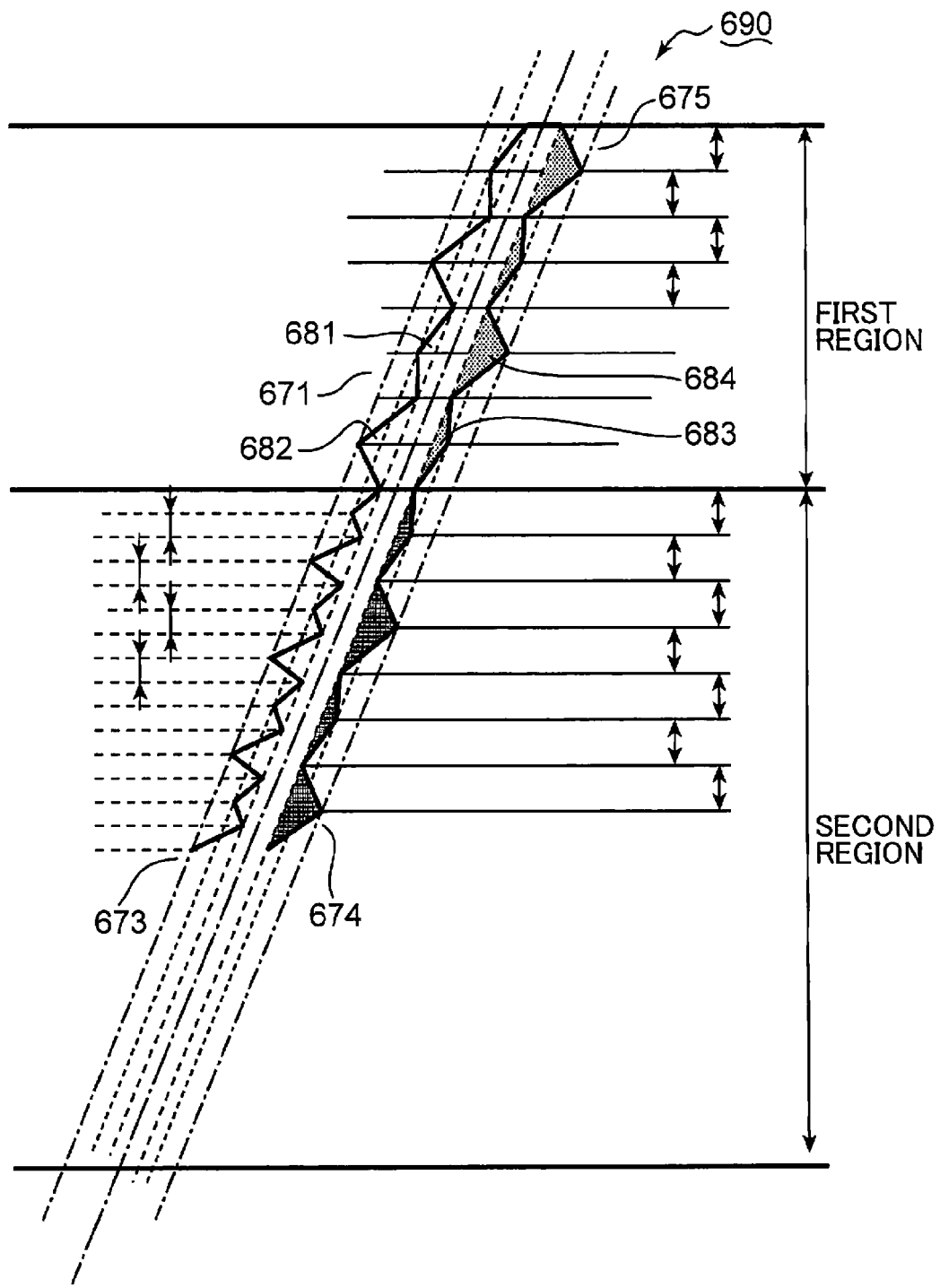
FIG. 50 is a schematic view of a slanted barrier.

FIG. 50 is a schematic view of a slanted barrier 690 designed on the basis of the aforementioned design principles and on the basis of the principles according to the seventh embodiment. The slanted barrier 690 is described with reference to FIGS. 2, 44, 49 and 50.

Like the slanted barrier 670 described with reference to FIG. 49, the slanted barrier 690 includes the first and second regions.

Like the slanted barrier 670 described with reference to FIG. 49, the slanted barrier 690 includes notched structures 671, 673, 674. In the first region, the slanted barrier 690 further includes a right notched structure 675, which faces the left notched structure 671.

Like the right notched structure 672 described with reference to FIG. 49, the notched structure 675 forms narrow notched regions 683 and wide notched regions 684. Unlike the right notched structure 672 described with reference to FIG. 49, the narrow notched regions 683 face the wide notched regions 682 formed by the left notched structure 671. The wide notched regions 684 face the narrow notched regions 681 formed by the left notched structure 671. By setting the horizontal heights of the left and right notched regions in the first region so as to be asymmetrical, effects comparable to an ordinary slanted barrier with a large inclination angle (a slanted barrier without a notched structure) is obtained.

Since the slanted barriers 670, 690 shown in FIGS. 49 and 50 are designed on the basis of the principles described in the context of the seventh embodiment, the slanted barriers 670, 690 may be designed, for example, so that an average opening ratio coincides with an opening ratio of the opening 602 described with reference to FIG. 44.

In order to set an appropriate average opening ratio in consideration of crosstalk, a maximum opening width may be set no more than a sub-pixel pitch. If a minimum opening width equals or falls below "0.5 times" as great as the sub-pixel pitch, adverse effects such as fringes on an image may occur because of a rapid variation in opening width. Or an observed image may become susceptive to a variation of an observing position of an observer in the horizontal and/or vertical directions. Therefore, the minimum opening width may be set to a value no less than "0.7 times" as great as the sub-pixel pitch.

A sub-pixel pitch is used as various criteria about a parallax image. As described above, by appropriately setting an average opening ratio, a maximum opening width, and a minimum opening width on the basis of a sub-pixel pitch, a moiré pattern may be reduced with little increased crosstalk.

In the present embodiment, a notched structure is formed by applying the principles of the first embodiment. Alternatively, several barrier parameter candidates may be utilized to design a notched structure by applying the principles of the fifth embodiment. Several candidates may be set for the periods "dsL", "dsR" described above. A moiré pattern may be effectively eliminated by an appropriate period selected from the period candidates.

In the present embodiment, a notched structure is set by means of triangular concavo-convex regions. Alternatively, these elements which constitute a notched structure may be trapezoids or parallelograms. Further alternatively, contours of these elements may be curved lines (e.g. elliptical arcs).

In the present embodiment, a notched structure is described with reference to the slanted barrier. Alternatively, the design principles of a notched structure may be applied to a vertical stripe barrier or a stepped barrier.

(Other)

The display portion 150 described with reference to FIG. 1 may be a liquid crystal panel which uses a backlight device. Alternatively, the display portion 150 may be a emitting display device (e.g. a PDP or an organic EL panel) or other devices configured to display a parallax image using pixels or sub-pixels aligned in a matrix pattern.

The display apparatuses according to the aforementioned various embodiments may include a detector which detects a head position. For example, the detector may detect the head from captured data. By applying known head tracking techniques or eye tracking techniques to the display apparatus, the display apparatus may dynamically adjust a barrier pitch or a distance between the display portion 150 and the separator 160. It should be noted that the detector may measure a time TOF (Time of Flight) in addition to captured data (TOF method). By measuring a time from irradiation of an object (an observer) by illuminating light of an LED or alike to the return of reflected light, a distance between a display apparatus and the object may be appropriately detected. It should be noted that three-dimensional position measurement techniques using electromagnetic force may be used as the aforementioned tracking techniques.

The display apparatus may display a predetermined test pattern to track a position of an observer. The display apparatus may perform a geometric measurement on the basis of a size of the test pattern or a moiré variation of a pixel value.

As described above, the detector may detect a position of the head of the observer. Alternatively, the detector may perceive the entire observer. Further alternatively, the detector may extract a region of a pupil or an eye of the observer and detect a position of the observer on the basis of the extraction results.

The display apparatus may control an arrangement of a parallax image in response to a position of the head of the observer. For example, the display apparatus may calculate an arrangement of a parallax image in real-time using a CPU or a GPU. Alternatively, the display apparatus may select an arrangement of a parallax image from an LUT prepared in advance.

The separator 160 described with reference to FIG. 1 may be manufactured during manufacturing processes of electronic components such as a flat panel display or a print circuit board which may be used for the display portion 150. For example, the separator 160 may be manufactured by means of photo-masks used for transferring wiring or a circuit pattern of components. It should be noted that the photo-mask may be a hard mask or an emulsion mask. A hard mask may form a region of a shading film on glass by means of a chrome (or chromic oxide) thin film. An emulsion mask may form a region of a shading film on a flexible and transparent polymeric film or glass using blackened metallic silver.

When the separator 160 is manufactured by ultra-fine processes, synthetic silica may be used instead of ordinary sodalime glass. In this case, a shading film pattern may be formed by means of optical techniques.

For example, a chrome or emulsion shading film is formed by sputtering on an entire one side of very smoothly polished glass. Subsequently, photo-resist is coated on the shading film. Patterns are then formed by light irradiation.

A laser pattern generator and a beam exposure apparatus which utilizes electron beams are exemplified as a patterning apparatus. A width of a notched structure or an angle of a peak of a notched structure is dependent on a beam diameter or a pitch accuracy of a patterning apparatus. For example, the width of a notched structure becomes greater than the beam diameter. A wavy contour used in a notched structure requires an angle no less than a predetermined size in order to enable pattern formation at several points by laser patterning. Therefore, a minimum width dimension or a minimum height dimension of a notched structure is dependent on a laser diameter or a laser pitch of a patterning apparatus used in patterning processes. A fixed separator (barrier member) may be mass-produced from the aforementioned mask member. Alternatively, these materials may be directly transferred onto glass in order to form shading regions.

The separator 160 may be a liquid crystal panel. The liquid crystal panel may include a liquid crystal layer formed between a pair of glass plates. Alternatively, the separator 160 may be a shielding apparatus including a liquid crystal layer and a polarizing plate. These apparatuses may shield light under voltage application. When a value of the voltage is "0", these apparatuses allow transmission of light. Therefore, a light transmission state is switched between a completely shielded state (light transmittance: 0%) and a completely transmitted state (light transmittance: 100%).

When these apparatuses are applied to a separator, a width and a height of a notched structure is dependent on a resolution (pixel pitch) of a used apparatus (liquid crystal panel) or a geometric accuracy of ITO (Indium-tin-oxide: an oxide of indium and tin) which is used as transparent electrode materials. The width and the height of the notched structure have to be set no less than the resolution or geometric accuracy.

When these apparatuses are applied to a separator, a barrier position and a barrier pitch are dynamically altered in response to a position of the head of an observer. For example, the display apparatus may appropriately adjust image display even if distances of a few observers vary in a depth direction (an approaching/receding direction from the display apparatus). The aforementioned shielding apparatuses are also advantageous for adjustment to install a display apparatus in a usage space.

The frequency analysis techniques described above is also applicable to the evaluation of the various barrier patterns described in the context of the aforementioned various embodiments. A moiré pattern may be estimated and/or evaluated in advance using the moiré estimation techniques or the moiré evaluation techniques described above from the barrier pattern candidates obtained in the aforementioned various embodiments. An appropriate barrier pattern may be automatically set from several barrier pattern candidates on the basis of a combination of the aforementioned various embodiments.

The notched structures having triangular protrusions are described in the aforementioned various embodiments. Alternatively, a notched structure may have a contour with a sawtooth shape, a saw-tooth shape, a rectangular shape, a trapezoidal shape, a parallelogrammatic shape, or a crescent shape. A contour of a notched structure may be formed by trigonometric functions (a sine function, a cosine function or a tangent function) or alike. The principles of the aforementioned various embodiments are not limited to particular shapes defined by the contour portions of notched structures.

The notched structures with heterogeneously shaped protrusions (and/or concavities) are described in the aforementioned various embodiments. The term "heterogeneously shaped protrusions (and/or concavities)" may mean that several kinds of heights and/or widths of protrusions are set in a single notched structure.

Various dimensions of a notched structure are determined on the basis of sub-pixels in the aforementioned various embodiments. Alternatively, a minimum element used to display an image may be used as a reference for designing a notched structure. For example, a pixel including a few sub-pixels may be used as a reference for designing a notched structure.

The principles of the present embodiments are also applicable to a display apparatus which utilizes a lenticular lens. In this case, the principles of the present embodiments contribute to reduction in a light amount which leaks from a lens boundary. As described above, the principles of the present embodiments are also applicable to a barrier pattern with a vertical stripe structure.

The aforementioned various embodiments mainly include the following features.

A display apparatus according to one aspect of the present invention includes: a display portion which displays a first image and a second image different from the first image to create a stereoscopic image by means of display elements; a separator situated away from the display portion and configured to separate the first and second images from each other; and an adjuster configured to adjust a shape of the separator. The separator includes a barrier portion configured to block image light emitted from the display portion. The barrier portion includes a contour portion which defines a shape of at least one opening that allows transmission of the image light. The contour portion includes a first contour and a second contour facing the first contour. The first and second contours define a continuous opening region which is inclined at a predetermined angle from a vertical line. At least one contour of the first and second contours forms protrusions which periodically protrude toward the opening region. Shapes of the protrusions are heterogeneous.

According to the aforementioned configuration, the display portion displays a first image and a second image different from the first image. Since the separator situated away from the display portion separates the first and second images from each other, an observer may stereoscopically perceive an image displayed on the display portion.

Since the display portion uses a group of elements to create a stereoscopic image and the continuous opening region defined by the first contour and the second contour facing the first contour is inclined at a predetermined angle from the vertical line, the observer is less likely to perceive moiré even if the observer horizontally moves from a position where an image is stereoscopically perceived.

Since the protrusions defined by the first and second contours are geometrically heterogeneous, the adjuster may define a shape of an opening which makes the observer less likely to perceive moiré.

In the aforementioned configuration, the adjuster may adjust a period of the protrusions.

According to the aforementioned configuration, since the adjuster adjusts the period of the protrusions, the adjuster may define a shape of an opening which makes the observer less likely to perceive moiré.

In the aforementioned configuration, the adjuster may make widths of the protrusions heterogeneous.

According to the aforementioned configuration, since the adjuster makes widths of the protrusions heterogeneous, the adjuster may define a shape of an opening which makes the observer less likely to perceive moiré.

In the aforementioned configuration, the adjuster may make heights of the protrusions heterogeneous.

According to the aforementioned configuration, since the adjuster makes heights of the protrusions heterogeneous, the adjuster may define a shape of an opening which makes the observer less likely to perceive moiré.

In the aforementioned configuration, the at least one opening may include a first opening and a second opening which is formed at a predetermined interval from the first opening in a horizontal direction.

According to the aforementioned configuration, since the contour portion defines the first opening and the second opening which is formed at a predetermined interval from the first opening in the horizontal direction, the observer may stereoscopically perceive an image displayed on the display portion.

In the aforementioned configuration, the display portion may include a display surface in which the display elements are aligned in the vertical direction. Each of the display elements may include different regions in luminance along the vertical line. The opening region may be inclined at an inclination angle θ from the vertical line. The adjuster may adjust the widths of the protrusions so that the widths of the protrusions get smaller than a value obtained by dividing an arrangement interval of the display elements in the vertical direction by a value of a number of the regions in the display element multiplied by cos θ.

According to the aforementioned configuration, since the adjuster adjusts the period of the protrusions so that the period of the protrusions gets smaller than a value obtained by dividing an arrangement interval of the display elements in the vertical direction by a value of a number of the regions in the display element multiplied by cos θ, the adjuster may reduce an area of a relatively bright region in the display elements by means of the barrier portion and increase an area of a relatively dark region in the display elements by means of the opening region between the protrusions. Therefore, the adjuster may define a shape of an opening which makes the observer less likely to perceive moiré.

In the aforementioned configuration, the protrusions may include first protrusions defined by the first contour and second protrusions defined by the second contour. The adjuster may make the second protrusions different in formation pattern from the first protrusions.

According to the aforementioned configuration, since the adjuster makes the second protrusions in formation pattern from the first protrusions, the adjuster may define a shape of an opening which makes the observer less likely to perceive moiré.

In the aforementioned configuration, the adjuster may make the second protrusions different in width from the first protrusions.

According to the aforementioned configuration, since the adjuster makes the second protrusions different in width from the first protrusions, the adjuster may define a shape of an opening which makes the observer less likely to perceive moiré.

In the aforementioned configuration, the adjuster may make the second protrusion different in height from the first protrusions.

According to the aforementioned configuration, since the adjuster makes the second protrusions different in height from the first protrusions, the adjuster may define a shape of an opening which makes the observer less likely to perceive moiré.

In the aforementioned configuration, the contour of the protrusions may be defined by a line that is inclined from the horizontal and vertical lines.

According to the aforementioned configuration, since the contour of the protrusions is defined by a line inclined from the horizontal and vertical lines, the adjuster may define a shape of an opening which makes the observer less likely to perceive moiré.

In the aforementioned configuration, the adjuster may determine the period of the protrusions so that the period of the protrusions deviates from a value obtained by dividing the arrangement interval by a natural number.

According to the aforementioned configuration, since the adjuster determines the period of the protrusions so that the period of the protrusions deviates from a value obtained by dividing the arrangement interval by a natural number, the observer is less likely to perceive moiré even if a shape of the protrusions which is actually formed by the contour portion deviates from a shape of the protrusions which is determined by the adjuster.

In the aforementioned configuration, the adjuster may set the period of the protrusions within a predetermined range which includes an intermediate value between a first value obtained by dividing the arrangement interval by a first natural number and a second value obtained by dividing the arrangement interval by a second natural number obtained by incrementing the first natural number by 1.

According to the aforementioned configuration, since the adjuster sets the period of the protrusions within a predetermined range including an intermediate value between the first and second values, the observer is less likely to perceive moiré even if a shape of the protrusions which is actually formed by the contour portion deviates from a shape of the protrusions which is determined by the adjuster.

In the aforementioned configuration, the adjuster may verify a transmission pattern of the image light on the basis of candidate periods about the period of the protrusions, and may select one of the candidate periods as the period of the protrusions on the basis of a result of verification about the transmission pattern.

According to the aforementioned configuration, since the adjuster selects one of the candidate periods as the period of the protrusions on the basis of a result of the verification about the transmission pattern, the adjuster may define a shape of an opening which makes the observer less likely to perceive moiré.

In the aforementioned configuration, the adjuster may determine the predetermined interval between the first and second openings so as to reduce a difference between a first area of the display elements, which are exposed through the first opening, and a second area of the display elements, which are exposed through the second opening.

According to the aforementioned configuration, since the difference between the first and second areas is reduced, the adjuster may define a shape of an opening which makes the observer less likely to perceive moiré.

In the aforementioned configuration, the adjuster may determine shapes of the first and second openings so as to reduce a positional difference between the display elements exposed through the first and second openings.

According to the aforementioned configuration, since the positional difference between the display elements exposed through the first and second openings is reduced, the adjuster may define a shape of an opening which makes the observer less likely to perceive moiré.

In the aforementioned configuration, the transmission pattern may be frequency characteristics of a moiré pattern obtained from each of the candidate periods. The adjuster may compare frequency characteristics of a moiré pattern created from a reference opening region with moiré patterns created from the candidate periods, and select one of the candidate periods as the period of the protrusions.

According to the aforementioned configuration, since the adjuster compares frequency characteristics of a moiré pattern created from a reference opening region with moiré patterns created from the candidate periods and selects one of the candidate periods as the period of the protrusions, the adjuster may define a shape of an opening which makes the observer less likely to perceive moiré.

In the aforementioned configuration, the at least one contour may form a notched structure in which the protrusions and concavities formed between the protrusions are alternately repeated.

In the aforementioned configuration, since the at least one contour forms a notched structure in which the protrusions and concavities formed between the protrusions are alternately repeated, the observer is less likely to perceive moiré.

In the aforementioned configuration, the display elements may be pixels or sub-pixels.

According to the aforementioned configuration, the shape of an opening is appropriately set in accordance with pixels or sub-pixels.

INDUSTRIAL APPLICABILITY

The principles of the aforementioned various embodiments are suitably applicable to a display apparatus which partially shields image light to display a stereoscopic image.

This application is based on Japanese Patent application No. 2011-280396 filed in Japan Patent Office on Dec. 21, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A display apparatus comprising:
a display portion which displays a first image and a second image different from the first image to create a stereoscopic image by means of display elements;
a separator situated away from the display portion and configured to separate the first and second images from each other; and
an adjuster configured to adjust a shape of the separator, wherein
the display portion includes a display surface in which the display elements are aligned in a vertical direction,
each of the display elements includes different regions in luminance along a vertical line,
the separator includes a barrier portion configured to block image light emitted from the display portion,
the barrier portion includes a contour portion which defines a shape of at least one opening that allows transmission of the image light,
the contour portion includes a first contour and a second contour facing the first contour,
the first and second contours define a continuous opening region which is inclined at a predetermined angle from the vertical line,
at least one contour of the first and second contours forms protrusions which periodically protrude toward the opening region,
the opening region is inclined at an inclination angle θ from the vertical line, and
the adjuster makes widths of the protrusions heterogeneous so that the widths of the protrusions get smaller than a value obtained by dividing an arrangement interval of the display elements in the vertical direction by a value of a number of the regions in the display element multiplied by cos θ, and sets a period of the protrusions within a predetermined range which includes an intermediate value between a first value obtained by dividing the arrangement interval by a first natural number and a second value obtained by dividing the arrangement interval by a second natural number obtained by incrementing the first natural number by 1.

2. The display apparatus according to claim 1, wherein the adjuster makes heights of the protrusions heterogeneous.

3. The display apparatus according to claim 1, wherein the at least one opening includes a first opening and a second opening which is formed at a predetermined interval from the first opening in a horizontal direction.

4. The display apparatus according to claim 1, wherein the protrusions include first protrusions defined by the first contour and second protrusions defined by the second contour, and the adjuster makes the second protrusions different in formation pattern from the first protrusions.

5. The display apparatus according to claim 4, wherein the adjuster makes the second protrusions different in width from the first protrusions.

6. The display apparatus according to claim 4, wherein the adjuster makes the second protrusions different in height from the first protrusions.

7. The display apparatus according to claim 1, wherein each contour of the protrusions is defined by a line inclined from a horizontal line and the vertical line.

8. The display apparatus according to claim 1, wherein the adjuster determines the period of the protrusions so that the period of the protrusions deviates from a value obtained by dividing the arrangement interval by a natural number.

9. The display apparatus according to claim 1, wherein the adjuster verifies a transmission pattern of the image light based on candidate periods about the period of the protrusions, and selects one of the candidate periods as the period of the protrusions based on a result of verification about the transmission pattern.

10. The display apparatus according to claim 3, wherein the adjuster determines the predetermined interval between the first and second openings so as to reduce a difference between a first area of the display elements, which are exposed through the first opening, and a second area of the display elements, which are exposed through the second opening.

11. The display apparatus according to claim 3, wherein the adjuster determines shapes of the first and second openings so as to reduce a positional difference between the display elements exposed through the first and second openings.

12. A display apparatus comprising:
a display portion which displays a first image and a second image different from the first image to create a stereoscopic image by means of display elements;
a separator situated away from the display portion and configured to separate the first and second images from each other; and
an adjuster configured to adjust a shape of the separator, wherein
the separator includes a barrier portion configured to block image light emitted from the display portion,
the barrier portion includes a contour portion which defines a shape of at least one opening that allows transmission of the image light,
the contour portion includes a first contour and a second contour facing the first contour,
the first and second contours define a continuous opening region which is inclined at a predetermined angle from a vertical line,
at least one contour of the first and second contours forms protrusions which periodically protrude toward the opening region, and
the adjuster adjusts a period of the protrusions so that shapes of the protrusions are heterogeneous, and verifies a transmission pattern of the image light based on candidate periods about the period of the protrusions, and selects one of the candidate periods as the period of the protrusions based on a result of verification about the transmission pattern,
the transmission pattern is frequency characteristics of a moiré pattern obtained from each of the candidate periods, and
the adjuster compares frequency characteristics of a moiré pattern created from a reference opening region with moiré patterns created from the candidate periods, and selects one of the candidate periods as the period of the protrusions.

13. The display apparatus according to claim 1, wherein the at least one contour forms a notched structure in which the protrusions and concavities between the protrusions are alternately repeated.

14. The display apparatus according to claim 1, wherein the display elements are pixels or sub-pixels.

* * * * *